United States Patent
Stilp et al.

(10) Patent No.: US 6,483,460 B2
(45) Date of Patent: Nov. 19, 2002

(54) BASELINE SELECTION METHOD FOR USE IN A WIRELESS LOCATION SYSTEM

(75) Inventors: Louis A. Stilp, Berwyn, PA (US); Joseph W. Sheehan, Newton Square, PA (US); Alan E. E. Rogers, Ayer, MA (US); Robert J. Anderson, Norristown, PA (US); Andrew F. Harbison, Glenside, PA (US)

(73) Assignees: TruePosition, Inc., King of Prussia, PA (US); Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/004,895

(22) Filed: Dec. 5, 2001

(65) Prior Publication Data

US 2002/0101375 A1 Aug. 1, 2002

Related U.S. Application Data

(62) Division of application No. 09/648,404, filed on Aug. 24, 2000, now Pat. No. 6,400,320, which is a continuation of application No. 09/227,764, filed on Jan. 8, 1999, now Pat. No. 6,184,829.

(51) Int. Cl.⁷ .................................................. G01S 3/02
(52) U.S. Cl. ...................................................... 342/457
(58) Field of Search ................................ 342/450, 457, 342/357.01, 357.06; 455/456, 457

(56) References Cited

U.S. PATENT DOCUMENTS

| | | | |
|---|---|---|---|
| 3,921,076 A | 11/1975 | Currie | 325/321 |
| 4,169,245 A | 9/1979 | Crom et al. | 325/58 |
| RE31,254 E | 5/1983 | Brodeur | 343/103 |
| 5,155,590 A | 10/1992 | Beyers, II et al. | 358/86 |
| 5,191,342 A | 3/1993 | Alsup et al. | 342/465 |
| 5,251,232 A | 10/1993 | Nonami | 375/5 |
| 5,327,144 A | 7/1994 | Stilp et al. | 342/387 |
| 5,402,347 A | 3/1995 | McBurney et al. | 364/443 |
| 5,428,667 A | 6/1995 | Easterling et al. | 379/59 |
| 5,512,908 A | 4/1996 | Herrick | 342/387 |
| 5,526,357 A | 6/1996 | Jandrell | 370/95.2 |
| 5,553,101 A | 9/1996 | Lim et al. | 375/340 |
| 5,570,099 A | 10/1996 | DesJardins | 342/378 |
| 5,577,087 A | 11/1996 | Furuya | 375/377 |
| 5,606,575 A | 2/1997 | Williams | 375/219 |
| 5,608,410 A | 3/1997 | Stilp et al. | 342/387 |
| 5,668,837 A | 9/1997 | Dent | 375/316 |
| 5,786,790 A | 7/1998 | Abbott | 342/357 |
| 5,812,609 A | 9/1998 | McLochlin | 375/340 |
| 5,844,522 A | 12/1998 | Sheffer et al. | 342/457 |
| 5,874,916 A | 2/1999 | DesJardins | 342/378 |
| 5,890,068 A | 3/1999 | Fattouche et al. | 455/456 |
| 5,936,571 A | 8/1999 | DesJardins | 342/357 |
| 6,014,102 A | 1/2000 | Mitzlaff et al. | 342/457 |

OTHER PUBLICATIONS

Chester, D.B. et al., "VLSI Implementation of a Wide Band, High Dynamic Range Digital Drop Receiver," *IEEE*, 1991, 1605–1608.

*Primary Examiner*—Dao Phan
(74) *Attorney, Agent, or Firm*—Woodcock Washburn LLP

(57) ABSTRACT

A Wireless Location System includes signal collection systems and location processors for processing digital data provided by the signal collection systems. To determine the geographic location of a mobile wireless transmitter, time difference of arrival, or TDOA, data is determined with respect to a plurality of first signal collection system/antenna second signal collection system/antenna baselines. A method for selecting baselines for use in location processing comprises calculating a number of parameters for each of the plurality of baselines, and including in a final location solution only those baselines meeting or exceeding predefined threshold criteria for each of the parameters.

22 Claims, 28 Drawing Sheets

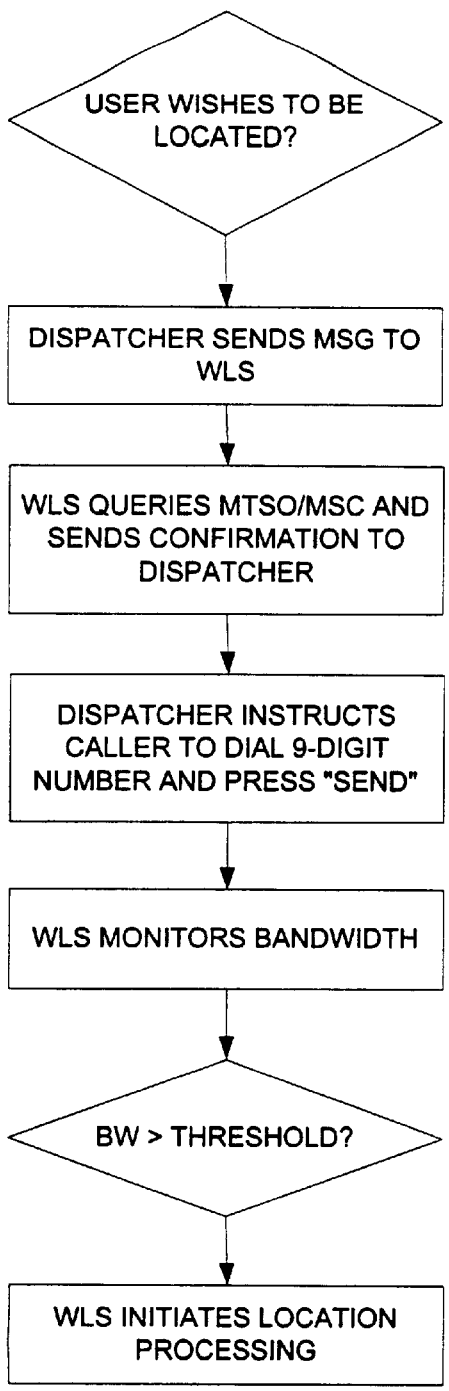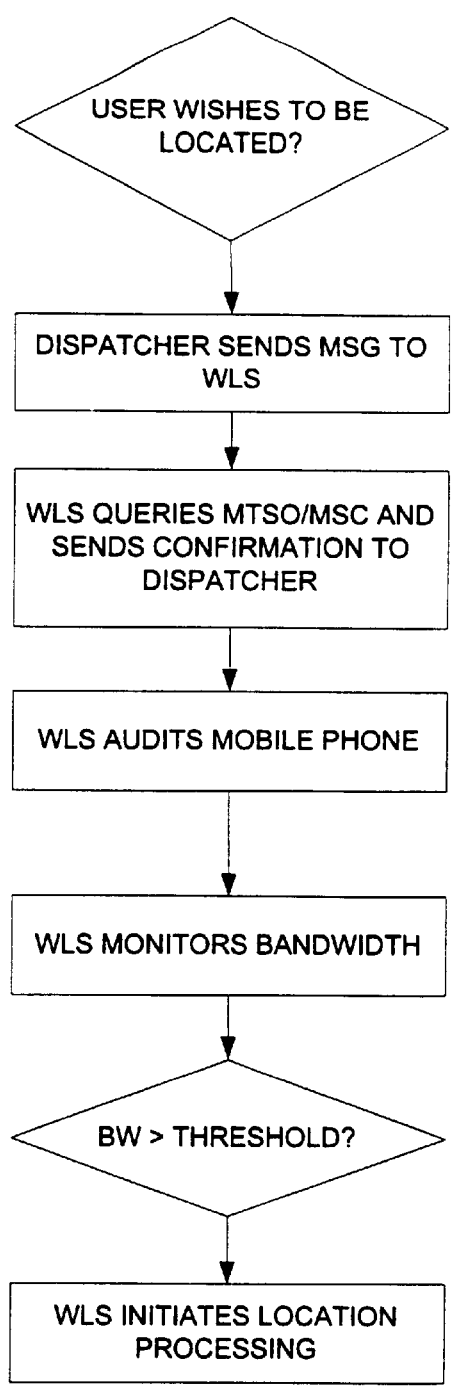
FIGURE 10A
FIGURE 10B

BASELINE SELECTION METHOD FOR USE IN A WIRELESS LOCATION SYSTEM

CROSS REFERENCE TO RELATED APPLICATIONS

This is a divisional of U.S. patent application Ser. No. 09/648,404, filed on Aug. 24, 2000, entitled "Antenna Selection Method for a Wireless Location System", now U.S. Pat. No. 6,400,320, which is a continuation of U.S. patent application Ser. No. 09/227,764, filed on Jan. 8, 1999, entitled "Calibration for Wireless Location System," now U.S. Pat. No. 6,184,829 B1, Feb. 6, 2001.

FIELD OF THE INVENTION

The present invention relates generally to methods and apparatus for locating wireless transmitters, such as those used in analog or digital cellular systems, personal communications systems (PCS), enhanced specialized mobile radios (ESMRs), and other types of wireless communications systems. This field is now generally known as wireless location, and has application for Wireless E9-1-1, fleet management, RF optimization, and other valuable applications.

BACKGROUND OF THE INVENTION

Early work relating to the present invention has been described in U.S. Pat. No. 5,327,144, Jul. 5, 1994, "Cellular Telephone Location System," which discloses a system for locating cellular telephones using novel time difference of arrival (TDOA) techniques. Further enhancements of the system disclosed in the '144 patent are disclosed in U.S. Pat. No. 5,608,410, Mar. 4, 1997, "System for Locating a Source of Bursty Transmissions." Both patents are owned by the assignee of the current invention, and both are incorporated herein by reference. The present inventors have continued to develop significant enhancements to the original inventive concepts and have developed techniques to further improve the accuracy of Wireless Location Systems while significantly reducing the cost of these systems.

Over the past few years, the cellular industry has increased the number of air interface protocols available for use by wireless telephones, increased the number of frequency bands in which wireless or mobile telephones may operate, and expanded the number of terms that refer or relate to mobile telephones to include "personal communications services", "wireless", and others. The air interface protocols now include AMPS, NAMPS, TDMA, CDMA, GSM, TACS, ESMR, and others. The changes in terminology and increases in the number of air interfaces do not change the basic principles and inventions discovered and enhanced by the inventors. However, in keeping with the current terminology of the industry, the inventors now call the system described herein a Wireless Location System.

The inventors have conducted extensive experiments with the Wireless Location System technology disclosed herein to demonstrate both the viability and value of the technology. For example, several experiments were conducted during several months of 1995 and 1996 in the cities of Philadelphia and Baltimore to verify the system's ability to mitigate multipath in large urban environments. Then, in 1996 the inventors constructed a system in Houston that was used to test the technology's effectiveness in that area and its ability to interface directly with E9-1-1 systems. Then, in 1997, the system was tested in a 350 square mile area in New Jersey and was used to locate real 9-1-1 calls from real people in trouble. Since that time, the system test has been expanded to include 125 cell sites covering an area of over 2,000 square miles. During all of these tests, techniques discussed and disclosed herein were tested for effectiveness and further developed, and the system has been demonstrated to overcome the limitations of other approaches that have been proposed for locating wireless telephones. Indeed, as of December, 1998, no other Wireless Location System has been installed anywhere else in the world that is capable of locating live 9-1-1 callers. The innovation of the Wireless Location System disclosed herein has been acknowledged in the wireless industry by the extensive amount of media coverage given to the system's capabilities, as well as by awards. For example, the prestigious Wireless Appy Award was granted to the system by the Cellular Telephone Industry Association in October, 1997, and the Christopher Columbus Fellowship Foundation and Discover Magazine found the Wireless Location System to be one of the top 4 innovations of 1998 out of 4,000 nominations submitted. The value and importance of the Wireless Location System has been acknowledged by the wireless communications industry. In June 1996, the Federal Communications Commission issued requirements for the wireless communications industry to deploy location systems for use in locating wireless 9-1-1 callers, with a deadline of October 2001. The location of wireless E9-1-1 callers will save response time, save lives, and save enormous costs because of reduced use of emergency responses resources. In addition, numerous surveys and studies have concluded that various wireless applications, such as location sensitive billing, fleet management, and others, will have great commercial values in the coming years.

BACKGROUND ON WIRELESS COMMUNICATION SYSTEMS

There are many different types of air interface protocols used for wireless communications systems. These protocols are used in different frequency bands, both in the U.S. and internationally. The frequency band does not impact the Wireless Location System's effectiveness at locating wireless telephones.

All air interface protocols use two types of "channels". The first type includes control channels that are used for conveying information about the wireless telephone or transmitter, for initiating or terminating calls, or for transferring bursty data. For example, some types of short messaging services transfer data over the control channel. In different air interfaces, control channels are known by different terminology, but the use of the control channels in each air interface is similar. Control channels generally have identifying information about the wireless telephone or transmitter contained in the transmission.

The second type includes voice channels that are typically used for conveying voice communications over the air interface. These channels are only used after a call has been set up using the control channels. Voice channels will typically use dedicated resources within the wireless communications system whereas control channels will use shared resources. This distinction will generally make the use of control channels for wireless location purposes more cost effective than the use of voice channels, although there are some applications for which regular location on the voice channel is desired. Voice channels generally do not have identifying information about the wireless telephone or transmitter in the transmission. Some of the differences in the air interface protocols are discussed below:

AMPS—This is the original air interface protocol used for cellular communications in the U.S. In the AMPS system, separate dedicated channels are assigned for use by control channels (RCC). According to the TIA/EIA Standard IS-553A, every control channel block must begin at cellular channel 333 or 334, but the block may be of variable length. In the U.S., by convention, the AMPS control channel block is 21 channels wide, but the use of a 26-channel block is also known. A reverse voice channel (RVC) may occupy any channel that is not assigned to a control channel. The control channel modulation is FSK (frequency shift keying), while the voice channels are modulated using FM (frequency modulation).

N-AMPS—This air interface is an expansion of the AMPS air interface protocol, and is defined in EIA/TIA standard IS-88. The control channels are substantially the same as for AMPS, however, the voice channels are different. The voice channels occupy less than 10 KHz of bandwidth, versus the 30 KHz used for AMPS, and the modulation is FM.

TDMA—This interface is also known D-AMPS, and is defined in EIA/TIA standard IS-136. This air interface is characterized by the use of both frequency and time separation. Control channels are known as Digital Control Channels (DCCH) and are transmitted in bursts in timeslots assigned for use by DCCH. Unlike AMPS, DCCH may be assigned anywhere in the frequency band, although there are generally some frequency assignments that are more attractive than others based upon the use of probability blocks. Voice channels are known as Digital Traffic Channels (DTC). DCCH and DTC may occupy the same frequency assignments, but not the same timeslot assignment in a given frequency assignment. DCCH and DTC use the same modulation scheme, known as π/4 DQPSK (differential quadrature phase shift keying). In the cellular band, a carrier may use both the AMPS and TDMA protocols, as long as the frequency assignments for each protocol are kept separated.

CDMA—This air interface is defined by EIA/TIA standard IS-95A. This air interface is characterized by the use of both frequency and code separation. However, because adjacent cell sites may use the same frequency sets, CDMA is also characterized by very careful power control. This careful power control leads to a situation known to those skilled in the art as the near-far problem, which makes wireless location difficult for most approaches to function properly. Control channels are known as Access Channels, and voice channels are known as Traffic Channels. Access and Traffic Channels may share the same frequency band, but are separated by code. Access and Traffic Channels use the same modulation scheme, known as OQPSK.

GSM—This air interface is defined by the international standard Global System for Mobile Communications. Like TDMA, GSM is characterized by the use of both frequency and time separation. The channel bandwidth is 200 KHz, which is wider than the 30 KHz used for TDMA. Control channels are known as Standalone Dedicated Control Channels (SDCCH), and are transmitted in bursts in timeslots assigned for use by SDCCH. SDCCH may be assigned anywhere in the frequency band. Voice channels are known as Traffic Channels (TCH). SDCCH and TCH may occupy the same frequency assignments, but not the same timeslot assignment in a given frequency assignment. SDCCH and TCH use the same modulation scheme, known as GMSK.

Within this specification the reference to any one of the air interfaces shall automatically refer to all of the air interfaces, unless specified otherwise. Additionally, a reference to control channels or voice channels shall refer to all types of control or voice channels, whatever the preferred terminology for a particular air interface. Finally, there are many more types of air interfaces used throughout the world, and there is no intent to exclude any air interface from the inventive concepts described within this specification. Indeed, those skilled in the art will recognize other interfaces used elsewhere are derivatives of or similar in class to those described above.

The preferred embodiments of the inventions disclosed herein have many advantages over other techniques for locating wireless telephones. For example, some of these other techniques involve adding GPS functionality to telephones, which requires that significant changes be made to the telephones. The preferred embodiments disclosed herein do not require any changes to wireless telephones, and so they can be used in connection with the current installed base of over 65 million wireless telephones in the U.S. and 250 million wireless telephones worldwide.

SUMMARY OF THE INVENTION

The present invention provides an antenna selection method for use in a wireless location system that determines the geographic location of a mobile wireless transmitter. The wireless location system includes signal collection systems connected to multiple antennas at a plurality of cell sites and a location processor for processing digital data provided by the signal collection systems. The antenna selection method comprises evaluating segments of data collected from a plurality of antennas at a signal collection system, selecting a subset of the segments of data, and using only the selected segments of data in location processing.

In addition, the present invention provides an antenna port selection method for use in a wireless location system. The method includes selecting segments of data collected from a plurality of antenna ports at a candidate signal collection system receiving transmissions from multiple antennas via corresponding antenna ports. One of the antenna ports is selected as a best port. The segments of data from the best antenna port are used in location processing.

The present invention encompasses a baseline selection method and system. According to this aspect of the invention, TDOA data is determined with respect to a plurality of first signal collection system/antenna—second signal collection system/antenna baselines. A method for selecting baselines for use in location processing comprises calculating a number of parameters for each of the plurality of baselines, and including in a final location solution only those baselines meeting or exceeding predefined threshold criteria for each of the parameters.

Other details of the invention are described below.

BRIEF DESCRIPTION OF THE DRAWINGS

FIG. 2C-1 is a flowchart of a process employed by the Wireless Location System when using narrowband receiver modules.

FIG. 2E-1 is a flowchart of the process employed by the DSP modules for detecting active channels.

FIG. 2G is a schematic illustration of baselines and error values used to explain an external calibration method in accordance with the present invention. FIG. 2H is a flowchart of an internal calibration method. FIG. 2I is an exemplary transfer function of an AMPS control channel and FIG. 2J depicts an exemplary comb signal.

FIGS. 10A and 10B are flowcharts of alternative methods for increasing the bandwidth of a transmitted signal to improve location accuracy.

DETAILED DESCRIPTION OF PREFERRED EMBODIMENTS

The Wireless Location System (Wireless Location System) operates as a passive overlay to a wireless communications system, such as a cellular, PCS, or ESMR system, although the concepts are not limited to just those types of communications systems. Wireless communications systems are generally not suitable for locating wireless devices because the designs of the wireless transmitters and cell sites do not include the necessary functionality to achieve accurate location. Accurate location in this application is defined as accuracy of 100 to 400 feet RMS (root mean square). This is distinguished from the location accuracy that can be achieved by existing cell sites, which is generally limited to the radius of the cell site. In general, cell sites are not designed or programmed to cooperate between and among themselves to determine wireless transmitter location. Additionally, wireless transmitters such as cellular and PCS telephones are designed to be low cost and therefore generally do not have locating capability built-in. The Wireless Location System is designed to be a low cost addition to a wireless communications system that involves minimal changes to cell sites and no changes at all to standard wireless transmitters. The Wireless Location System is passive because the it does not contain transmitters, and therefore cannot cause interference of any kind to the wireless communications system. The Wireless Location System uses only its own specialized receivers at cell sites or other receiving locations.

Overview of Wireless Location System (Wireless Location System)

Figure 1:
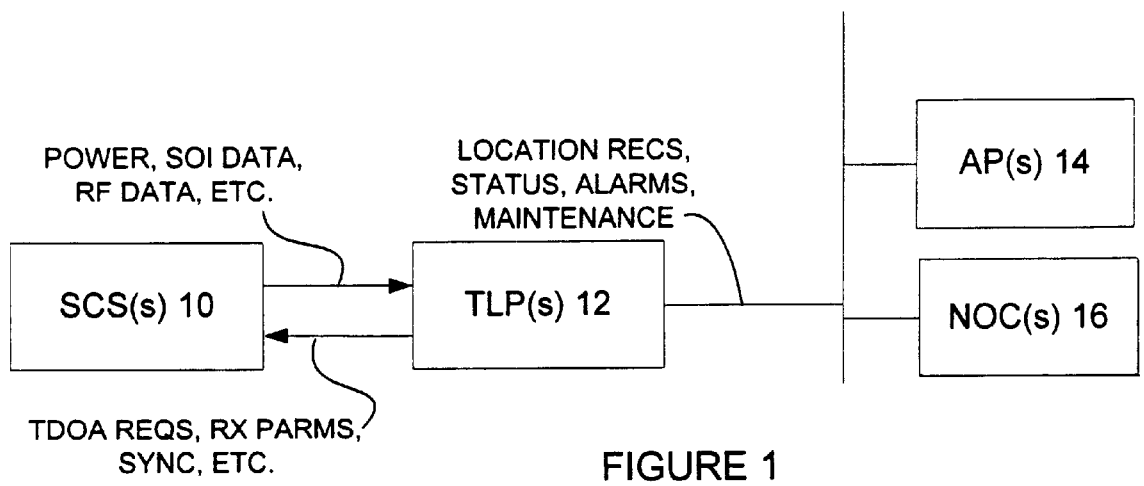
FIGS. 1 and 1A schematically depict a Wireless Location System in accordance with the present invention.

As shown in FIG. 1, the Wireless Location System has four major kinds of subsystems: the Signal Collection Systems (SCS's) 10, the TDOA Location Processors (TLP's) 12, the Application Processors (AP's) 14, and the Network Operations Console (NOC) 16. Each SCS is responsible for receiving the RF signals transmitted by the wireless transmitters on both control channels and voice channels. In general, each SCS is preferably installed at a wireless carrier's cell site, and therefore operates in parallel to a base station. Each TLP 12 is responsible for managing a network of SCS's 10 and for providing a centralized pool of digital signal processing (DSP) resources that can be used in the location calculations. The SCS's 10 and the TLP's 12 operate together to determine the location of the wireless transmitters, as will be discussed more fully below. Digital signal processing is the preferable manner in which to process radio signals because DSP's are relatively low cost, provide consistent performance, and are easily re-programmable to handle many different tasks. Both the SCS's 10 and TLP's 12 contain a significant amount of DSP resources, and the software in these systems can operate dynamically to determine where to perform a particular processing function based upon tradeoffs in processing time, communications time, queuing time, and cost. Each TLP 12 exists centrally primarily to reduce the overall cost of implementing the Wireless Location System, although the techniques discussed herein are not limited to the preferred architecture shown. That is, DSP resources can be relocated within the Wireless Location System without changing the basic concepts and functionality disclosed.

The AP's 14 are responsible for managing all of the resources in the Wireless Location System, including all of the SCS's 10 and TLP's 12. Each AP 14 also contains a specialized database that contains "triggers" for the Wireless Location System. In order to conserve resources, the Wireless Location System can be programmed to locate only certain pre-determined types of transmissions. When a transmission of a pre-determined type occurs, then the Wireless Location System is triggered to begin location processing. Otherwise, the Wireless Location System may be programmed to ignore the transmission. Each AP 14 also contains applications interfaces that permit a variety of applications to securely access the Wireless Location System. These applications may, for example, access location records in real time or non-real time, create or delete certain type of triggers, or cause the Wireless Location System to take other actions. Each AP 14 is also capable of certain post-processing functions that allow the AP 14 to combine a number of location records to generate extended reports or analyses useful for applications such as traffic monitoring or RF optimization.

The NOC 16 is a network management system that provides operators of the Wireless Location System easy access to the programming parameters of the Wireless Location System. For example, in some cities, the Wireless Location System may contain many hundreds or even thousands of SCS's 10. The NOC is the most effective way to manage a large Wireless Location System, using graphical user interface capabilities. The NOC will also receive real time alerts if certain functions within the Wireless Location System are not operating properly. These real time alerts can be used by the operator to take corrective action quickly and prevent a degradation of location service. Experience with trials of the Wireless Location System show that the ability of the system to maintain good location accuracy over time is directly related to the operator's ability to keep the system operating within its predetermined parameters.

Readers of U.S. Pat. Nos. 5,327,144 and 5,608,410 and this specification will note similarities between the respective systems. Indeed, the system disclosed herein is significantly based upon and also significantly enhanced from the system described in those previous patents. For example, the SCS 10 has been expanded and enhanced from the Antenna Site System described in U.S. Pat. No. 5,608,410. The SCS 10 now has the capability to support many more antennas at a single cell site, and further can support the use of extended antennas as described below. This enables the SCS 10 to operate with the sectored cell sites now commonly used. The SCS 10 can also transfer data from multiple antennas at a cell site to the TLP 12 instead of always combining data from multiple antennas before transfer. Additionally, the SCS 10 can support multiple air interface protocols thereby allowing the SCS 10 to function even as a wireless carrier continually changes the configuration of its system.

The TLP 12 is similar to the Central Site System disclosed in U.S. Pat. No. 5,608,410, but has also been expanded and enhanced. For example, the TLP 12 has been made scaleable so that the amount of DSP resources required by each TLP 12 can be appropriately scaled to match the number of locations per second required by customers of the Wireless Location System. In order to support scaling for different Wireless Location System capacities, a networking scheme has been added to the TLP 12 so that multiple TLP's 12 can cooperate to share RF data across wireless communication system network boundaries. Additionally, the TLP 12 has been given control means to determine the SCS's 10, and more importantly the antennas at each of the SCS's 10, from which the TLP 12 is to receive data in order to process a specific location. Previously, the Antenna Site Systems automatically forwarded data to the Central Site System, whether requested or not by the Central Site System. Furthermore, the SCS 10 and TLP 12 combined have been designed with additional means for removing multipath from the received transmissions.

The Database Subsystem of the Central Site System has been expanded and developed into the AP 14. The AP 14 can support a greater variety of applications than previously disclosed in U.S. Pat. No. 5,608,410, including the ability to post-process large volumes of location records from multiple wireless transmitters. This post-processed data can yield, for example, very effective maps for use by wireless carriers to improve and optimize the RF design of the communications systems. This can be achieved, for example, by plotting the locations of all of the callers in an area and the received signal strengths at a number of cell sites. The carrier can then determine whether each cell site is, in fact, serving the exact coverage area desired by the carrier. The AP 14 can also now store location records anonymously, that is, with the MIN and/or other identity information removed from the location record, so that the location record can be used for RF optimization or traffic monitoring without causing concerns about an individual user's privacy.

Figure 1A:
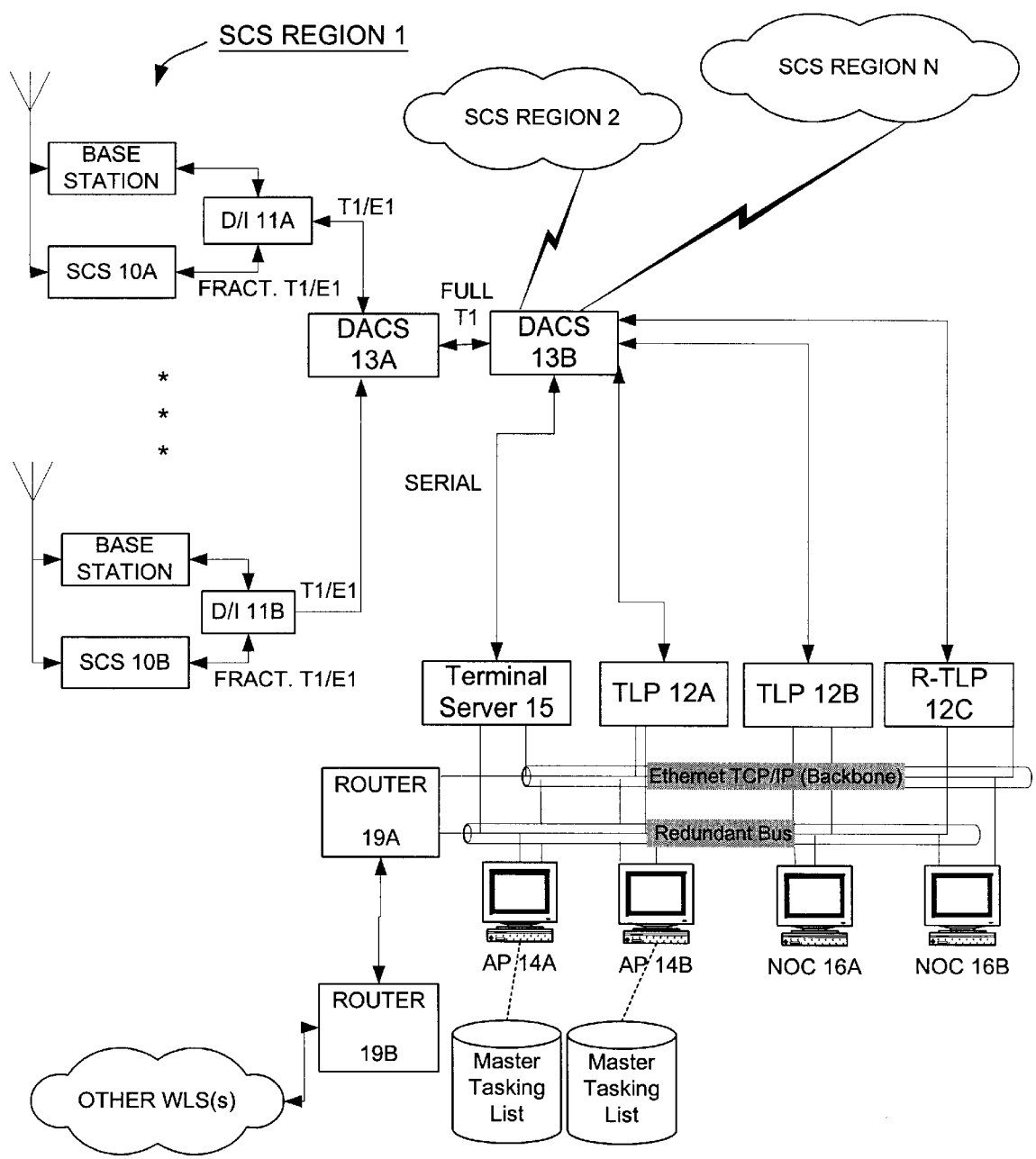

As shown in FIG. 1A, a presently preferred implementation of the Wireless Location System includes a plurality of SCS regions each of which comprises multiple SCS's 10. For example, "SCS Region 1" includes SCS's 10A and 10B (and preferably others, not shown) that are located at respective cell sites and share antennas with the base stations at those cell sites. Drop and insert units 11A and 11B are used to interface fractional T1/E1 lines to full T1/E1 lines, which in turn are coupled to a digital access and control system (DACS) 13A. The DACS 13A and another DACS 13B are used in the manner described more fully below for communications between the SCS's 10A, 10B, etc., and multiple TLP's 12A, 12B, etc. As shown, the TLP's are typically collocated and interconnected via an Ethernet network (backbone) and a second, redundant Ethernet network. Also coupled to the Ethernet networks are multiple AP's 14A and 14B, multiple NOC's 16A and 16B, and a terminal server 15. Routers 19A and 19B are used to couple one Wireless Location System to one or more other Wireless Location System(s).

Signal Collection System 10

Generally, cell sites will have one of the following antenna configurations: (i) an omnidirectional site with 1 or 2 receive antennas or (ii) a sectored site with 1, 2, or 3 sectors, and with 1 or 2 receive antennas used in each sector. As the number of cell sites has increased in the U.S. and internationally, sectored cell sites have become the predominant configuration. However, there are also a growing number of micro-cells and pico-cells, which can be omnidirectional. Therefore, the SCS 10 has been designed to be configurable for any of these typical cell sites and has been provided with mechanisms to employ any number of antennas at a cell site.

Figure 2:
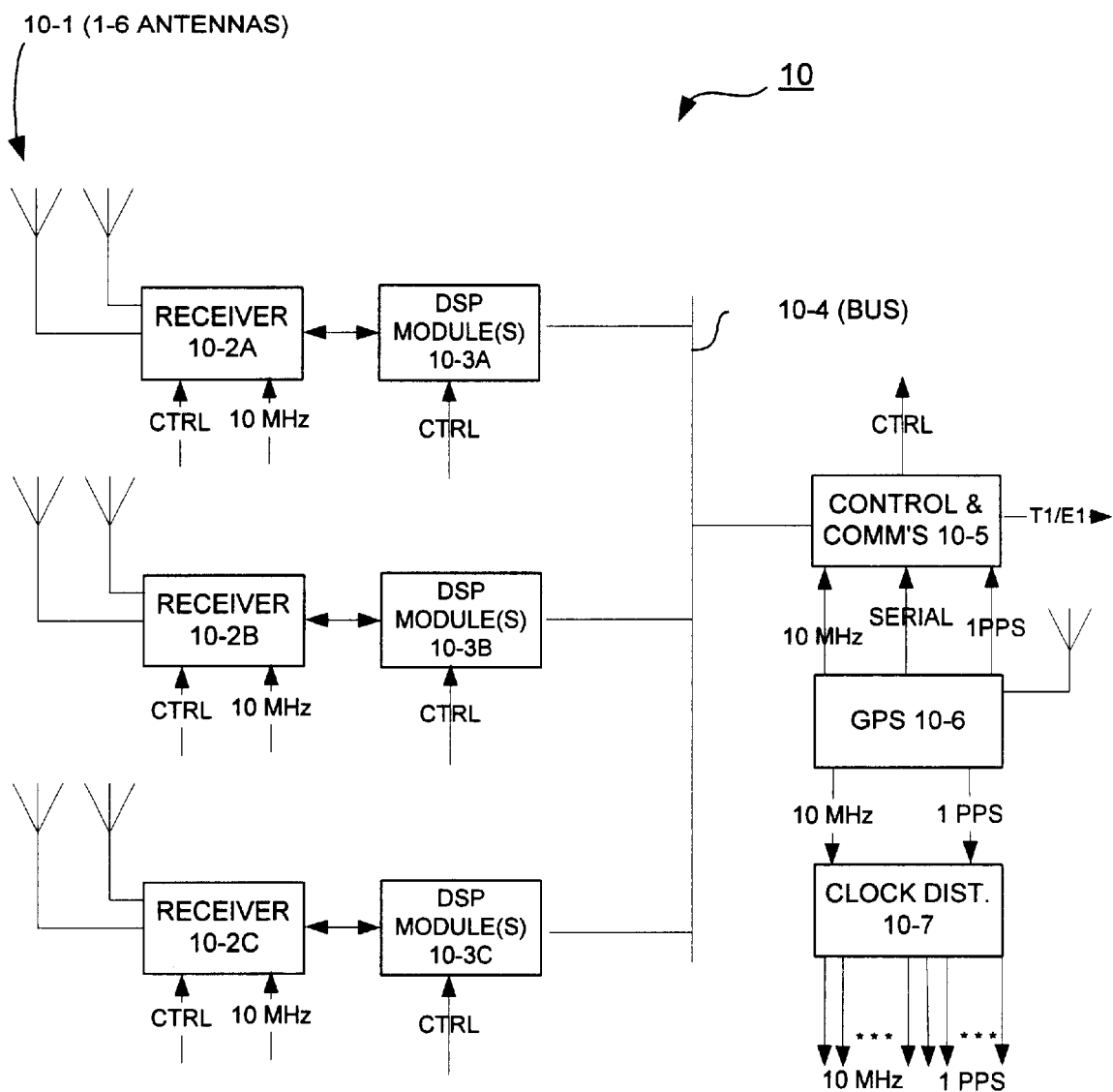
FIG. 2 schematically depicts a Signal Collection System (SCS) 10 in accordance with the present invention.

The basic architectural elements of the SCS 10 remain the same as for the Antenna Site System described in U.S. Pat. No. 5,608,410, but several enhancements have been made to increase the flexibility of the SCS 10 and to reduce the commercial deployment cost of the system. The most presently preferred embodiment of the SCS 10 is described herein. The SCS 10, an overview of which is shown in FIG. 2, includes digital receiver modules 10-2A through 10-2C; DSP modules 10-3A through 10-3C; a serial bus 10-4, a control and communications module 10-5; a GPS module 10-6; and a clock distribution module 10-7.

The SCS 10 has the following external connections: power, fractional T1/E1 communications, RF connections to antennas, and a GPS antenna connection for the timing generation (or clock distribution) module 10-7. The architecture and packaging of the SCS 10 permit it to be physically collocated with cell sites (which is the most common installation place), located at other types of towers (such as FM, AM, two-way emergency communications, television, etc.), or located at other building structures (such as rooftops, silos, etc.).

Timing Generation

The Wireless Location System depends upon the accurate determination of time at all SCS's 10 contained within a network. Several different timing generation systems have been described in previous disclosures, however the most presently preferred embodiment is based upon an enhanced GPS receiver 10-6. The enhanced GPS receiver differs from most traditional GPS receivers in that the receiver contains algorithms that remove some of the timing instability of the GPS signals, and guarantees that any two SCS's 10 contained within a network can receive timing pulses that are within approximately ten nanoseconds of each other. These enhanced GPS receivers are now commercially available, and further reduce some of the time reference related errors that were observed in previous implementations of wireless location systems. While this enhanced GPS receiver can produce a very accurate time reference, the output of the receiver may still have an unacceptable phase noise. Therefore, the output of the receiver is input to a low phase noise, crystal oscillator-driven phase locked loop circuit that can now produce 10 MHz and one pulse per second (PPS) reference signals with less than 0.01 degrees RMS of phase noise, and with the pulse output at any SCS 10 in a Wireless Location System network within ten nanoseconds of any other pulse at another SCS 10. This combination of enhanced GPS receiver, crystal oscillator, and phase locked loop is now the most preferred method to produce stable time and frequency reference signals with low phase noise.

The SCS 10 has been designed to support multiple frequency bands and multiple carriers with equipment located at the same cell site. This can take place by using multiple receivers internal to a single SCS chassis, or by using multiple chassis each with separate receivers. In the event that multiple SCS chassis are placed at the same cell site, the SCS's 10 can share a single timing generation/clock distribution circuit 10-7 and thereby reduce overall system cost. The 10 MHz and one PPS output signals from the timing generation circuit are amplified and buffered internal to the SCS 10, and then made available via external connectors. Therefore a second SCS can receive its timing from a first SCS using the buffered output and the external connectors. These signals can also be made available to base station equipment collocated at the cell site. This might be useful to the base station, for example, in improving the frequency re-use pattern of a wireless communications system.

Receiver Module 10-2 (Wideband Embodiment)

When a wireless transmitter makes a transmission, the Wireless Location System must receive the transmission at multiple SCS's 10 located at multiple geographically dispersed cell sites. Therefore, each SCS 10 has the ability to receive a transmission on any RF channel on which the transmission may originate. Additionally, since the SCS 10 is capable of supporting multiple air interface protocols, the SCS 10 also supports multiple types of RF channels. This is in contrast to most current base station receivers, which typically receive only one type of channel and are usually capable of receiving only on select RF channels at each cell site. For example, a typical TDMA base station receiver will only support 30 KHz wide channels, and each receiver is programmed to receive signals on only a single channel whose frequency does not change often (i.e. there is a relatively fixed frequency plan). Therefore, very few TDMA base station receivers would receive a transmission on any given frequency. As another example, even though some GSM base station receivers are capable of frequency hopping, the receivers at multiple base stations are generally not capable of simultaneously tuning to a single frequency for the purpose of performing location processing. In fact, the receivers at GSM base stations are programmed to frequency hop to avoid using an RF channel that is being used by another transmitter so as to minimize interference.

Figure 2A:
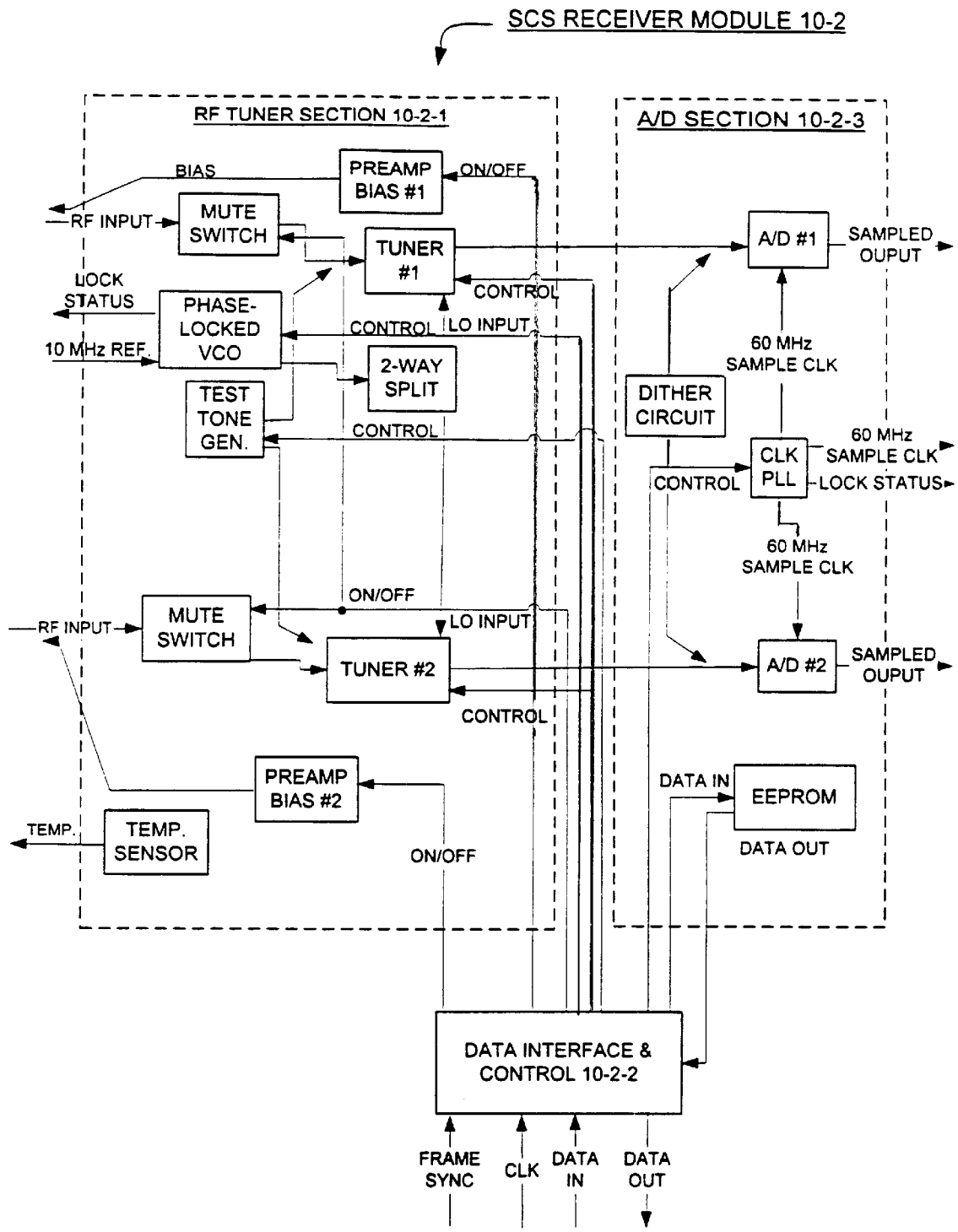
FIG. 2A schematically depicts a receiver module 10-2 employed by the Signal Collection System.

The SCS receiver module 10-2 is preferably a dual wideband digital receiver that can receive the entire frequency band and all of the RF channels of an air interface. For cellular systems in the U.S., this receiver module is either 15 MHz wide or 25 MHz wide so that all of the channels of a single carrier or all of the channels of both carriers can be received. This receiver module has many of the characteristics of the receiver previously described in U.S. Pat. No. 5,608,410, and FIG. 2A is a block diagram of the currently preferred embodiment. Each receiver module contains an RF tuner section 10-2-1, a data interface and control section 10-2-2 and an analog to digital conversion section 10-2-3. The RF tuner section 10-2-1 includes two full independent digital receivers (including Tuner #1 and Tuner #2) that convert the analog RF input from an external connector into a digitized data stream. Unlike most base station receivers, the SCS receiver module does not perform diversity combining or switching. Rather, the digitized signal from each independent receiver is made available to the location processing. The present inventors have determined that there is an advantage to the location processing, and especially the multipath mitigation processing, to independently process the signals from each antenna rather than perform combining on the receiver module.

The receiver module 10-2 performs, or is coupled to elements that perform, the following functions: automatic gain control (to support both nearby strong signals and far away weak signals), bandpass filtering to remove potentially interfering signals from outside of the RF band of interest, synthesis of frequencies needed for mixing with the RF signals to create an IF signal that can be sampled, mixing, and analog to digital conversion (ADC) for sampling the RF signals and outputting a digitized data stream having an appropriate bandwidth and bit resolution. The frequency synthesizer locks the synthesized frequencies to the 10 MHz reference signal from the clock distribution/timing generation module 10-7 (FIG. 2). All of the circuits used in the receiver module maintain the low phase noise characteristics of the timing reference signal. The receiver module preferably has a spurious free dynamic range of at least 80 dB.

The receiver module 10-2 also contains circuits to generate test frequencies and calibration signals, as well as test ports where measurements can be made by technicians during installation or troubleshooting. Various calibration processes are described in further detail below. The internally generated test frequencies and test ports provide an easy method for engineers and technicians to rapidly test the receiver module and diagnose any suspected problems. This is also especially useful during the manufacturing process.

Figure 2B:
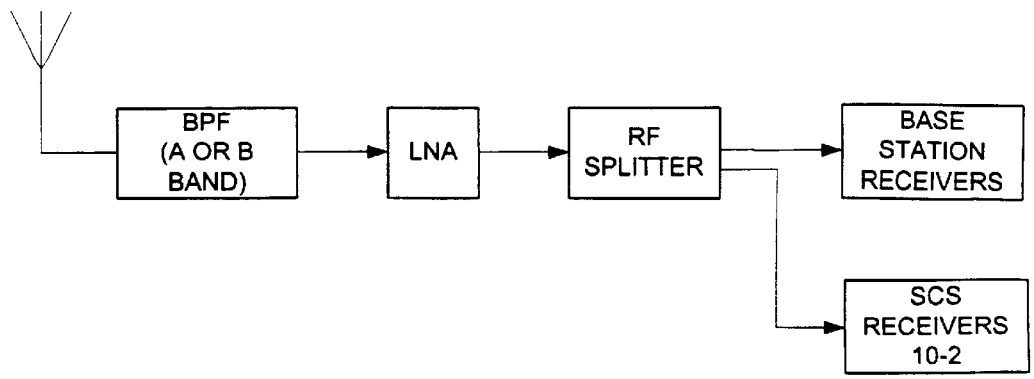
FIGS. 2B and 2C schematically depict alternative ways of coupling the receiver module(s) 10-2 to the antennas 10-1.
Figure 2C:
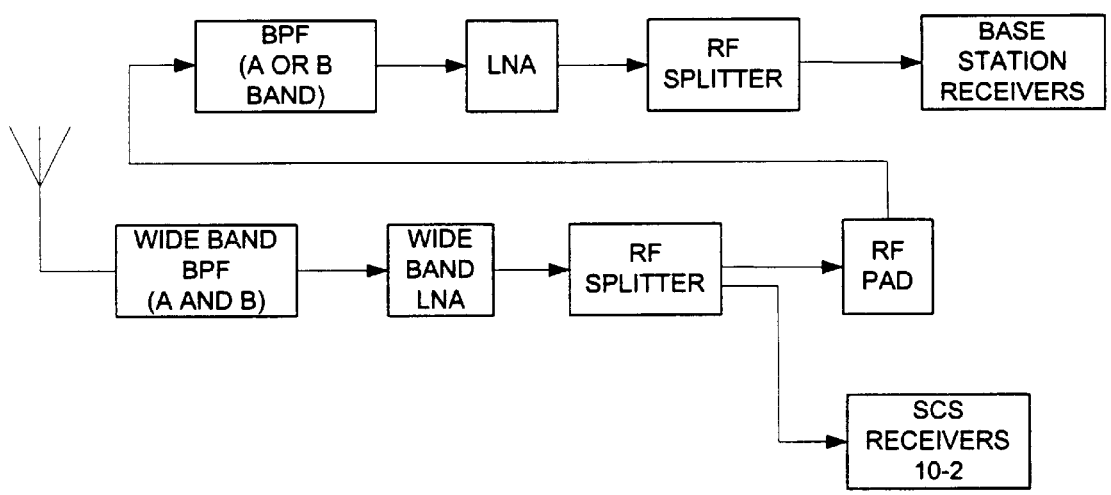
Figures 1, 2C:
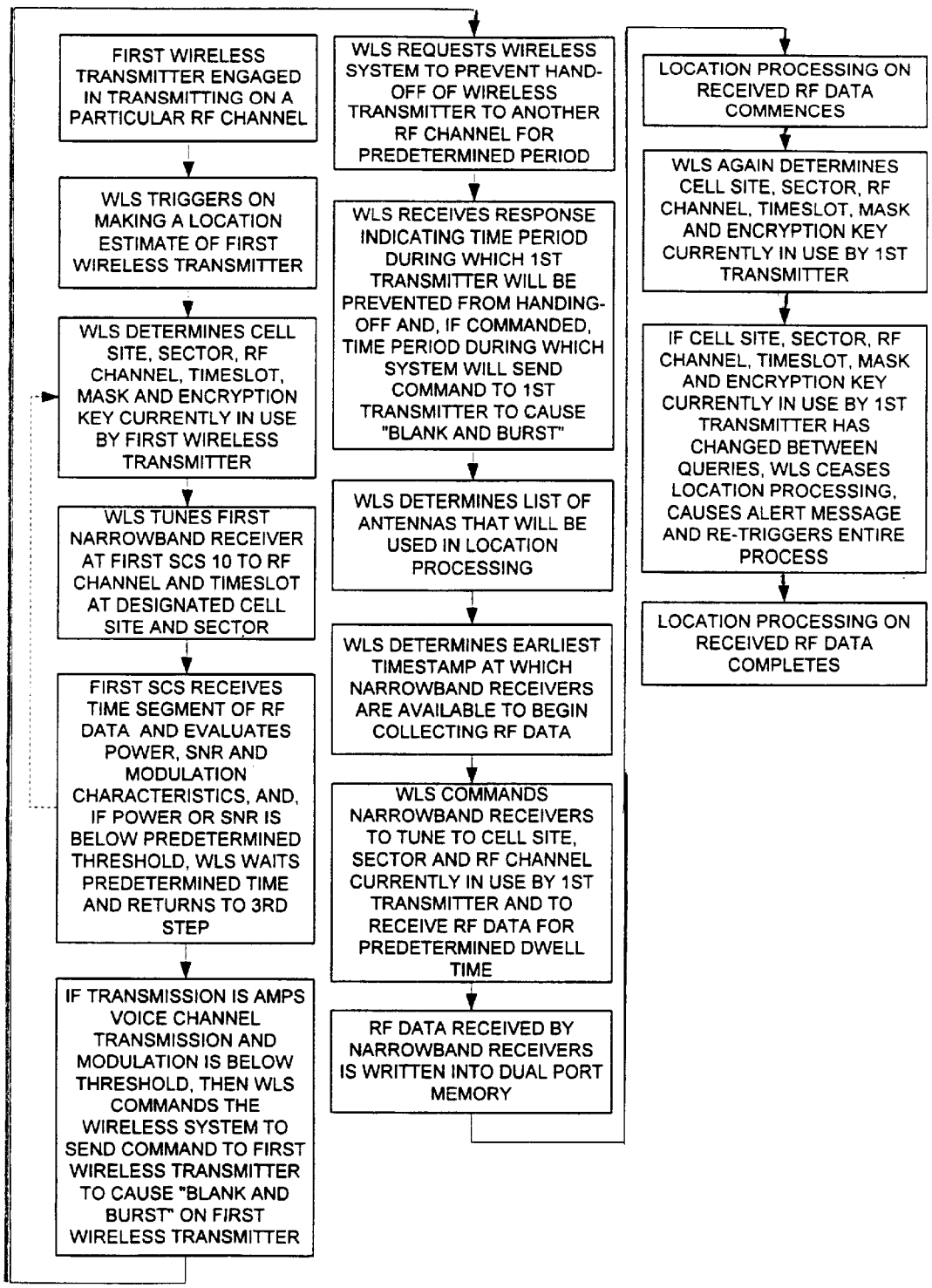

One of the advantages of the Wireless Location System described herein is that no new antennas are required at cell sites. The Wireless Location System can use the existing antennas already installed at most cell sites, including both omni-directional and sectored antennas. This feature can result in significant savings in the installation and maintenance costs of the Wireless Location System versus other approaches that have been described in the prior art. The SCS's digital receivers 10-2 can be connected to the existing antennas in two ways, as shown in FIGS. 2B and 2C, respectively. In FIG. 2B, the SCS receivers 10-2 are connected to the existing cell site multi-coupler or RF splitter. In this manner, the SCS 10 uses the cell site's existing low noise pre-amplifier, band pass filter, and multi-coupler or RF splitter. This type of connection usually limits the SCS 10 to supporting the frequency band of a single carrier. For example, an A-side cellular carrier will typically use the band pass filter to block signals from customers of the B-side carrier, and vice versa.

In FIG. 2C, the existing RF path at the cell site has been interrupted, and a new pre-amplifier, band pass filter, and RF splitter has been added as part of the Wireless Location System. The new band pass filter will pass multiple contiguous frequency bands, such as both the A-side and B-side cellular carriers, thereby allowing the Wireless Location System to locate wireless transmitters using both cellular systems but using the antennas from a single cell site. In this configuration, the Wireless Location System uses matched RF components at each cell site, so that the phase versus frequency responses are identical. This is in contrast to existing RF components, which may be from different manufacturers or using different model numbers at various cell sites. Matching the response characteristics of RF components reduces a possible source of error for the location processing, although the Wireless Location System has the capability to compensate for these sources of error. Finally, the new pre-amplifier installed with the Wireless Location System will have a very low noise figure to improve the sensitivity of the SCS 10 at a cell site. The overall noise figure of the SCS digital receivers 10-2 is dominated by the noise figure of the low noise amplifiers. Because the Wireless Location System can use weak signals in location processing, whereas the base station typically cannot process weak signals, the Wireless Location System can significantly benefit from a high quality, very low noise amplifier.

In order to improve the ability of the Wireless Location System to accurately determine TDOA for a wireless transmission, the phase versus frequency response of the cell site's RF components are determined at the time of installation and updated at other certain times and then stored in a table in the Wireless Location System. This can be important because, for example, the band pass filters and/or multi-couplers made by some manufacturers have a steep and non-linear phase versus frequency response near the edge of the pass band. If the edge of the pass band is very near to or coincident with the reverse control or voice channels, then the Wireless Location System would make incorrect measurements of the transmitted signal's phase characteristics if the Wireless Location System did not correct the measurements using the stored characteristics. This becomes even more important if a carrier has installed multi-couplers and/or band pass filters from more than one manufacturer, because the characteristics at each site may be different. In addition to measuring the phase versus frequency response, other environmental factors may cause changes to the RF path prior to the ADC. These factors require occasional and sometimes periodic calibration in the SCS 10.

Alternative Narrowband Embodiment of Receiver Module 10-2

In addition or as an alternative to the wideband receiver module, the SCS 10 also supports a narrowband embodiment of the receiver module 10-2. In contrast to the wideband receiver module that can simultaneously receive all of the RF channels in use by a wireless communications system, the narrowband receiver can only receive one or a few RF channels at a time. For example, the SCS 10 supports a 60 KHz narrowband receiver for use in AMPS/TDMA systems, covering two contiguous 30 KHz channels. This receiver is till a digital receiver as described for the wideband module, however the frequency synthesizing and mixing circuits are used to dynamically tune the receiver module to various RF channels on command. This dynamic tuning can typically occur in one millisecond or less, and the receiver can dwell on a specific RF channel for as long as required to receive and digitize RF data for location processing.

The purpose of the narrowband receiver is to reduce the implementation cost of a Wireless Location System from the cost that is incurred with wideband receivers. Of course, there is some loss of performance, but the availability of these multiple receivers permits wireless carriers to have more cost/performance options. Additional inventive functions and enhancements have been added to the Wireless Location System to support this new type of narrowband receiver. When the wideband receiver is being used, all RF channels are received continuously at all SCS's 10, and subsequent to the transmission, the Wireless Location System can use the DSP's 10-3 (FIG. 2) to dynamically select any RF channel from the digital memory. With the narrowband receiver, the Wireless Location System must ensure a priori that the narrowband receivers at multiple cell sites are simultaneously tuned to the same RF channel so that all receivers can simultaneously receive, digitize and store the same wireless transmission. For this reason, the narrowband receiver is generally used only for locating voice channel transmissions, which can be known a priori to be making a transmission. Since control channel transmissions can occur asynchronously at any time, the narrowband receiver may not be tuned to the correct channel to receive the transmission.

When the narrowband receivers are used for locating AMPS voice channel transmissions, the Wireless Location System has the ability to temporarily change the modulation characteristics of the AMPS wireless transmitter to aid location processing. This may be necessary because AMPS voice channels are only FM modulated with the addition of a low level supervisory tone known as SAT. As is known in the art, the Cramer-Rao lower bound of AMPS FM modulation is significantly worse than the Manchester encoded FSK modulation used for AMPS reverse channels and "blank and burst" transmissions on the voice channel. Further, AMPS wireless transmitters may be transmitting with significantly educed energy if there is no modulating input signal (i.e., no one is speaking). To improve the location estimate by improving the modulation characteristics without depending on the existence or amplitude of an input modulating signal, the Wireless Location System can cause an AMPS wireless transmitter to transmit a "blank and burst" message at a point in time when the narrowband receivers at multiple SCS's 10 are tuned to the RF channel on which the message will be sent. This is further described later.

The Wireless Location System performs the following steps when using the narrowband receiver module (see the flowchart of FIG. 2C-1):

- a first wireless transmitter is a priori engaged in transmitting on a particular RF channel;
- the Wireless Location System triggers to make a location estimate of the first wireless transmitter (the trigger may occur either internally or externally via a command/response interface);
- the Wireless Location System determines the cell site, sector, RF channel, timeslot, long code mask, and encryption key (all information elements may not be necessary for all air interface protocols) currently in use by the first wireless transmitter;

the Wireless Location System tunes an appropriate first narrowband receiver at an appropriate first SCS 10 to the RF channel and timeslot at the designated cell site and sector, where appropriate typically means both available and collocated or in closest proximity;

the first SCS 10 receives a time segment of RF data, typically ranging from a few microseconds to tens of milliseconds, from the first narrowband receiver and evaluates the transmission's power, SNR, and modulation characteristics;

if the transmission's power or SNR is below a predetermined threshold, the Wireless Location System waits a predetermined length of time and then returns to the above third step (where the Wireless Location System determines the cell site, sector, etc.);

if the transmission is an AMPS voice channel transmission and the modulation is below a threshold, then the Wireless Location System commands the wireless communications system to send a command to the first wireless transmitter to cause a "blank and burst" on the first wireless transmitter;

the Wireless Location System requests the wireless communications system to prevent hand-off of the wireless transmitter to another RF channel for a predetermined length of time;

the Wireless Location System receives a response from the wireless communications system indicating the time period during which the first wireless transmitter will be prevented from handing-off, and if commanded, the time period during which the wireless communications system will send a command to the first wireless transmitter to cause a "blank and burst";

the Wireless Location System determines the list of antennas that will be used in location processing (the antenna selection process is described below);

the Wireless Location System determines the earliest Wireless Location System timestamp at which the narrowband receivers connected to the selected antennas are available to begin simultaneously collecting RF data from the RF channel currently in use by the first wireless transmitter;

based upon the earliest Wireless Location System timestamp and the time periods in the response from the wireless communications system, the Wireless Location System commands the narrowband receivers connected to the antennas that will be used in location processing to tune to the cell site, sector, and RF channel currently in use by the first wireless transmitter and to receive RF data for a predetermined dwell time (based upon the bandwidth of the signal, SNR, and integration requirements);

the RF data received by the narrowband receivers are written into the dual port memory;

location processing on the received RF data commences, as described in U.S. Pat. Nos. 5,327,144 and 5,608,410 and in sections below;

the Wireless Location System again determines the cell site, sector, RF channel, timeslot, long code mask, and encryption key currently in use by the first wireless transmitter;

if the cell site, sector, RF channel, timeslot, long code mask, and encryption key currently in use by the first wireless transmitter has changed between queries (i.e. before and after gathering the RF data) the Wireless Location System ceases location processing, causes an alert message that location processing failed because the wireless transmitter changed transmission status during the period of time in which RF data was being received, and re-triggers this entire process;

location processing on the received RF data completes in accordance with the steps described below.

The determination of the information elements including cell site, sector, RF channel, timeslot, long code mask, and encryption key (all information elements may not be necessary for all air interface protocols) is typically obtained by the Wireless Location System through a command/response interface between the Wireless Location System and the wireless communications system.

The use of the narrowband receiver in the manner described above is known as random tuning because the receivers can be directed to any RF channel on command from the system. One advantage to random tuning is that locations are processed only for those wireless transmitters for which the Wireless Location System is triggered. One disadvantage to random tuning is that various synchronization factors, including the interface between the wireless communications system and the Wireless Location System and the latency times in scheduling the necessary receivers throughout the system, can limit the total location processing throughput. For example, in a TDMA system, random tuning used throughout the Wireless Location System will typically limit location processing throughput to about 2.5 locations per second per cell site sector.

Therefore, the narrowband receiver also supports another mode, known as automatic sequential tuning, which can perform location processing at a higher throughput. For example, in a TDMA system, using similar assumptions about dwell time and setup time as for the narrowband receiver operation described above, sequential tuning can achieve a location processing throughput of about 41 locations per second per cell site sector, meaning that all 395 TDMA RF channels can be processed in about 9 seconds. This increased rate can be achieved by taking advantage of, for example, the two contiguous RF channels that can be received simultaneously, location processing all three TDMA timeslots in an RF channel, and eliminating the need for synchronization with the wireless communications system. When the Wireless Location System is using the narrowband receivers for sequential tuning, the Wireless Location System has no knowledge of the identity of the wireless transmitter because the Wireless Location System does not wait for a trigger, nor does the Wireless Location System query the wireless communications system for the identity information prior to receiving the transmission. In this method, the Wireless Location System sequences through every cell site, RF channel and time slot, performs location processing, and reports a location record identifying a time stamp, cell site, RF channel, time slot, and location. Subsequent to the location record report, the Wireless Location System and the wireless communications system match the location records to the wireless communications system's data indicating which wireless transmitters were in use at the time, and which cell sites, RF channels, and time slots were used by each wireless transmitter. Then, the Wireless Location System can retain the location records for wireless transmitters of interest, and discard those location records for the remaining wireless transmitters.

Digital Signal Processor Module 10-3

The SCS digital receiver modules 10-2 output a digitized RF data stream having a specified bandwidth and bit resolution. For example, a 15 MHz embodiment of the wideband receiver may output a data stream containing 60 million samples per second, at a resolution of 14 bits per sample. This RF data stream will contain all of the RF channels that are used by the wireless communications system. The DSP modules 10-3 receive the digitized data stream, and can extract any individual RF channel through digital mixing and filtering. The DSP's can also reduce the bit resolution upon command from the Wireless Location System, as needed to reduce the bandwidth requirements between the SCS 10 and TLP 12. The Wireless Location System can dynamically select the bit resolution at which to forward digitized baseband RF data, based upon the processing requirements for each location. DSP's are used for these functions to reduce the systemic errors that can occur from mixing and filtering with analog components. The use of DSP's allows perfect matching in the processing between any two SCS's 10.

Figure 2D:
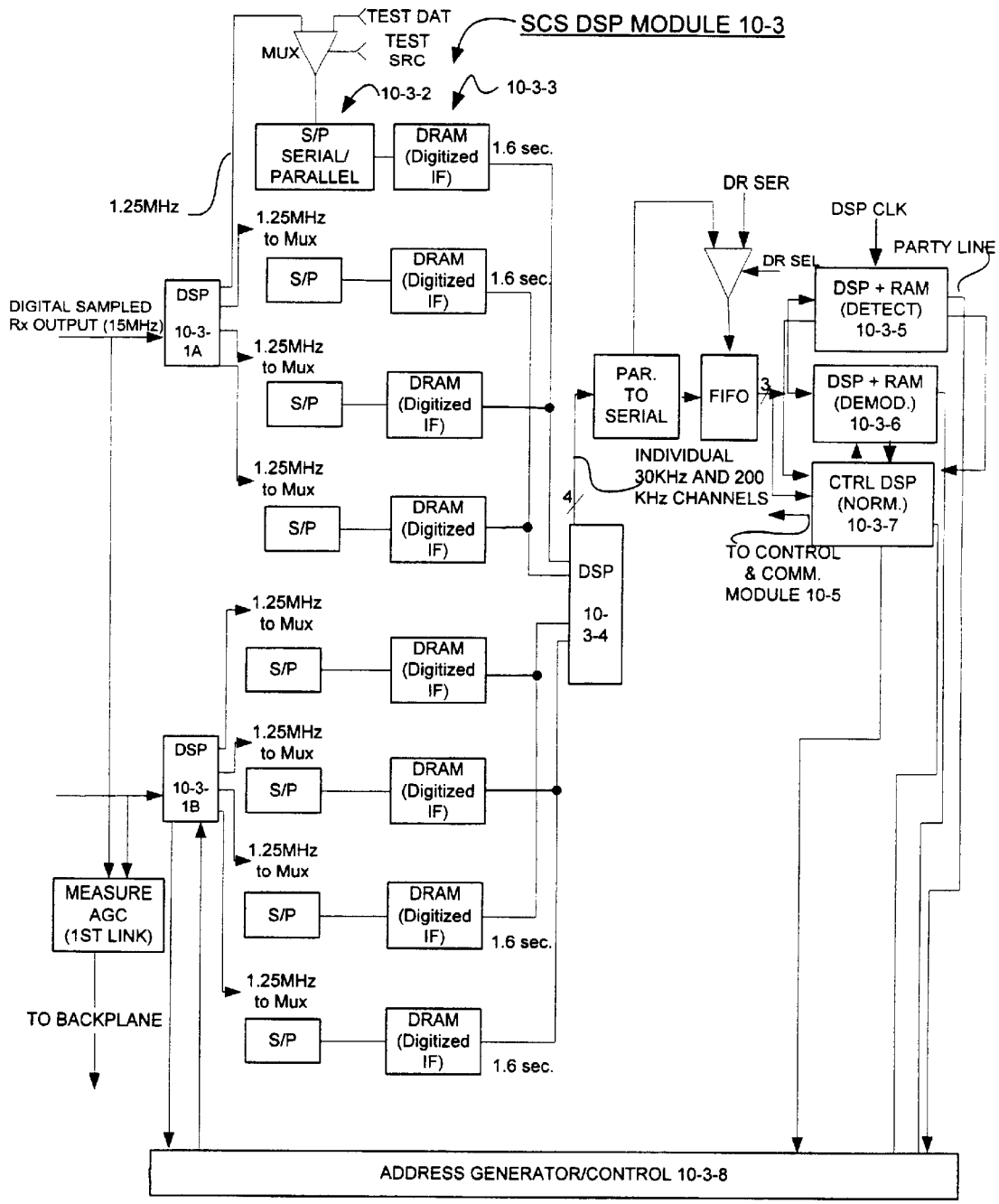
FIG. 2D schematically depicts a DSP module 10-3 employed in the Signal Collection System in accordance with the present invention.
Figure 2E:
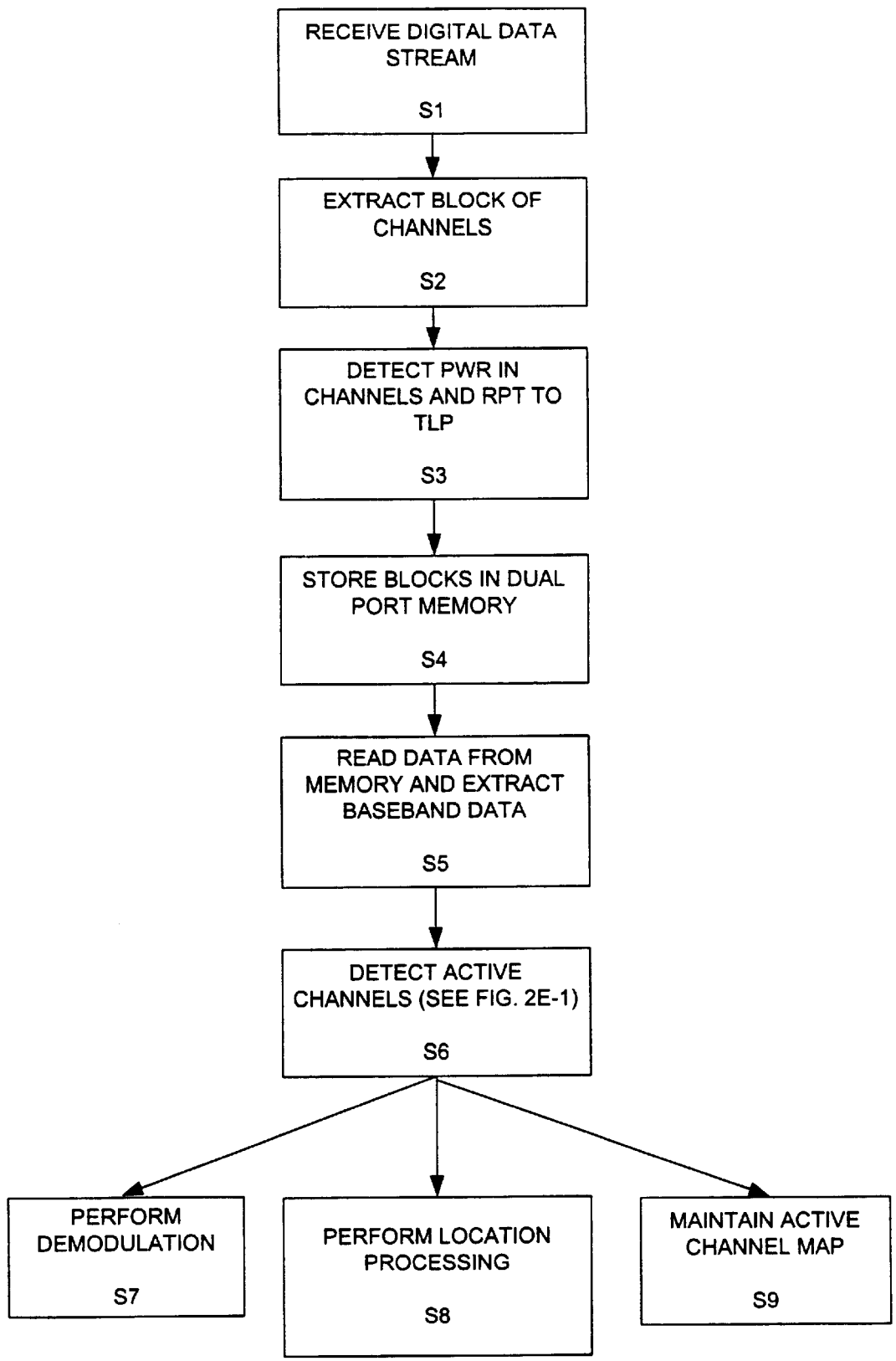
FIG. 2E is a flowchart of the operation of the DSP module(s) 10-3.
Figures 1, 2E:
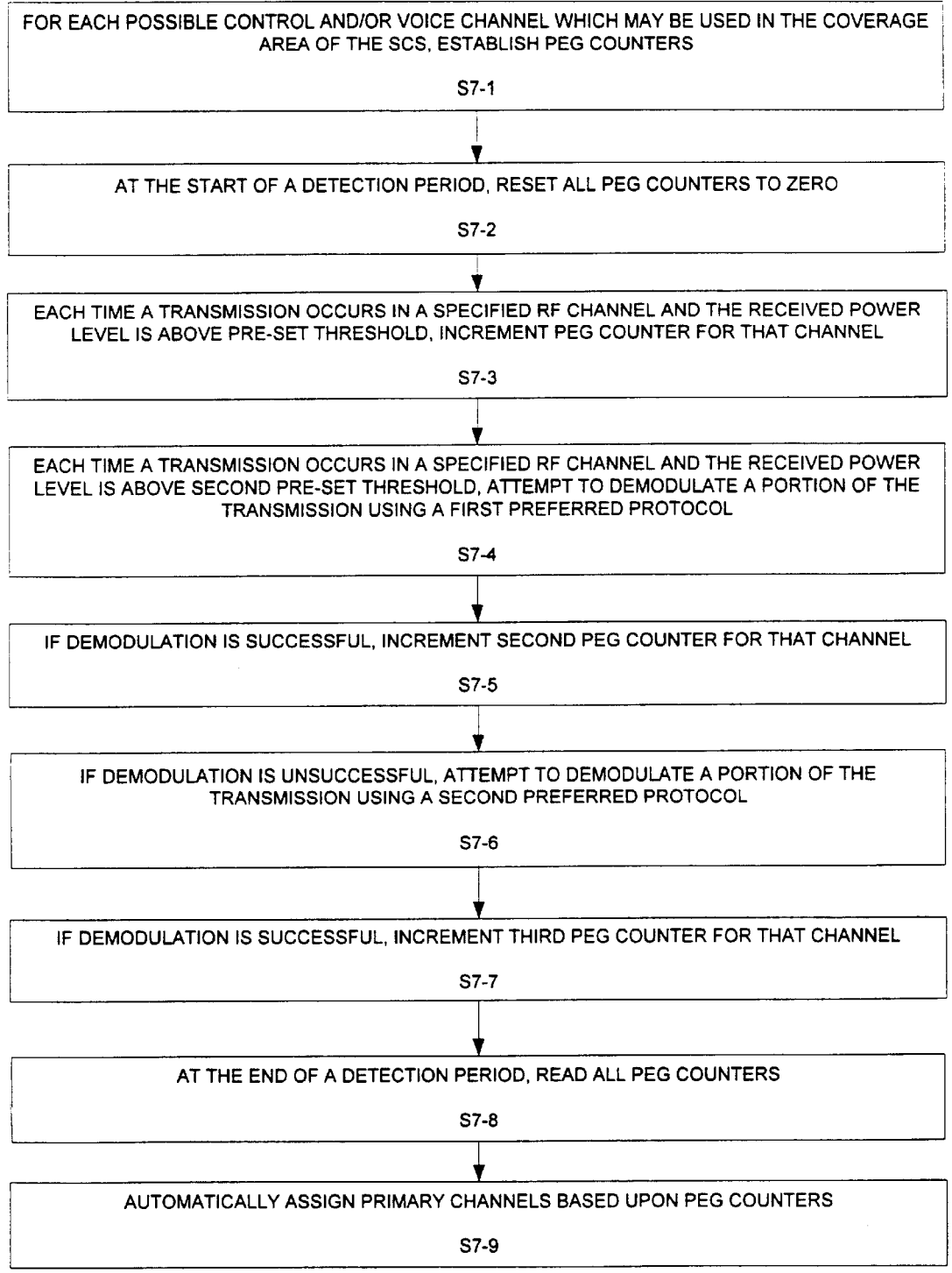

A block diagram of the DSP module 10-3 is shown is FIG. 2D, and the operation of the DSP module is depicted by the flowchart of FIG. 2E. As shown in FIG. 2D, the DSP module 10-3 comprises the following elements: a pair of DSP elements 10-3-1A and 10-31-1B, referred to collectively as a "first" DSP; serial to parallel converters 10-3-2; dual port memory elements 10-3-3; a second DSP 10-3-4; a parallel to serial converter; a FIFO buffer; a DSP 10-3-5 (including RAM) for detection, another DSP 10-3-6 for demodulation, and another DSP 10-3-7 for normalization and control; and an address generator 10-3-8. In a presently preferred embodiment, the DSP module 10-3 receives the wideband digitized data stream (FIG. 2E, step S1), and uses the first DSP (10-3-1A and 10-3-1-1B) to extract blocks of channels (step S2). For example, a first DSP programmed to operate as a digital drop receiver can extract four blocks of channels, where each block includes at least 1.25 MHz of bandwidth. This bandwidth can include 42 channels of AMPS or TDMA, 6 channels of GSM, or 1 channel of CDMA. The DSP does not require the blocks to be contiguous, as the DSP can independently digitally tune to any set of RF channels within the bandwidth of the wideband digitized data stream. The DSP can also perform wideband or narrow band energy detection on all or any of the channels in the block, and report the power levels by channel to the TLP 12 (step S3). For example, every 10 ms, the DSP can perform wideband energy detection and create an RF spectral map for all channels for all receivers (see step S9). Because this spectral map can be sent from the SCS 10 to the TLP 12 every 10 ms via the communications link connecting the SCS 10 and the TLP 12, a significant data overhead could exist. Therefore, the DSP reduces the data overhead by companding the data into a finite number of levels. Normally, for example, 84 dB of dynamic range could require 14 bits. In the companding process implemented by the DSP, the data is reduced, for example, to only 4 bits by selecting 16 important RF spectral levels to send to the TLP 12. The choice of the number of levels, and therefore the number of bits, as well as the representation of the levels, can be automatically adjusted by the Wireless Location System. These adjustments are performed to maximize the information value of the RF spectral messages sent to the TLP 12 as well as to optimize the use of the bandwidth available on the communications link between the SCS 10 and the TLP 12.

After conversion, each block of RF channels (each at least 1.25 MHz) is passed through serial to parallel converter 10-3-2 and then stored in dual port digital memory 10-3-3 (step S4). The digital memory is a circular memory, which means that the DSP module begins writing data into the first memory address and then continues sequentially until the last memory address is reached. When the last memory address is reached, the DSP returns to the first memory address and continues to sequentially write data into memory. Each DSP module typically contains enough memory to store several seconds of data for each block of RF channels to support the latency and queuing times in the location process.

In the DSP module, the memory address at which digitized and converted RF data is written into memory is the time stamp used throughout the Wireless Location System and which the location processing references in determining TDOA. In order to ensure that the time stamps are aligned at every SCS 10 in the Wireless Location System, the address generator 10-3-8 receives the one pulse per second signal from the timing generation/clock distribution module 10-7 (FIG. 2). Periodically, the address generator at all SCS's 10 in a Wireless Location System will simultaneously reset themselves to a known address. This enables the location processing to reduce or eliminate accumulated timing errors in the recording of time stamps for each digitized data element.

The address generator 10-3-8 controls both writing to and reading from the dual port digital memory 10-3-3. Writing takes places continuously since the ADC is continuously sampling and digitizing RF signals and the first DSP (10-3-1A and 10-3-1B) is continuously performing the digital drop receiver function. However, reading occurs in bursts as the Wireless Location System requests data for performing demodulation and location processing. The Wireless Location System may even perform location processing recursively on a single transmission, and therefore requires access to the same data multiple times. In order to service the many requirements of the Wireless Location System, the address generator allows the dual port digital memory to be read at a rate faster than the writing occurs. Typically, reading can be performed eight times faster than writing.

The DSP module 10-3 uses the second DSP 10-3-4 to read the data from the digital memory 10-3-3, and then performs a second digital drop receiver function to extract baseband data from the blocks of RF channels (step S5). For example, the second DSP can extract any single 30 KHz AMPS or TDMA channel from any block of RF channels that have been digitized and stored in the memory. Likewise, the second DSP can extract any single GSM channel. The second DSP is not required to extract a CDMA channel, since the channel bandwidth occupies the full bandwidth of the stored RF data. The combination of the first DSP 10-3-1A, 10-3-1B and the second DSP 10-3-4 allows the DSP module to select, store, and recover any single RF channel in a wireless communications system. A DSP module typically will store four blocks of channels. In a dual-mode AMPS/TDMA system, a single DSP module can continuously and simultaneously monitor up to 42 analog reverse control channels, up to 84 digital control channels, and also be tasked to monitor and locate any voice channel transmission. A single SCS chassis will typically support up to three receiver modules 10-2 (FIG. 2), to cover three sectors of two antennas each, and up to nine DSP modules (three DSP modules per receiver permits an entire 15 MHz bandwidth to be simultaneously stored into digital memory). Thus, the SCS 10 is a very modular system than can be easily scaled to match any type of cell site configuration and processing load.

The DSP module 10-3 also performs other functions, including automatic detection of active channels used in each sector (step S6), demodulation (step S7), and station based location processing (step S8). The Wireless Location System maintains an active map of the usage of the RF channels in a wireless communications system (step S9), which enables the Wireless Location System to manage receiver and processing resources, and to rapidly initiate processing when a particular transmission of interest has occurred. The active map comprises a table maintained within the Wireless Location System that lists for each antenna connected to an SCS 10 the primary channels assigned to that SCS 10 and the protocols used in those channels. A primary channel is an RF control channel assigned to a collocated or nearby base station which the base station uses for communications with wireless transmitters. For example, in a typical cellular system with sectored cell sites, there will be one RF control channel frequency assigned for use in each sector. Those control channel frequencies would typically be assigned as primary channels for a collocated SCS 10.

The same SCS 10 may also be assigned to monitor the RF control channels of other nearby base stations as primary channels, even if other SCS's 10 also have the same primary channels assigned. In this manner, the Wireless Location System implements a system demodulation redundancy that ensures that any given wireless transmission has an infinitesimal probability of being missed. When this demodulation redundancy feature is used, the Wireless Location System will receive, detect, and demodulate the same wireless transmission two or more times at more than one SCS 10. The Wireless Location System includes means to detect when this multiple demodulation has occurred and to trigger location processing only once. This function conserves the processing and communications resources of the Wireless Location System, and is further described below. This ability for a single SCS 10 to detect and demodulate wireless transmissions occurring at cell sites not collocated with the SCS 10 permits operators of the Wireless Location System to deploy more efficient Wireless Location System networks. For example, the Wireless Location System may be designed such that the Wireless Location System uses much fewer SCS's 10 than the wireless communications system has base stations.

In the Wireless Location System, primary channels are entered and maintained in the table using two methods: direct programming and automatic detection. Direct programming comprises entering primary channel data into the table using one of the Wireless Location System user interfaces, such as the Network Operations Console 16 (FIG. 1), or by receiving channel assignment data from the Wireless Location System to wireless communications system interface. Alternatively, the DSP module 10-3 also runs a background process known as automatic detection in which the DSP uses spare or scheduled processing capacity to detect transmissions on various possible RF channels and then attempt to demodulate those transmissions using probable protocols. The DSP module can then confirm that the primary channels directly programmed are correct, and can also quickly detect changes made to channels at base station and send an alert to the operator of the Wireless Location System.

The DSP module performs the following steps in automatic detection (see FIG. 2E-1):

for each possible control and/or voice channel which may be used in the coverage area of the SCS 10, peg counters are established (step S7-1);

at the start of a detection period, all peg counters are reset to zero (step S7-2); each time that a transmission occurs in a specified RF channel, and the received power level is above a particular pre-set threshold, the peg counter for that channel is incremented (step S7-3);

each time that a transmission occurs in a specified RF channel, and the received power level is above a second particular pre-set threshold, the DSP module attempts to demodulate a certain portion of the transmission using a first preferred protocol (step S7-4);

if the demodulation is successful, a second peg counter for that channel is incremented (step S7-5);

if the demodulation is unsuccessful, the DSP module attempts to demodulate a portion of the transmission using a second preferred protocol (step S7-6);

if the demodulation is successful, a third peg counter for that channel is incremented (step S7-7);

at the end of a detection period, the Wireless Location System reads all peg counters (step S7-8); and the Wireless Location System automatically assigns primary channels based upon the peg counters (step S7-9).

The operator of the Wireless Location System can review the peg counters and the automatic assignment of primary channels and demodulation protocols, and override any settings that were performed automatically. In addition, if more than two preferred protocols may be used by the wireless carrier, then the DSP module 10-3 can be downloaded with software to detect the additional protocols. The architecture of the SCS 10, based upon wideband receivers 10-2, DSP modules 10-3, and downloadable software permits the Wireless Location System to support multiple demodulation protocols in a single system. There is a significant cost advantage to supporting multiple protocols within the single system, as only a single SCS 10 is required at a cell site. This is in contrast to many base station architectures, which may require different transceiver modules for different modulation protocols. For example, while the SCS 10 could support AMPS, TDMA, and CDMA simultaneously in the same SCS 10, there is no base station currently available that can support this functionality.

The ability to detect and demodulate multiple protocols also includes the ability to independently detect the use of authentication in messages transmitted over the certain air interface protocols. The use of authentication fields in wireless transmitters started to become prevalent within the last few years as a means to reduce the occurrence of fraud in wireless communications systems. However, not all wireless transmitters have implemented authentication. When authentication is used, the protocol generally inserts an additional field into the transmitted message. Frequently this field is inserted between the identity of the wireless transmitter and the dialed digits in the transmitted message. When demodulating a wireless transmission, the Wireless Location System determines the number of fields in the transmitted message, as well as the message type (i.e. registration, origination, page response, etc.). The Wireless Location System demodulates all fields and if extra fields appear to be present, giving consideration to the type of message transmitted, then the Wireless Location System tests all fields for a trigger condition. For example, if the dialed digits "911" appear in the proper place in a field, and the field is located either in its proper place without authentication or its proper place with authentication, then the Wireless Location System triggers normally. In this example, the digits "911" would be required to appear in sequence as "911" or "*911", with no other digits before or after either sequence. This functionality reduces or eliminates a false rigger caused by the digits "911" appearing as part of an authentication field.

The support for multiple demodulation protocols is important for the Wireless Location System to successfully operate because location processing must be quickly triggered when a wireless caller has dialed "911". The Wireless Location System can trigger location processing using two methods: the Wireless Location System will independently demodulate control channel transmissions, and trigger location processing using any number of criteria such as dialed digits, or the Wireless Location System may receive triggers from an external source such as the carrier's wireless communications system. The present inventors have found that independent demodulation by the SCS 10 results in the fastest time to trigger, as measured from the moment that a wireless user presses the "SEND" or "TALK" (or similar) button on a wireless transmitter.

Control and Communications Module 10-5

Figure 2F:
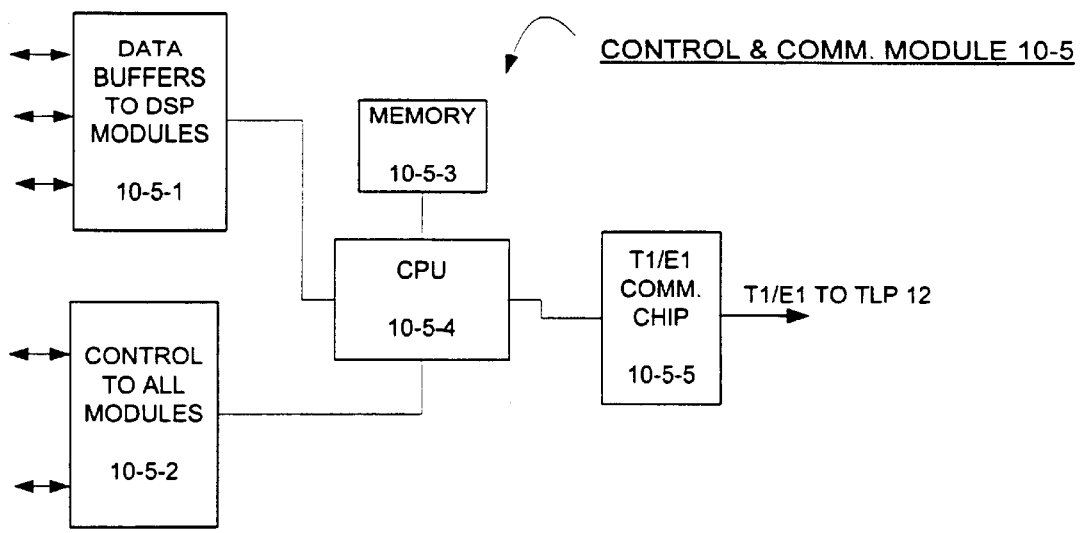
FIG. 2F schematically depicts a Control and Communications Module 10-5 in accordance with the present invention.

The control and communications module 10-5, depicted in FIG. 2F, includes data buffers 10-5-1, a controller 10-5-2, memory 10-5-3, a CPU 10-5-4 and a T1/E1 communications chip 10-5-5. The module has many of the characteristics previously described in U.S. Pat. No. 5,608,410. Several enhancements have been added in the present embodiment. For example, the SCS 10 now includes an automatic remote reset capability, even if the CPU on the control and communications module ceases to execute its programmed software. This capability can reduce the operating costs of the Wireless Location System because technicians are not required to travel to a cell site to reset an SCS 10 if it fails to operate normally. The automatic remote reset circuit operates by monitoring the communications interface between the SCS 10 and the TLP 12 for a particular sequence of bits. This sequence of bits is a sequence that does not occur during normal communications between the SCS 10 and the TLP 12. This sequence, for example, may consist of an all ones pattern. The reset circuit operates independently of the CPU so that even if the CPU has placed itself in a locked or other non-operating status, the circuit can still achieve the reset of the SCS 10 and return the CPU to an operating status.

This module now also has the ability to record and report a wide variety of statistics and variables used in monitoring or diagnosing the performance of the SCS 10. For example, the SCS 10 can monitor the percent capacity usage of any DSP or other processor in the SCS 10, as well as the communications interface between the SCS 10 and the TLP 12. These values are reported regularly to the AP 14 and the NOC 16, and are used to determine when additional processing and communications resources are required in the system. For example, alarm thresholds may be set in the NOC to indicate to an operator if any resource is consistently exceeding a preset threshold. The SCS 10 can also monitor the number of times that transmissions have been successfully demodulated, as well as the number of failures. This is useful in allowing operators to determine whether the signal thresholds for demodulation have been set optimally.

This module, as well as the other modules, can also self-report its identity to the TLP 12. As described below, many SCS's 10 can be connected to a single TLP 12. Typically, the communications between SCS's 10 and TLP's 12 is shared with the communications between base stations and MSC's. It is frequently difficult to quickly determine exactly which SCS's 10 have been assigned to particular circuits. Therefore, the SCS 10 contains a hard coded identity, which is recorded at the time of installation. This identity can be read and verified by the TLP 12 to positively determine which SCS 10 has been assigned by a carrier to each of several different communications circuits.

The SCS to TLP communications supports a variety of messages, including: commands and responses, software download, status and heartbeat, parameter download, diagnostic, spectral data, phase data, primary channel demodulation, and RF data. The communications protocol is designed to optimize Wireless Location System operation by minimizing the protocol overhead and the protocol includes a message priority scheme. Each message type is assigned a priority, and the SCS 10 and the TLP 12 will queue messages by priority such that a higher priority message is sent before a lower priority message is sent. For example, demodulation messages are generally set at a high priority because the Wireless Location System must trigger location processing on certain types of calls (i.e., E9-1-1) without delay. Although higher priority messages are queued before lower priority messages, the protocol generally does not preempt a message that is already in transit. That is, a message in the process of being sent across the SCS 10 to TLP 12 communications interface will be completed fully, but then the next message to be sent will be the highest priority message with the earliest time stamp. In order to minimize the latency of high priority messages, long messages, such as RF data, are sent in segments. For example, the RF data for a full 100-millisecond AMPS transmission may be separated into 10-millisecond segments. In this manner, a high priority message may be queued in between segments of the RF data.

Calibration and Performance Monitoring

The architecture of the SCS 10 is heavily based upon digital technologies including the digital receiver and the digital signal processors. Once RF signals have been digitized, timing, frequency, and phase differences can be carefully controlled in the various processes. More importantly, any timing, frequency, and phase differences can be perfectly matched between the various receivers and various SCS's 10 used in the Wireless Location System. However, prior to the ADC, the RF signals pass through a number of RF components, including antennas, cables, low noise amplifiers, filters, duplexors, multi-couplers, and RF splitters. Each of these RF components has characteristics important to the Wireless Location System, including delay and phase versus frequency response. When the RF and analog components are perfectly matched between the pairs of SCS's 10, such as SCS 10A and SCS 10B in FIG. 2G, then the effects of these characteristics are automatically eliminated in the location processing. But when the characteristics of the components are not matched, then the location processing can inadvertently include instrumental errors resulting from the mismatch. Additionally, many of these RF components can experience instability with power, time, temperature, or other factors that can add instrumental errors to the determination of location. Therefore, several inventive techniques have been developed to calibrate the RF components in the Wireless Location System and to monitor the performance of the Wireless Location System on a regular basis. Subsequent to calibration, the Wireless Location System stores the values of these delays and phases versus frequency response (i.e. by RF channel number) in a table in the Wireless Location System for use in correcting these instrumental errors. FIGS. 2G–2J are referred to below in explaining these calibration methods.

External Calibration Method

Figure 2G:
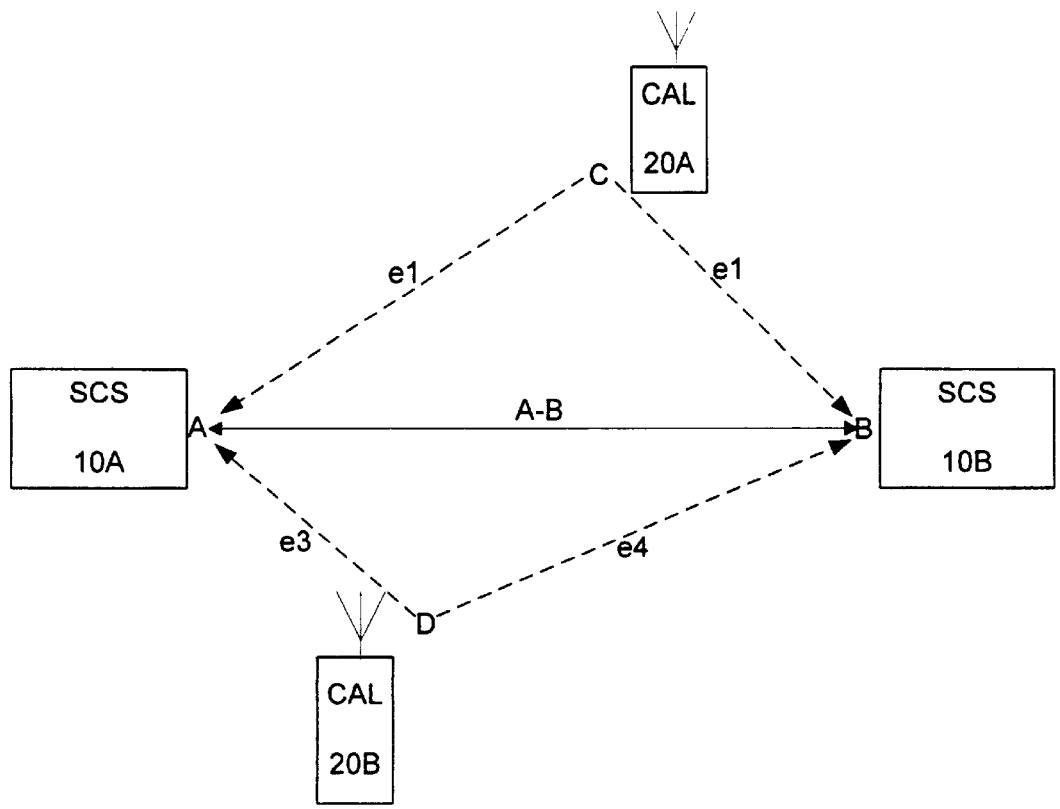
FIGS. 2G–2J depict aspects of the presently preferred SCS calibration methods.

Referring to FIG. 2G, the timing stability of the Wireless Location System is measured along baselines, where each baseline is comprised of two SCS's, 10A and 10B, and an imaginary line (A-B) drawn between them. In a TDOA/FDOA type of Wireless Location System, locations of wireless transmitters are calculated by measuring the differences in the times that each SCS 10 records for the arrival of the signal from a wireless transmitter. Thus, it is important that the differences in times measured by SCS's 10 along any baseline are largely attributed to the transmission time of the signal from the wireless transmitter and minimally attributed to the variations in the RF and analog components of the SCS's 10 themselves. To meet the accuracy goals of the Wireless Location System, the timing stability for any pair of SCS's 10 are maintained at much less than 100 nanoseconds RMS (root mean square). Thus, the components of the Wireless Location System will contribute less than 100 feet RMS of instrumentation error in the estimation of the location of a wireless transmitter. Some of this error is allocated to the ambiguity of the signal used to calibrate the system. This ambiguity can be determined from the well-known Cramer-Rao lower bound equation. In the case of an AMPS reverse control channel, this error is approximately 40 nanoseconds RMS. The remainder of the error budget is allocated to the components of the Wireless Location System, primarily the RF and analog components in the SCS 10.

In the external calibration method, the Wireless Location System uses a network of calibration transmitters whose signal characteristics match those of the target wireless transmitters. These calibration transmitters may be ordinary wireless telephones emitting periodic registration signals and/or page response signals. Each usable SCS-to-SCS baseline is preferably calibrated periodically using a calibration transmitter that has a relatively clear and unobstructed path to both SCS's 10 associated with the baseline. The calibration signal is processed identically to a signal from a target wireless transmitter. Since the TDOA values are known a priori, any errors in the calculations are due to systemic errors in the Wireless Location System. These systemic errors can then be removed in the subsequent location calculations for target transmitters.

FIG. 2G illustrates the external calibration method for minimizing timing errors, As shown, a first SCS 10A at a point "A" and a second SCS 10A at a point "B" have an associated baseline A-B. A calibration signal emitted at time $T_0$ by a calibration transmitter at point "C" will theoretically reach first SCS 10A at time $T_0+T_{AC}$. $T_{AC}$ is a measure of the amount of time required for the calibration signal to travel from the antenna on the calibration transmitter to the dual port digital memory in a digital receiver. Likewise, the same calibration signal will reach second SCS 10B at a theoretical time $T_0+T_{BC}$. Usually, however, the calibration signal will not reach the digital memory and the digital signal processing components of the respective SCS's 10 at exactly the correct times. Rather, there will be errors e1 and e2 in the amount of time (TAC, TBC) it takes the calibration signal to propagate from the calibration transmitter to the SCS's 10, respectively, such that the exact times of arrival are actually $T_0+T_{AC}+e1$ and $T_0+T_{BC}+e2$. Such errors will be due to some extent to delays in the signal propagation through the air, i.e., from the calibration transmitter's antenna to the SCS antennas; however, the errors will be due primarily to time varying characteristics in the SCS front end components. The errors e1 and e2 cannot be determined per se because the system does not know the exact time ($T_0$) at which the calibration signal was transmitted. The system can, however, determine the error in the difference in the time of arrival of the calibration signal at the respective SCS's 10 of any given pair of SCS's 10. This TDOA error value is defined as the difference between the measured TDOA value and the theoretical TDOA value $\tau_0$, where $\tau_0$ is the theoretical differences between the theoretical delay values $T_{AC}$ and $T_{BC}$. Theoretical TDOA values for each pair of SCS's 10 and each calibration transmitter are known because the positions of the SCS's 10 and calibration transmitter, and the speed at which the calibration signal propagates, are known. The measured TDOA baseline ($TDOA_{A-B}$) can be represented as $TDOA_{A-B}=\tau_0+\epsilon$, where $\epsilon=e1-e2$. In a similar manner, a calibration signal from a second calibration transmitter at point "D" will have associated errors e3 and e4. The ultimate value of $\epsilon$ to be subtracted from TDOA measurements for a target transmitter will be a function (e.g., weighted average) of the $\epsilon$ values derived for one or more calibration transmitters. Therefore, a given TDOA measurement ($TDOA_{measured}$) for a pair of SCS's 10 at points "X" and "Y" and a target wireless transmitter at an unknown location will be corrected as follows:

$$TDOA_{X-Y}=TDOA_{measured}-\epsilon$$

$$\epsilon=k1\epsilon1+k2\epsilon2+\ldots kN\epsilon N,$$

where k1, k2, etc., are weighting factors and $\epsilon1$, $\epsilon2$, etc., are the errors determined by subtracting the measured TDOA values from the theoretical values for each calibration transmitter. In this example, error value $\epsilon1$ may the error value associated with the calibration transmitter at point "C" in the drawing. The weighting factors are determined by the operator of the Wireless Location System, and input into the configuration tables for each baseline. The operator will take into consideration the distance from each calibration transmitter to the SCS's 10 at points "X" and "Y", the empirically determined line of sight from each calibration transmitter to the SCS's 10 at points "X" and "Y", and the contribution that each SCS "X" and "Y" would have made to a location estimate of a wireless transmitter that might be located in the vicinity of each calibration transmitter. In general, calibration transmitters that are nearer to the SCS's 10 at points "X" and "Y" will be weighted higher than calibration transmitters that are farther away, and calibration transmitters with better line of sight to the SCS's 10 at points "X" and "Y" will be weighted higher than calibration transmitters with worse line of sight.

Each error component e1, e2, etc., and therefore the resulting error component $\epsilon$, can vary widely, and wildly, over time because some of the error component is due to multipath reflection from the calibration transmitter to each SCS 10. The multipath reflection is very much path dependent and therefore will vary from measurement to measurement and from path to path. It is not an object of this method to determine the multipath reflection for these calibration paths, but rather to determine the portion of the errors that are attributable to the components of the SCS's 10. Typically, therefore, error values e1 and e3 will have a common component since they relate to the same first SCS 10A. Likewise, error values e2 and e4 will also have a common component since they relate to the second SCS 10B. It is known that while the multipath components can vary wildly, the component errors vary slowly and typically vary sinusoidally. Therefore, in the external calibration method, the error values $\epsilon$ are filtered using a weighted, time-based filter that decreases the weight of the wildly varying multipath components while preserving the relatively slow changing error components attributed to the SCS's 10. One such exemplary filter used in the external calibration method is the Kalman filter.

The period between calibration transmissions is varied depending on the error drift rates determined for the SCS components. The period of the drift rate should be much longer than the period of the calibration interval. The Wireless Location System monitors the period of the drift rate to determine continuously the rate of change, and may periodically adjust the calibration interval, if needed. Typically, the calibration rate for a Wireless Location System such as one in accordance with the present invention is between 10 and 30 minutes. This corresponds well with the typical time period for the registration rate in a wireless communications system. If the Wireless Location System were to determine that the calibration interval must be adjusted to a rate faster than the registration rate of the wireless communications system, then the AP 14 (FIG. 1) would automatically force the calibration transmitter to transmit by paging the transmitter at the prescribed interval. Each calibration transmitter is individually addressable and therefore the calibration interval associated with each calibration transmitter can be different.

Since the calibration transmitters used in the external calibration method are standard telephones, the Wireless Location System must have a mechanism to distinguish those telephones from the other wireless transmitters that are being located for various application purposes. The Wireless Location System maintains a list of the identities of the calibration transmitters, typically in the TLP 12 and in the AP 14. In a cellular system, the identity of the calibration transmitter can be the Mobile Identity Number, or MIN. When the calibration transmitter makes a transmission, the transmission is received by each SCS 10 and demodulated by the appropriate SCS 10. The Wireless Location System compares the identity of the transmission with a pre-stored tasking list of identities of all calibration transmitters. If the Wireless Location System determines that the transmission was a calibration transmission, then the Wireless Location System initiates external calibration processing.

Internal Calibration Method

In addition to the external calibration method, it is an object of the present invention to calibrate all channels of the wideband digital receiver used in the SCS 10 of a Wireless Location System. The external calibration method will typically calibrate only a single channel of the multiple channels used by the wideband digital receiver. This is because the fixed calibration transmitters will typically scan to the highest-power control channel, which will typically be the same control channel each time. The transfer function of a wideband digital receiver, along with the other associated components, does not remain perfectly constant, however, and will vary with time and temperature. Therefore, even though the external calibration method can successfully calibrate a single channel, there is no assurance that the remaining channels will also be calibrated.

Figure 2H:
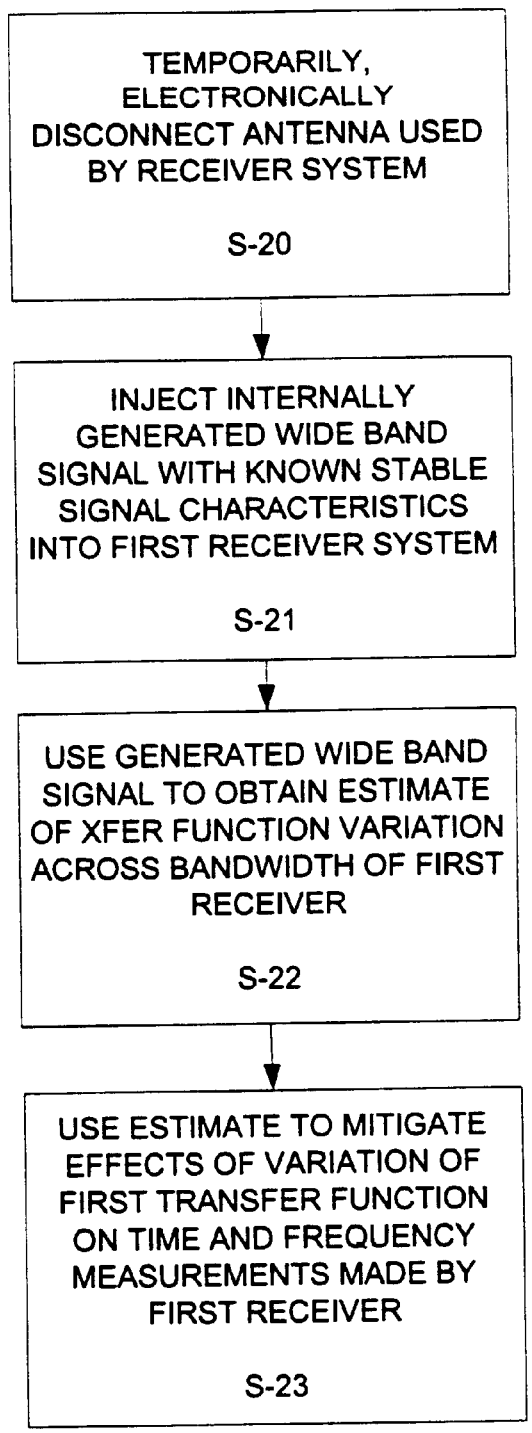
Figure 2I:
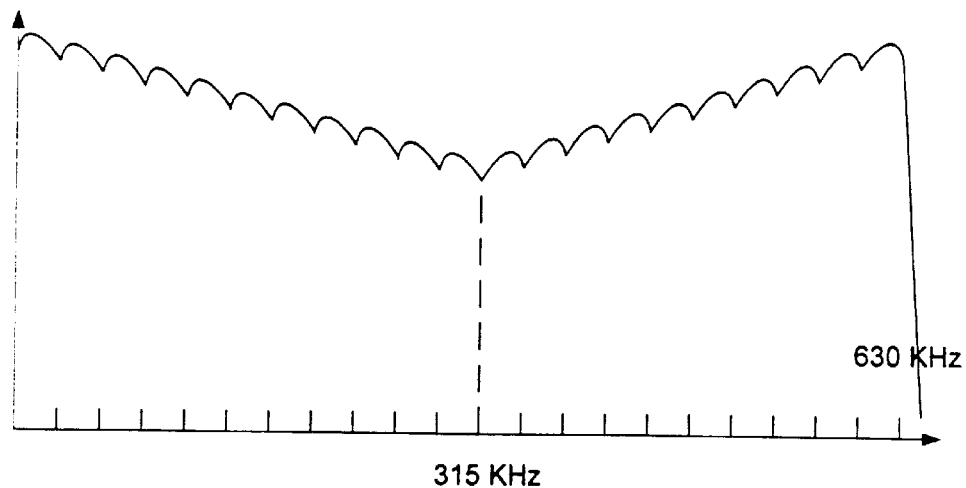
Figure 2J:
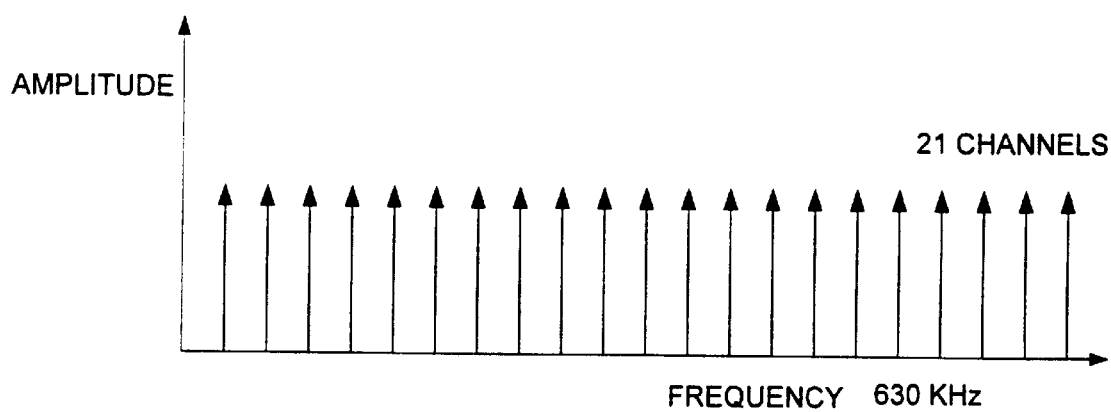

The internal calibration method, represented in the flowchart of FIG. 2H, is particularly suited for calibrating an individual first receiver system (i.e., SCS 10) that is characterized by a time- and frequency-varying transfer function, wherein the transfer finction defines how the amplitude and phase of a received signal will be altered by the receiver system and the receiver system is utilized in a location system to determine the location of a wireless transmitter by, in part, determining a difference in time of arrival of a signal transmitted by the wireless transmitter and received by the receiver system to be calibrated and another receiver system, and wherein the accuracy of the location estimate is dependent, in part, upon the accuracy of TDOA measurements made by the system. An example of a AMPS RCC transfer function is depicted in FIG. 21, which depicts how the phase of the transfer function varies across the 21 control channels spanning 630 KHz.

Referring to FIG. 2H, the internal calibration method includes the steps of temporarily and electronically disconnecting the antenna used by a receiver system from the receiver system (step S-20); injecting an internally generated wideband signal with known and stable signal characteristics into the first receiver system (step S-21); utilizing the generated wideband signal to obtain an estimate of the manner in which the transfer function varies across the bandwidth of the first receiver system (step S-22); and utilizing the estimate to mitigate the effects of the variation of the first transfer function on the time and frequency measurements made by the first receiver system (step S-23). One example of a stable wideband signal used for internal calibration is a comb signal, which is comprised of multiple individual, equal-amplitude frequency elements at a known spacing, such as 5 KHz. An example of such a signal is shown in FIG. 21.

The antenna must be temporarily disconnected during the internal calibration process to prevent external signals from entering the wideband receiver and to guarantee that the receiver is only receiving the stable wideband signal. The antenna is electronically disconnected only for a few milliseconds to minimize the chance of missing too much of a signal from a wireless transmitter. In addition, internal calibration is typically performed immediately after external calibration to minimize the possibility that the any component in the SCS 10 drifts during the interval between external and internal calibration. The antenna is disconnected from the wideband receiver using two electronically controlled RF relays (not shown). An RF relay cannot provide perfect isolation between input and output even when in the "off" position, but it can provide up to 70 dB of isolation. Two relays may be used in series to increase the amount of isolation and to further assure that no signal is leaked from the antenna to the wideband receiver during calibration. Similarly, when the internal calibration function is not being used, the internal calibration signal is turned off, and the two RF relays are also turned off to prevent leakage of the internal calibration signals into the wideband receiver when the receiver is collecting signals from wireless transmitters.

The external calibration method provides an absolute calibration of a single channel and the internal calibration method then calibrates each other channel relative to the channel that had been absolutely calibrated. The comb signal is particularly suited as a stable wideband signal because it can be easily generated using a stored replica of the signal and a digital to analog converter.

External Calibration Using Wideband Calibration Signal

The external calibration method described next may be used in connection with an SCS 10 receiver system characterized by a time- and frequency-varying transfer function, which preferably includes the antennas, filters, amplifiers, duplexors, multi-couplers, splitters, and cabling associated with the SCS receiver system. The method includes the step of transmitting a stable, known wideband calibration signal from an external transmitter. The wideband calibration signal is then used to estimate the transfer function across a prescribed bandwidth of the SCS receiver system. The estimate of the transfer function is subsequently employed to mitigate the effects of variation of the transfer function on subsequent TDOA/FDOA measurements. The external transmission is preferably of short duration and low power to avoid interference with the wireless communications system hosting the Wireless Location System.

In the preferred method, the SCS receiver system is synchronized with the external transmitter. Such synchronization may be performed using GPS timing units. Moreover, the receiver system may be programmed to receive and process the entire wideband of the calibration signal only at the time that the calibration signal is being sent. The receiver system will not perform calibration processing at any time other than when in synchronization with the external calibration transmissions. In addition, a wireless communications link is used between the receiver system and the external calibration transmitter to exchange commands and responses. The external transmitter may use a directional antenna to direct the wideband signal only at the antennas of the SCS receiver system. Such as directional antenna may be a Yagi antenna (i.e. linear end-fire array). The calibration method preferably includes making the external transmission only when the directional antenna is aimed at the receiver system's antennas and the risk of multipath reflection is low.

Calibrating for Station Biases

Another aspect of the present invention concerns a calibration method to correct for station biases in a SCS receiver system. The "station bias" is defined as the finite delay between when an RF signal from a wireless transmitter reaches the antenna and when that same signal reached the wideband receiver. The inventive method includes the step of measuring the length of the cable from the antennas to the filters and determining the corresponding delays associated with the cable length. In addition, the method includes injecting a known signal into the filter, duplexor, multicoupler, or RF splitter and measuring the delay and phase response versus frequency response from the input of each device to the wideband receiver. The delay and phase values are then combined and used to correct subsequent location measurements. When used with the GPS based timing generation described above, the method preferably includes correcting for the GPS cable lengths. Moreover, an externally generated reference signal is preferably used to monitor changes in station bias that may arise due to aging and weather. Finally, the station bias by RF channel and for each receiver system in the Wireless Location System is preferably stored in tabular form in the Wireless Location System for use in correcting subsequent location processing.

Performance Monitoring

Figure 2K:
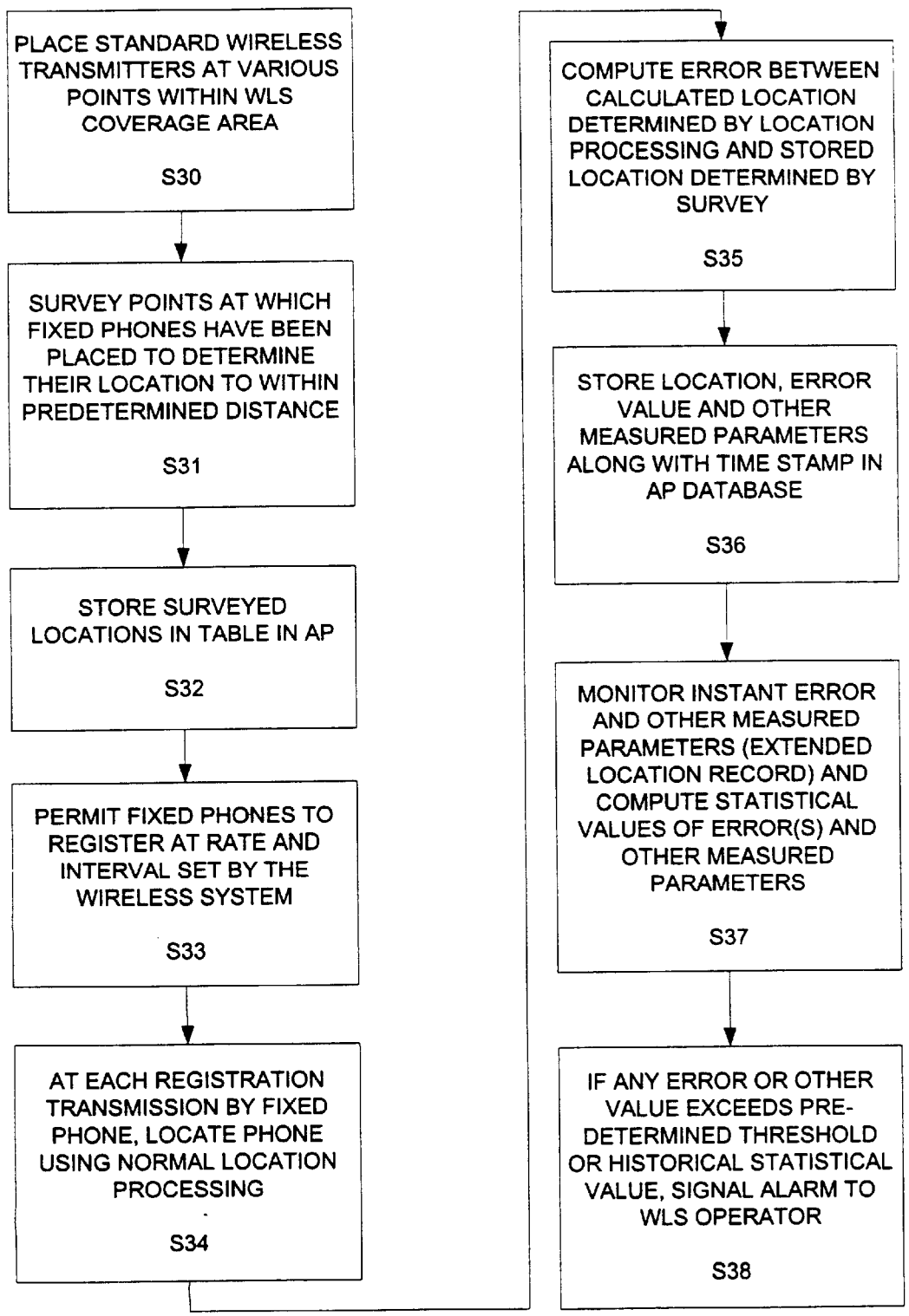
FIGS. 2K and 2L are flowcharts of two methods for monitoring performance of a Wireless Location System in accordance with the present invention.
Figure 2L:
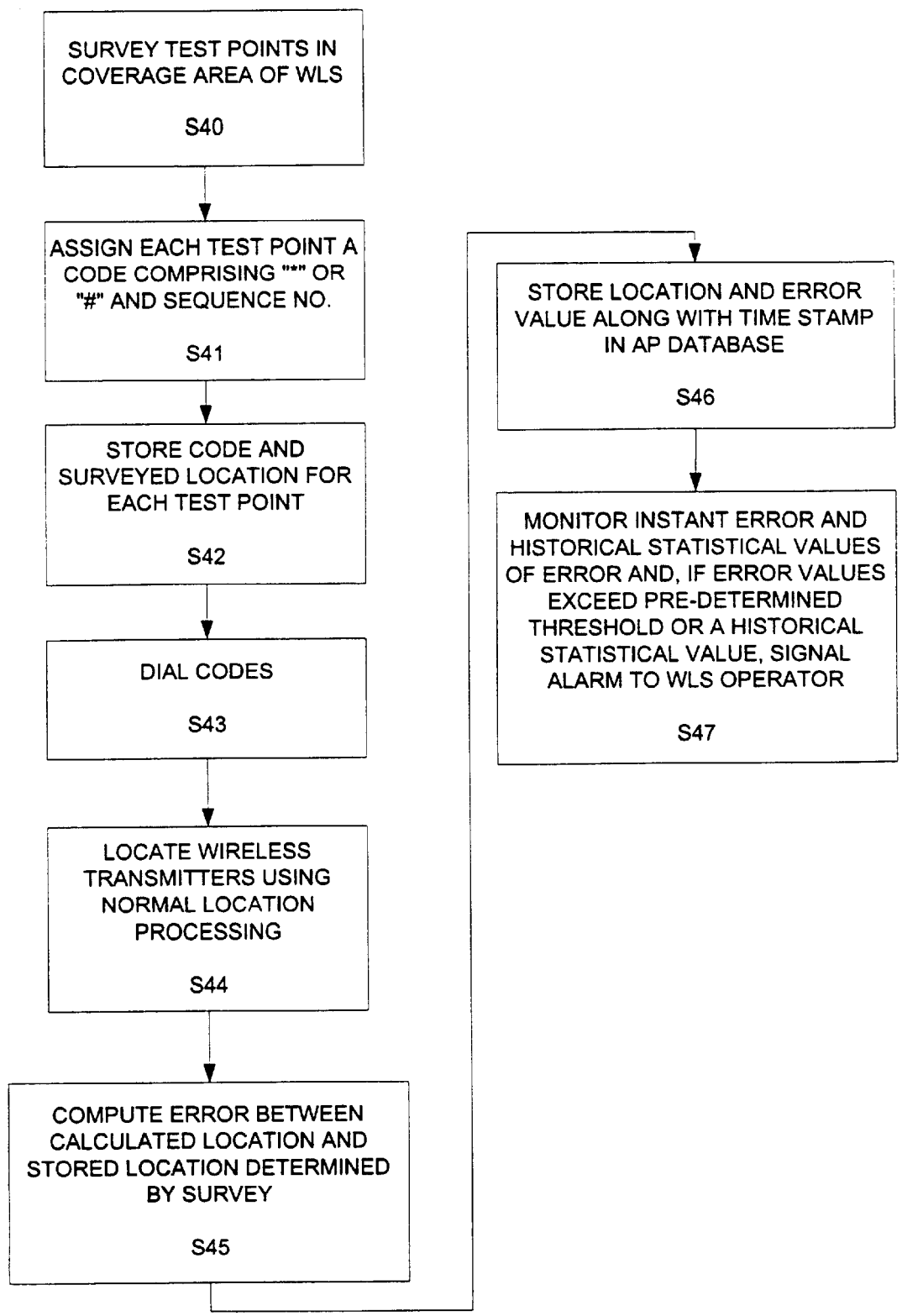

The Wireless Location System uses methods similar to calibration for performance monitoring on a regular and ongoing basis. These methods are depicted in the flowcharts of FIGS. 2K and 2L. Two methods of performance monitoring are used: fixed phones and drive testing of surveyed points. The fixed phone method comprises the following steps (see FIG. 2K):

standard wireless transmitters are permanently placed at various points within the coverage area of the Wireless Location System (these are then known as the fixed phones) (step S-30);

the points at which the fixed phones have been placed are surveyed so that their location is precisely known to within a predetermined distance, for example ten feet (step S-31);

the surveyed locations are stored in a table in the AP 14 (step S-32); the fixed phones are permitted to register on the wireless communications system, at the rate and interval set by the wireless communications system for all wireless transmitters on the system (step S-33);

at each registration transmission by a fixed phone, the Wireless Location System locates the fixed phone using normal location processing (as with the calibration transmitters, the Wireless Location System can identify a transmission as being from a fixed phone by storing the identities in a table) (step S-34);

the Wireless Location System computes an error between the calculated location determined by the location processing and the stored location determined by survey (step S-35);

the location, the error value, and other measured parameters are stored along with a time stamp in a database in the AP 14 (step S-36);

the AP 14 monitors the instant error and other measured parameters (collectively referred to as an extended location record) and additionally computes various statistical values of the error(s) and other measured parameters (step S-37); and if any of the error or other values exceed a pre-determined threshold or a historical statistical value, either instantaneously or after performing statistical filtering over a prescribed number of location estimates, the AP 14 signals an alarm to the operator of the Wireless Location System (step S-38).

The extended location record includes a large number of measured parameters usefully for analyzing the instant and historical performance of the Wireless Location System. These parameters include: the RF channel used by the wireless transmitter, the antenna port(s) used by the Wireless Location System to demodulate the wireless transmission, the antenna ports from which the Wireless Location System requested RF data, the peak, average, and variance in power of the transmission over the interval used for location processing, the SCS 10 and antenna port chosen as the reference for location processing, the correlation value from the cross-spectra correlation between every other SCS 10 and antenna used in location processing and the reference SCS 10 and antenna, the delay value for each baseline, the multipath mitigation parameters, and the residual values remaining after the multipath mitigation calculations. Any of these measured parameters can be monitored by the Wireless Location System for the purpose of determining how the Wireless Location System is performing. One example of the type of monitoring performed by the Wireless Location System may be the variance between the instant value of the correlation on a baseline and the historical range of the correlation value. Another may be the variance between the instant value of the received power at a particular antenna and the historical range of the received power. Many other statistical values can be calculated and this list is not exhaustive.

The number of fixed phones placed into the coverage area of the Wireless Location System can be determined based upon the density of the cell sites, the difficulty of the terrain, and the historical ease with which wireless communications systems have performed in the area. Typically the ratio is about one fixed phone for every six cell sites, however in some areas a ratio of one to one may be required. The fixed phones provide a continuous means to monitor the performance of the Wireless Location System, as well as the monitor any changes in the frequency plan that the carrier may have made. Many times, changes in the frequency plan will cause a variation in the performance of the Wireless Location System and the performance monitoring of the fixed phones provide an immediate indication to the Wireless Location System operator.

Drive testing of surveyed points is very similar to the fixed phone monitoring. Fixed phones typically can only be located indoors where access to power is available (i.e. the phones must be continuously powered on to be effective). To obtain a more complete measurement of the performance of the location performance, drive testing of outdoor test points is also performed. Referring to FIG. 2L, as with the fixed phones, prescribed test points throughout the coverage area of the Wireless Location System are surveyed to within ten feet (step S-40). Each test point is assigned a code, where the code consists of either a "*" or a "#", followed by a sequence number (step S-41). For example, "*1001" through "*1099" may be a sequence of 99 codes used for test points. These codes should be sequences, that when dialed, are meaningless to the wireless communications system (i.e. the codes do not cause a feature or other translation to occur in the MSC, except for an intercept message). The AP 14 stores the code for each test point along with the surveyed location (step S-42). Subsequent to these initial steps, any wireless transmitter dialing any of the codes will be triggered and located using normal location processing (steps S-43 and S-44). The Wireless Location System automatically computes an error between the calculated location determined by the location processing and the stored location determined by survey, and the location and the error value are stored along with a time stamp in a database in the AP 14 (steps S-45 and S-46). The AP 14 monitors the instant error, as well as various historical statistical values of the error. If the error values exceed a pre-determined threshold or a historical statistical value, either instantaneously or after performing statistical filtering over a prescribed number of location estimates, the AP 14 signals an alarm to the operator of the Wireless Location System (step S-47).

TDOA Location Processor (TLP)

Figure 3:
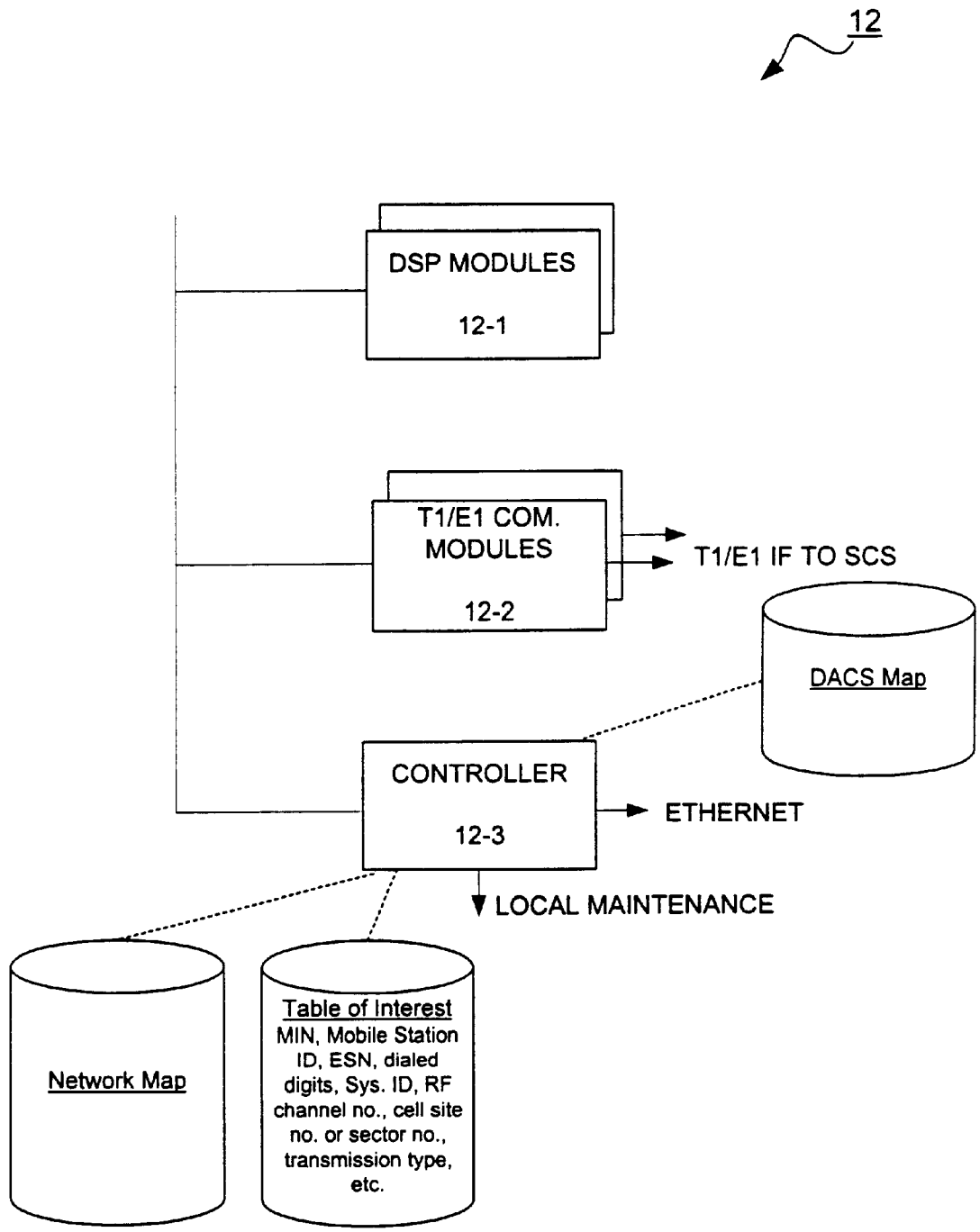
FIG. 3 schematically depicts a TDOA Location Processor 12 in accordance with the present invention.

The TLP 12, depicted in FIGS. 1, 1A and 3, is a centralized digital signal processing system that manages many aspects of the Wireless Location System, especially the SCS's 10, and provides control over the location processing. Because location processing is DSP intensive, one of the major advantages of the TLP 12 is that the DSP resources can be shared among location processing initiated by transmissions at any of the SCS's 10 in a Wireless Location System. That is, the additional cost of DSP's at the SCS's 10 is reduced by having the resource centrally available. As shown in FIG. 3, there are three major components of the TLP 12: DSP modules 12-1, T1/E1 communications modules 12-2 and a controller module 12-3.

The T1/E1 communications modules 12-2 provide the communications interface to the SCS's 10 (T1 and E1 are standard communications speeds available throughout the world). Each SCS 10 communicates to a TLP 12 using one or more DS0's (which are typically 56 Kbps or 64 Kbps). Each SCS 10 typically connects to a fractional T1 or E1 circuit, using, e.g., a drop and insert unit or channel bank at the cell site. Frequently, this circuit is shared with the base station, which communicates with the MSC. At a central site, the DS0's assigned to the base station are separated from the DS0's assigned to the SCS's 10. This is typically accomplished external to the TLP 12 using a digital access and control system (DACS) 13A that not only separates the DS0's but also grooms the DS0's from multiple SCS's 10 onto full T1 or E1 circuits. These circuits then connect from the DACS 13A to the DACS 13B and then to the T1/E1 communications module on the TLP 12. Each T1/E1 communications module contains sufficient digital memory to buffer packets of data to and from each SCS 10 communicating with the module. A single TLP chassis may support one or more T1/E1 communications modules.

The DSP modules 12-1 provide a pooled resource for location processing. A single module may typically contain two to eight digital signal processors, each of which are equally available for location processing. Two types of location processing are supported: central based and station based, which are described in further detail below. The TLP controller 12-3 manages the DSP module(s) 12-1 to obtain optimal throughput. Each DSP module contains sufficient digital memory to store all of the data necessary for location processing. A DSP is not engaged until all of the data necessary to begin location processing has been moved from each of the involved SCS's 10 to the digital memory on the DSP module. Only then is a DSP given the specific task to locate a specific wireless transmitter. Using this technique, the DSP's, which are an expensive resource, are never kept waiting. A single TLP chassis may support one or more DSP modules.

The controller module 12-3 provides the real time management of all location processing within the Wireless Location System. The AP 14 is the top-level management entity within the Wireless Location System, however its database architecture is not sufficiently fast to conduct the real time decision making when transmissions occur. The controller module 12-3 receives messages from the SCS's 10, including: status, spectral energy in various channels for various antennas, demodulated messages, and diagnostics. This enables the controller to continuously determine events occurring in the Wireless Location System, as well as to send commands to take certain actions. When a controller module receives demodulated messages from SCS's 10, the controller module decides whether location processing is required for a particular wireless transmission. The controller module 12-3 also determines which SCS's 10 and antennas to use in location processing, including whether to use central based or station based location processing. The controller module commands SCS's 10 to return the necessary data, and commands the communications modules and DSP modules to sequentially perform their necessary roles in location processing. These steps are described below in further detail.

The controller module 12-3 maintains a table known as the Signal of Interest Table (SOIT). This table contains all of the criteria that may be used to trigger location processing on a particular wireless transmission. The criteria may include, for example, the Mobile Identity Number, the Mobile Station ID, the Electronic Serial Number, dialed digits, System ID, RF channel number, cell site number or sector number, type of transmission, and other types of data elements. Some of the trigger events may have higher or lower priority levels associated with them for use in determining the order of processing. Higher priority location triggers will always be processing before lower priority location triggers. However, a lower priority trigger that has already begun location processing will complete the processing before being assigned to a higher priority task. The master Tasking List for the Wireless Location System is maintained on the AP 14, and copies of the Tasking List are automatically downloaded to the Signal of Interest Table in each TLP 12 in the Wireless Location System. The full Signal of Interest Table is downloaded to a TLP 12 when the TLP 12 is reset or first starts. Subsequent to those two events, only changes are downloaded from the AP 14 to each TLP 12 to conserve communications bandwidth. The TLP 12 to AP 14 communications protocol preferably contains sufficient redundancy and error checking to prevent incorrect data from ever being entered into the Signal of Interest Table. When the AP 14 and TLP 12 periodically have spare processing capacity available, the AP 14 reconfirms entries in the Signal of Interest Table to ensure that all Signal of Interest Table entries in the Wireless Location System are in full synchronization.

Each TLP chassis has a maximum capacity associated with the chassis. For example, a single TLP chassis may only have sufficient capacity to support between 48 and 60 SCS's 10. When a wireless communications system is larger that the capacity of a single TLP chassis, multiple TLP chassis are connected together using Ethernet networking. The controller module 12-3 is responsible for inter-TLP communications and networking, and communicates with the controller modules in other TLP chassis and with Application Processors 14 over the Ethernet network. Inter-TLP communications is required when location processing requires the use of SCS's 10 that are connected to different TLP chassis. Location processing for each wireless transmission is assigned to a single DSP module in a single TLP chassis. The controller modules 12-3 in TLP chassis select the DSP module on which to perform location processing, and then route all of the RF data used in location processing to that DSP module. If RF data is required from the SCS's 10 connected to more that one TLP 12, then the controller modules in all necessary TLP chassis communicate to move the RF data from all necessary SCS's 10 to their respective connected TLP's 12 and then to the DSP module and TLP chassis assigned to the location processing. The controller module supports two fully independent Ethernet networks for redundancy. A break or failure in any one network causes the affected TLP's 12 to immediately shift all communications to the other network.

Figure 3A:
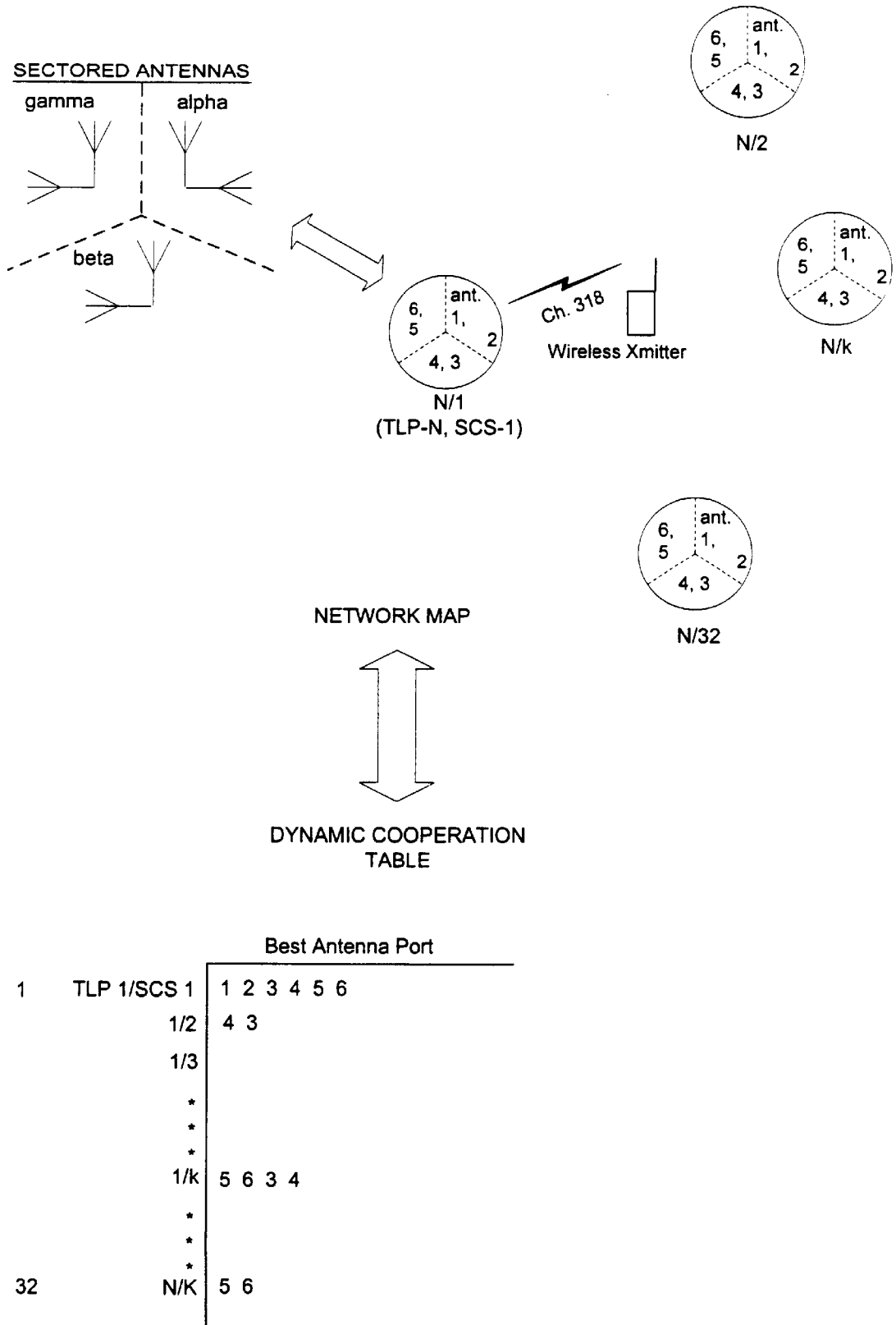
FIG. 3A depicts the structure of an exemplary network map maintained by the TLP controllers in accordance with the present invention.

The controller modules 12-3 maintain a complete network map of the Wireless Location System, including the SCS's 10 associated with each TLP chassis. The network map is a table stored in the controller module containing a list of the candidate SCS/antennas that may be used in location processing, and various parameters associated with each of the SCS/antennas. The structure of an exemplary network map is depicted in FIG. 3A. There is a separate entry in the table for each antenna connected to an SCS 10. When a wireless transmission occurs in an area that is covered by SCS's 10 communicating with more than one TLP chassis, the controller modules in the involved TLP chassis determine which TLP chassis will be the "master" TLP chassis for the purpose of managing location processing. Typically, the TLP chassis associated with the SCS 10 that has the primary channel assignment for the wireless transmission is assigned to be the master. However, another TLP chassis may be assigned instead if that TLP temporarily has no DSP resources available for location processing, or if most of the SCS's 10 involved in location processing are connected to another TLP chassis and the controller modules are minimizing inter-TLP communications. This decision making process is fully dynamic, but is assisted by tables in the TLP 12 that pre-determine the preferred TLP chassis for every primary channel assignment. The tables are created by the operator of the Wireless Location System, and programmed using the Network Operations Console.

The networking described herein finctions for both TLP chassis associated with the same wireless carrier, as well as for chassis that overlap or border the coverage area between two wireless carriers. Thus it is possible for a TLP 12 belonging to a first wireless carrier to be networked and therefore receive RF data from a TLP 12 (and the SCS's 10 associated with that TLP 12) belonging to a second wireless carrier. This networking is particularly valuable in rural areas, where the performance of the Wireless Location System can be enhanced by deploying SCS's 10 at cell sites of multiple wireless carriers. Since in many cases wireless carriers do not collocate cell sites, this feature enables the Wireless Location System to access more geographically diverse antennas than might be available if the Wireless Location System used only the cell sites from a single wireless carrier. As described below, the proper selection and use of antennas for location processing can enhance the performance of the Wireless Location System.

The controller module 12-3 passes many messages, including location records, to the AP 14, many of which are described below. Usually, however, demodulated data is not passed from the TLP 12 to the AP 14. If, however, the TLP 12 receives demodulated data from a particular wireless transmitter and the TLP 12 identifies the wireless transmitter as being a registered customer of a second wireless carrier in a different coverage area, the TLP 12 may pass the demodulated data to the first (serving) AP 14A. This will enable the first AP 14A to communicate with a second AP 14B associated with the second wireless carrier, and determine whether the particular wireless transmitter has registered for any type of location services. If so, the second AP 14B may instruct the first AP 14A to place the identity of the particular wireless transmitter into the Signal of Interest Table so that the particular wireless transmitter will be located for as long as the particular wireless transmitter is in the coverage area of the first Wireless Location System associated with the first AP 14A. When the first Wireless Location System has detected that the particular wireless transmitter has not registered in a time period exceeding a pre-determined threshold, the first AP 14A may instruct the second AP 14B that the identity of the particular wireless transmitter is being removed from the Signal of Interest Table for the reason of no longer being present in the coverage area associated with the first AP 14A.

Diagnostic Port

The TLP 12 supports a diagnostic port that is highly useful in the operation and diagnosis of problems within the Wireless Location System. This diagnostic port can be accessed either locally at a TLP 12 or remotely over the Ethernet network connecting the TLP's 12 to the AP's. The diagnostic port enables an operator to write to a file all of the demodulation and RF data received from the SCS's 10, as well as the intermediate and final results of all location processing. This data is erased from the TLP 12 after processing a location estimate, and therefore the diagnostic port provides the means to save the data for later post-processing and analysis. The inventor's experience in operating large scale wireless location systems is that a very small number of location estimates can occasionally have very large errors, and these large errors can dominate the overall operating statistics of the Wireless Location System over any measurement period. Therefore, it is important to provide the operator with a set of tools that enable the Wireless Location System to detect and trap the cause of the very large errors to diagnose and mitigate those errors. The diagnostic port can be set to save the above information for all location estimates, for location estimates from particular wireless transmitters or at particular test points, or for location estimates that meet a certain criteria. For example, for fixed phones or drive testing of surveyed points, the diagnostic port can determine the error in the location estimate in real time and then write the above described information only for those location estimates whose error exceeds a predetermined threshold. The diagnostic port determines the error in real time by storing the surveyed latitude, longitude coordinate of each fixed phone and drive test point in a table, and then calculating a radial error when a location estimate for the corresponding test point is made.

Redundancy

The TLP's 12 implement redundancy using several inventive techniques, allowing the Wireless Location System to support an M plus N redundancy method. M plus N redundancy means that N redundant (or standby) TLP chassis are used to provide full redundant backup to M online TLP chassis. For example, M may be ten and N may be two.

First, the controller modules in different TLP chassis continuously exchange status and "heartbeat" messages at pre-determined time intervals between themselves and with every AP 14 assigned to monitor the TLP chassis. Thus, every controller module has continuous and full status of every other controller module in the Wireless Location System. The controller modules in different TLP chassis periodically select one controller module in one TLP 12 to be the master controller for a group of TLP chassis. The master controller may decide to place a first TLP chassis into off-line status if the first TLP 12A reports a failed or degraded condition in its status message, or if the first TLP 12A fails to report any status or heartbeat messages within its assigned and pre-determined time. If the master controller places a first TLP 12A into off-line status, the master controller may assign a second TLP 12B to perform a redundant switchover and assume the tasks of the off-line first TLP 12A. The second TLP 12B is automatically sent the configuration that had been loaded into the first TLP 12A; this configuration may be downloaded from either the master controller or from an AP 14 connected to the TLP's 12. The master controller may be a controller module on any one of the TLP's 12 that is not in off-line status, however there is a preference that the master controller be a controller module in a stand-by TLP 12. When the master controller is the controller module in a stand-by TLP 12, the time required to detect a failed first TLP 12A, place the first TLP 12A into off-line status, and then perform a redundant switchover can be accelerated.

Second, all of the T1 or E1 communications between the SCS's 10 and each of the TLP T1/E1 communications modules 12-2 are preferably routed through a high-reliability DACS that is dedicated to redundancy control. The DACS 13B is connected to every groomed T1/E1 circuit containing DS0's from SCS's 10 and is also connected to every T1/E1 communications module 12-2 of every TLP 12. Every controller module at every TLP 12 contains a map of the DACS 13B that describes the DACS' connection list and port assignments. This DACS 13B is connected to the Ethernet network described above and can be controlled by any of the controller modules 12-3 at any of the TLP's 12. When a second TLP 12 is placed into off-line status by a master controller, the master controller sends commands to the DACS 13B to switch the groomed T1/E1 circuit communicating with the first TLP 12A to a second TLP 12B which had been in standby status. At the same time, the AP 14 downloads the complete configuration file that was being used by the second (and now off-line) TLP 12B to the third (and now online) TLP 12C. The time from the first detection of a failed first TLP chassis to the complete switch-over and assumption of processing responsibilities by a third TLP chassis is typically less than few seconds. In many cases, no RF data is lost by the SCS's 10 associated with the failed first TLP chassis, and location processing can continue without interruption. At the time of a TLP fail-over when a first TLP 12A is placed into off-line status, the NOC 16 creates an alert to notify the Wireless Location System operator that the event has occurred.

Third, each TLP chassis contains redundant power supplies, fans, and other components. A TLP chassis can also support multiple DSP modules, so that the failure of a single DSP module or even a single DSP on a DSP module reduces the overall amount of processing resources available but does not cause the failure of the TLP chassis. In all of the cases described in this paragraph, the failed component of the TLP 12 can be replaced without placing the entire TLP chassis into off-line status. For example, if a single power supply fails, the redundant power supply has sufficient capacity to singly support the load of the chassis. The failed power supply contains the necessary circuitry to remove itself from the load of the chassis and not cause further degradation in the chassis. Similarly, a failed DSP module can also remove itself from the active portions of the chassis, so as to not cause a failure of the backplane or other modules. This enables the remainder of the chassis, including the second DSP module, to continue to function normally. Of course, the total processing throughput of the chassis is reduced but a total failure is avoided.

Application Processor (AP) 14

Figure 4:
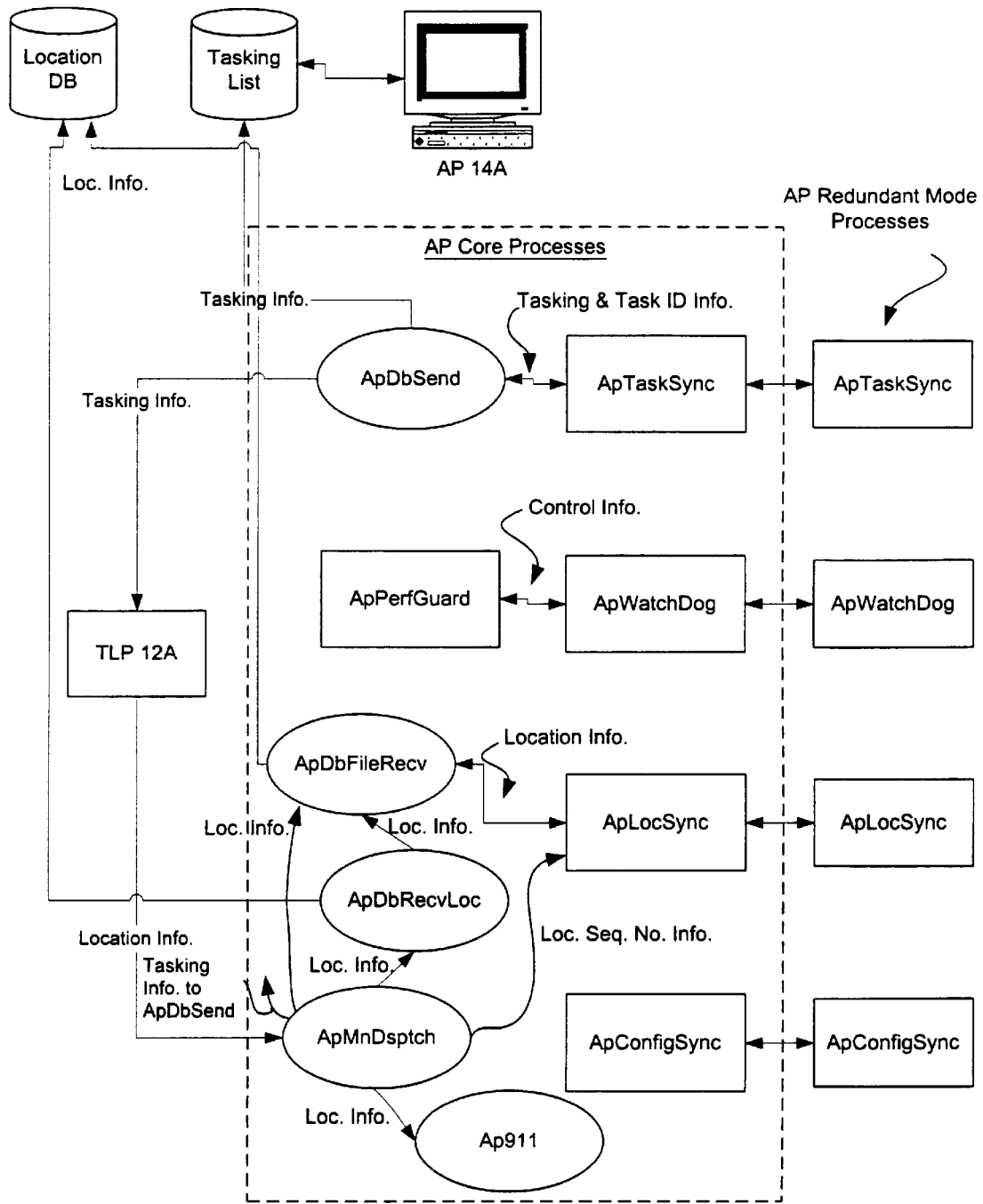
FIGS. 4 and 4A schematically depict different aspects of an Applications Processor 14 in accordance with the present invention.
Figure 4A:
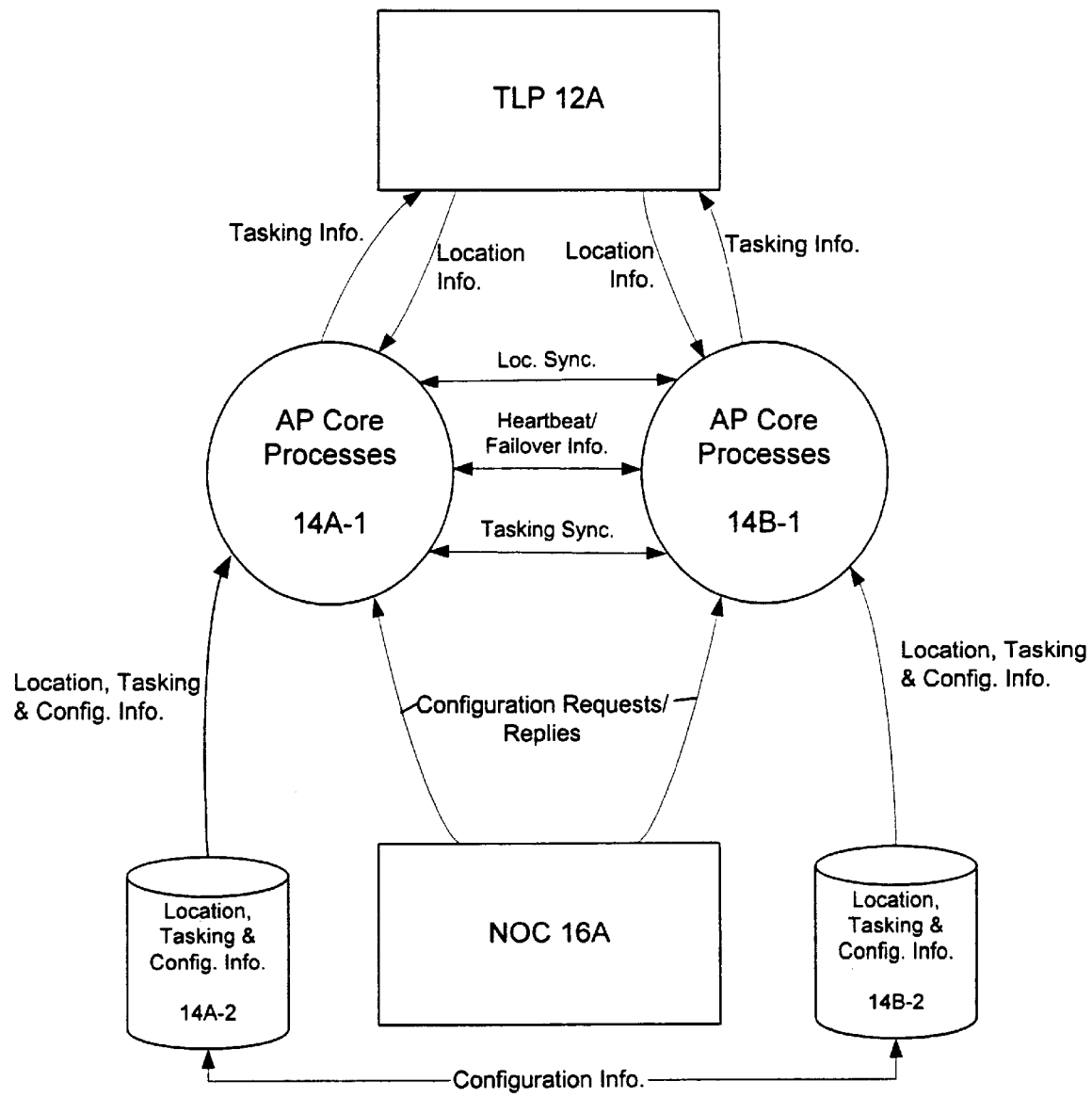
Figure 5:
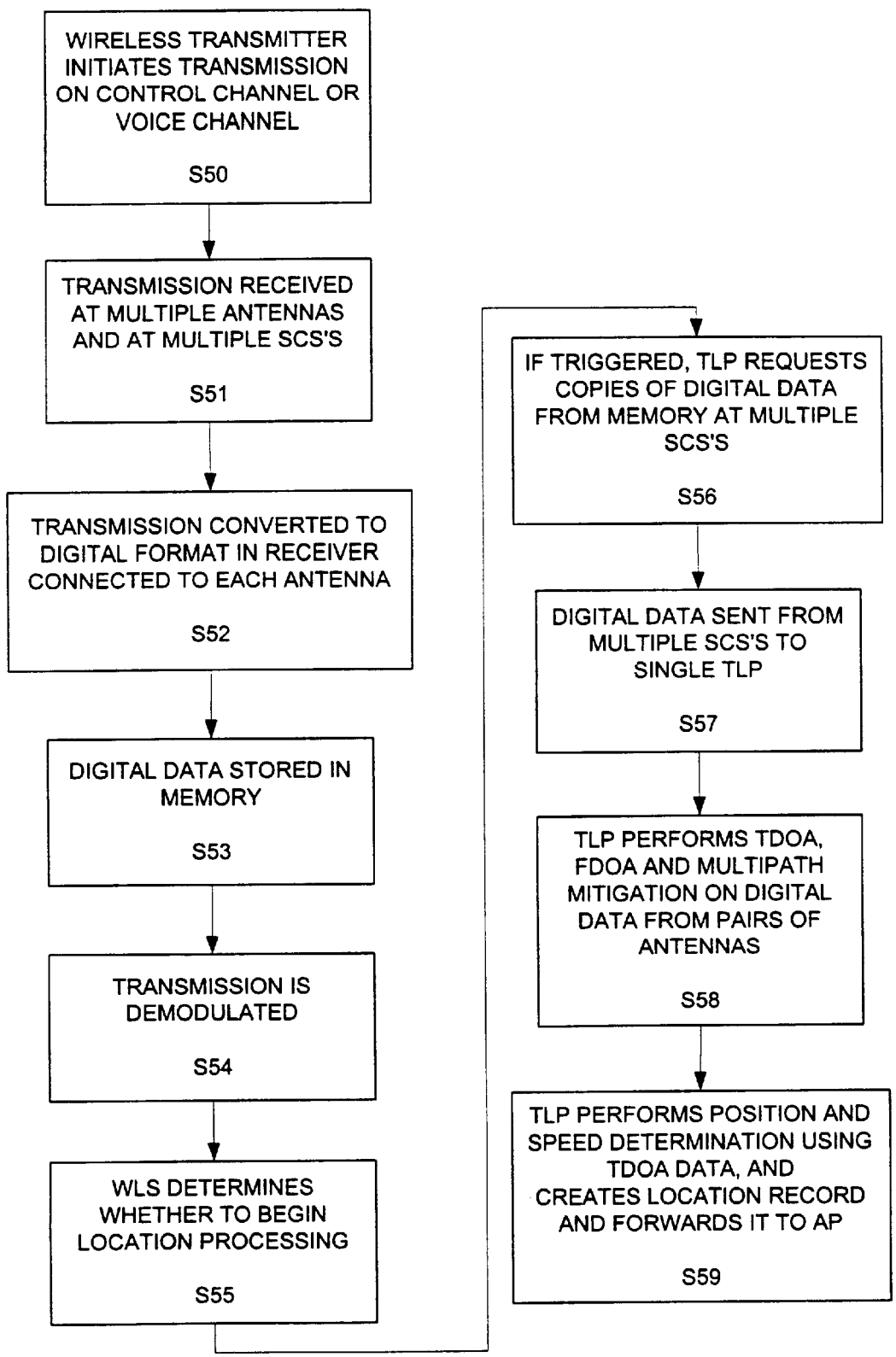
FIG. 5 is a flowchart of a central station-based location processing method in accordance with the present invention.

The AP 14 is a centralized database system, comprising a number of software processes that manage the entire Wireless Location System, provide interfaces to external users and applications, store location records and configurations, and support various application-related functionality. The AP 14 uses a commercial hardware platform that is sized to match the throughput of the Wireless Location System. The AP 14 also uses a commercial relational database system (RD13MS), which has been significantly customized to provide the functionality described herein. While the SCS 10 and TLP 12 preferably operate together on a purely real time basis to determine location and create location records, the AP 14 can operate on both a real time basis to store and forward location records and a non-real time basis to post-process location records and provide access and reporting over time. The ability to store, retrieve, and post-process location records for various types of system and application analysis has proven to be a powerful advantage of the present invention. The main collection of software processes is known as the ApCore, which is shown in FIG. 4 and includes the following functions:

The AP Performance Guardian (ApPerfGuard) is a dedicated software process that is responsible for starting, stopping, and monitoring most other ApCore processes as well as ApCore communications with the NOC 16. Upon receiving a configuration update command from the NOC, ApPerfGuard updates the database and notifies all other processes of the change. ApPerfGuard starts and stops appropriate processes when the NOC directs the ApCore to enter specific run states, and constantly monitors other software processes scheduled to be running to restart them if they have exited or stopping and restarting any process that is no longer properly responding. ApPerfGuard is assigned to one of the highest processing priorities so that this process cannot be blocked by another process that has "run away". ApPerfGuard is also assigned dedicated memory that is not accessible by other software processes to prevent any possible corruption from other software processes.

The AP Dispatcher (ApMnDsptch) is a software process that receives location records from the TLP's 12 and forwards the location records to other processes. This process contains a separate thread for each physical TLP 12 configured in the system, and each thread receives location records from that TLP 12. For system reliability, the ApCore maintains a list containing the last location record sequence number received from each TLP 12, and sends this sequence number to the TLP 12 upon initial connection. Thereafter, the AP 14 and the TLP 12 maintain a protocol whereby the TLP 12 sends each location record with a unique identifier. ApMnDsptch forwards location records to multiple processes, including Ap911, ApDbSend, ApDbRecvLoc, and ApDbFileRecv.

The AP Tasking Process (ApDbSend) controls the Tasking List within the Wireless Location System. The Tasking List is the master list of all of the trigger criteria that determines which wireless transmitters will be located, which applications created the criteria, and which applications can receive location record information. The ApDbSend process contains a separate thread for each TLP 12, over which the ApDbSend synchronizes the Tasking List with the Signal of Interest Table on each TLP 12. ApDbSend does not send application information to the Signal of Interest Table, only the trigger criteria. Thus the TLP 12 does not know why a wireless transmitter must be located. The Tasking List allows wireless transmitters to be located based upon Mobile Identity Number (MIN), Mobile Station Identifier (MSID), Electronic Serial Number (ESN) and other identity numbers, dialed sequences of characters and/or digits, home System ID (SID), originating cell site and sector, originating RF channel, or message type. The Tasking List allows multiple applications to receive location records from the same wireless transmitter. Thus, a single location record from a wireless transmitter that has dialed "911" can be sent, for example, to a 911 PSAP, a fleet management application, a traffic management application, and to an RF optimization application.

The Tasking List also contains a variety of flags and field for each trigger criteria, some of which are described elsewhere in this specification. One flag, for example, specifies the maximum time limit before which the Wireless Location System must provide a rough or final estimate of the wireless transmitter. Another flag allows location processing to be disabled for a particular trigger criteria such as the identity of the wireless transmitter. Another field contains the authentication required to make changes to the criteria for a particular trigger; authentication enables the operator of the Wireless Location System to specify which applications are authorized to add, delete, or make changes to any trigger criteria and associated fields or flags. Another field contains the Location Grade of Service associated with the trigger criteria; Grade of Service indicates to the Wireless Location System the accuracy level and priority level desired for the location processing associated with a particular trigger criteria. For example, some applications may be satisfied with a rough location estimate (perhaps for a reduced location processing fee), while other applications may be satisfied with low priority processing that is not guaranteed to complete for any given transmission (and which may be preempted for high priority processing tasks). The Wireless Location System also includes means to support the use of wildcards for trigger criteria in the Tasking List. For example, a trigger criteria can be entered as "MIN= 215555****". This will cause the Wireless Location System to trigger location processing for any wireless transmitter whose MIN begins with the six digits 215555 and ends with any following four digits. The wildcard characters can be placed into any position in a trigger criteria. This feature can save on the number of memory locations required in the Tasking List and Signal of Interest Table by grouping blocks of related wireless transmitters together.

ApDbSend also supports dynamic tasking. For example, the MIN, ESN, MSID, or other identity of any wireless transmitter that has dialed "911" will automatically be placed onto the Tasking List by ApDbSend for one hour. Thus, any further transmissions by the wireless transmitter that dialed "911" will also be located in case of further emergency. For example, if a PSAP calls back a wireless transmitter that had dialed "911" within the last hour, the Wireless Location System will trigger on the page response message from the wireless transmitter, and can make this new location record available to the PSAP. This dynamic tasking can be set for any interval of time after an initiation event, and for any type of trigger criteria. The ApDbSend process is also a server for receiving tasking requests from other applications. These applications, such as fleet management, can send tasking requests via a socket connection, for example. These applications can either place or remove trigger criteria. ApDbSend conducts an authentication process with each application to verify that that the application has been authorized to place or remove trigger criteria, and each application can only change trigger criteria related to that application.

The AP 911 Process (Ap911) manages each interface between the Wireless Location System and E9-1-1 network elements, such as tandem switches, selective routers, ALI databases and/or PSAPs. The Ap911 process contains a separate thread for each connection to a E9-1-1 network element, and can support more than one thread to each network element. The Ap911 process can simultaneously operate in many modes based upon user configuration, and as described herein. The timely processing of E9-1-1 location records is one of the highest processing priorities in the AP 14, and therefore the Ap911 executes entirely out of random access memory (RAM) to avoid the delay associated with first storing and then retrieving a location record from any type of disk. When ApMnDsptch forwards a location record to Ap911, Ap911 immediately makes a routing determination and forwards the location record over the appropriate interface to a E9-1-1 network element. A separate process, operating in parallel, records the location record into the AP 14 database.

The AP 14, through the Ap911 process and other processes, supports two modes of providing location records to applications, including E9-1-1: "push" and "pull" modes. Applications requesting push mode receive a location record as soon as it is available from the AP 14. This mode is especially effective for E9-1-1 which has a very time critical need for location records, since E9-1-1 networks must route wireless 9-1-1 calls to the correct PSAP within a few seconds after a wireless caller has dialed "911". Applications requesting pull mode do not automatically receive location records, but rather must send a query to the AP 14 regarding a particular wireless transmitter in order to receive the last, or any other location record, about the wireless transmitter. The query from the application can specify the last location record, a series of location records, or all location records meeting a specific time or other criteria, such as type of transmission. An example of the use of pull mode in the case of a "911" call is the E9-1-1 network first receiving the voice portion of the "911" call and then querying the AP 14 to receive the location record associated with that call.

When the Ap911 process is connected to many E9-1-1 networks elements, Ap911 must determine to which E9-1-1 network element to push the location record (assuming that "push" mode has been selected). The AP 14 makes this determination using a dynamic routing table. The dynamic routing table is used to divide a geographic region into cells. Each cell, or entry, in the dynamic routing table contains the routing instructions for that cell. It is well known that one minute of latitude is 6083 feet, which is about 365 feet per millidegree. Additionally, one minute of longitude is cosine (latitude) times 6083 feet, which for the Philadelphia area is about 4659 feet, or about 280 feet per millidegree. A table of size one thousand by one thousand, or one million cells, can contain the routing instructions for an area that is about 69 miles by 53 miles, which is larger than the area of Philadelphia in this example, and each cell could contain a geographic area of 365 feet by 280 feet. The number of bits allocated to each entry in the table must only be enough to support the maximum number of routing possibilities. For example, if the total number of routing possibilities is sixteen or less, then the memory for the dynamic routing table is one million times four bits, or one-half megabyte. Using this scheme, an area the size of Pennsylvania could be contained in a table of approximately twenty megabytes or less, with ample routing possibilities available. Given the relatively inexpensive cost of memory, this inventive dynamic routing table provides the AP 14 with a means to quickly push the location records for "911" calls only to the appropriate E9-1-1 network element.

The AP 14 allows each entry in dynamic routing to be populated using manual or automated means. Using the automated means, for example, an electronic map application can create a polygon definition of the coverage area of a specific E9-1-1 network element, such as a PSAP. The polygon definition is then translated into a list of latitude, longitude points contained within the polygon. The dynamic routing table cell corresponding to each latitude, longitude point is then given the routing instruction for that E9-1-1 network element that is responsible for that geographic polygon.

When the Ap911 process receives a "911" location record for a specific wireless transmitter, Ap911 converts the latitude, longitude into the address of a specific cell in the dynamic routing table. Ap911 then queries the cell to determine the routing instructions, which may be push or pull mode and the identity of the E9-1-1 network element responsible for serving the geographic area in which the "911" call occurred. If push mode has been selected, then Ap911 automatically pushes the location record to that E9-1-1 network element. If pull mode has been selected, then Ap911 places the location record into a circular table of "911" location records and awaits a query.

The dynamic routing means described above entails the use of a geographically defined database that may be applied to other applications in addition to 911, and is therefore supported by other processes in addition to Ap911. For example, the AP 14 can automatically determine the billing zone from which a wireless call was placed for a Location Sensitive Billing application. In addition, the AP 14 may automatically send an alert when a particular wireless transmitter has entered or exited a prescribed geographic area defined by an application. The use of particular geographic databases, dynamic routing actions, any other location triggered actions are defined in the fields and flags associated with each trigger criteria. The Wireless Location System includes means to easily manage these geographically defined databases using an electronic map that can create polygons encompassing a prescribed geographic area. The Wireless Location System extracts from the electronic map a table of latitude, longitude points contained with the polygon. Each application can use its own set of polygons, and can define a set of actions to be taken when a location record for a triggered wireless transmission is contained within each polygon in the set.

The AP Database Receive Process (ApDbRecvLoc) receives all location records from ApMnDsptch via shared memory, and places the location records into the AP location database. ApDbRecvLoc starts ten threads that each retrieve location records from shared memory, validate each record before inserting the records into the database, and then inserts the records into the correct location record partition in the database. To preserve integrity, location records with any type of error are not written into the location record database but are instead placed into an error file that can be reviewed by the Wireless Location System operator and then manually entered into the database after error resolution. If the location database has failed or has been placed into off-line status, location records are written to a flat file where they can be later processed by ApDbFileRecv.

The AP File Receive Process (ApDbFileRecv) reads flat files containing location records and inserts the records into the location database. Flat files are a safe mechanism used by the AP 14 to completely preserve the integrity of the AP 14 in all cases except a complete failure of the hard disk drives. There are several different types of flat files read by ApDbFileRecv, including Database Down, Synchronization, Overflow, and Fixed Error. Database Down flat files are written by the ApDbRecvLoc process if the location database is temporarily inaccessible; this file allows the AP 14 to ensure that location records are preserved during the occurrence of this type of problem. Synchronization flat files are written by the ApLocSync process (described below) when transferring location records between pairs of redundant AP systems. Overflow flat files are written by ApMnDsptch when location records are arriving into the AP 14 at a rate faster than ApDbRecvLoc can process and insert the records into the location database. This may occur during very high peak rate periods. The overflow files prevent any records from being lost during peak periods. The Fixed Error flat files contain location records that had errors but have now been fixed, and can now be inserted into the location database.

Because the AP 14 has a critical centralized role in the Wireless Location System, the AP 14 architecture has been designed to be fully redundant. A redundant AP 14 system includes fully redundant hardware platforms, fully redundant RDBMS, redundant disk drives, and redundant networks to each other, the TLP's 12, the NOC's 16, and external applications. The software architecture of the AP 14 has also been designed to support fault tolerant redundancy. The following examples illustrate functionality supported by the redundant AP's. Each TLP 12 sends location records to both the primary and the redundant AP 14 when both AP's are in an online state. Only the primary AP 14 will process incoming tasking requests, and only the primary AP 14 will accept configuration change requests from the NOC 16. The primary AP 14 then synchronizes the redundant AP 14 under careful control. Both the primary and redundant AP's will accept basic startup and shutdown commands from the NOC. Both AP's constantly monitor their own system parameters and application health and monitor the corresponding parameters for the other AP 14, and then decide which AP 14 will be primary and which will be redundant based upon a composite score. This composite score is determined by compiling errors reported by various processes to a shared memory area, and monitoring swap space and disk space. There are several processes dedicated to supporting redundancy.

The AP Location Synchronization Process (ApLocSync) runs on each AP 14 and detects the need to synchronize location records between AP's, and then creates "sync records" that list the location records that need to be transferred from one AP 14 to another AP 14. The location records are then transferred between AP's using a socket connection. ApLocSync compares the location record partitions and the location record sequence numbers stored in each location database. Normally, if both the primary and redundant AP 14 are operating properly, synchronization is not needed because both AP's are receiving location records simultaneously from the TLP's 12. However, if one AP 14 fails or is placed in an off-line mode, then synchronization will later be required. ApLocSync is notified whenever ApMnDsptch connects to a TLP 12 so it can determine whether synchronization is required.

The AP Tasking Synchronization Process (ApTaskSync) runs on each AP 14 and synchronizes the tasking information between the primary AP 14 and the redundant AP 14. ApTaskSync on the primary AP 14 receives tasking information from ApDbSend, and then sends the tasking information to the ApTaskSync process on the redundant AP 14. If the primary AP 14 were to fail before ApTaskSync had completed replicating tasks, then ApTaskSync will perform a complete tasking database synchronization when the failed AP 14 is placed back into an online state.

The AP Configuration Synchronization Process (ApConfigSync) runs on each AP 14 and synchronizes the configuration information between the primary AP 14 and the redundant AP 14. ApConfigSync uses a RDBMS replication facility. The configuration information includes all information needed by the SCS's 10, TLP's 12, and AP's 14 for proper operation of the Wireless Location System in a wireless carrier's network.

In addition to the core functions described above, the AP 14 also supports a large number of processes, functions, and interfaces useful in the operation of the Wireless Location System, as well as useful for various applications that desire location information. While the processes, functions, and interfaces described herein are in this section pertaining to the AP 14, the implementation of many of these processes, functions, and interfaces permeates the entire Wireless Location System and therefore their inventive value should be not read as being limited only to the AP 14.

Roaming

The AP 14 supports "roaming" between wireless location systems located in different cities or operated by different wireless carriers. If a first wireless transmitter has subscribed to an application on a first Wireless Location System, and therefore has an entry in the Tasking List in the first AP 14 in the first Wireless Location System, then the first wireless transmitter may also subscribe to roaming. Each AP 14 and TLP 12 in each Wireless Location System contains a table in which a list of valid "home" subscriber identities is maintained. The list is typically a range, and for example, for current cellular telephones, the range can be determined by the NPA/NXX codes (or area code and exchange) associated with the MIN or MSID of cellular telephones. When a wireless transmitter meeting the "home" criteria makes a transmission, a TLP 12 receives demodulated data from one or more SCS's 10 and checks the trigger information in the Signal of Interest Table. If any trigger criterion is met, the location processing begins on that transmission; otherwise, the transmission is not processed by the Wireless Location System.

When a first wireless transmitter not meeting the "home" criterion makes a transmission in a second Wireless Location System, the second TLP 12 in the second Wireless Location System checks the Signal of Interest Table for a trigger. One of three actions then occurs: (i) if the transmission meets an already existing criteria in the Signal of Interest Table, the transmitter is located and the location record is forwarded from the second AP 14 in the second Wireless Location System to the first AP 14 in the first Wireless Location System; (ii) if the first wireless transmitter has a "roamer" entry in the Signal of Interest Table indicating that the first wireless transmitter has "registered" in the second Wireless Location System but has no trigger criteria, then the transmission is not processed by the second Wireless Location System and the expiration timestamp is adjusted as described below; (iii) if the first wireless transmitter has no "roamer" entry and therefore has not "registered", then the demodulated data is passed from the TLP 12 to the second AP 14.

In the third case above, the second AP 14 uses the identity of the first wireless transmitter to identify the first AP 14 in the first Wireless Location System as the "home" Wireless Location System of the first wireless transmitter. The second AP 14 in the second Wireless Location System sends a query to the first AP 14 in the first Wireless Location System to determine whether the first wireless transmitter has subscribed to any location application and therefore has any trigger criteria in the Tasking List of the first AP 14. If a trigger is present in the first AP 14, the trigger criteria, along with any associated fields and flags, is sent from the first AP 14 to the second AP 14 and entered in the Tasking List and the Signal of Interest Table as a "roamer" entry with trigger criteria. If the first AP 14 responds to the second AP 14 indicating that the first wireless transmitter has no trigger criteria, then the second AP 14 "registers" the first wireless transmitter in the Tasking List and the Signal of Interest Table as a "roamer" with no trigger criteria. Thus both current and future transmissions from the first wireless transmitter can be positively identified by the TLP 12 in the second Wireless Location System as being registered without trigger criteria, and the second AP 14 is not required to make additional queries to the first AP 14.

When the second AP 14 registers the first wireless transmitter with a roamer entry in the Tasking List and the Signal of Interest Table with or without trigger criteria, the roamer entry is assigned an expiration timestamp. The expiration timestamp is set to the current time plus a predetermined first interval. Every time the first wireless transmitter makes a transmission, the expiration timestamp of the roamer entry in the Tasking List and the Signal of Interest Table is adjusted to the current time of the most recent transmission plus the predetermined first interval. If the first wireless transmitter makes no further transmissions prior to the expiration timestamp of its roamer entry, then the roamer entry is automatically deleted. If, subsequent to the deletion, the first wireless transmitter makes another transmission, then the process of registering occurs again.

The first AP 14 and second AP 14 maintain communications over a wide area network. The network may be based upon TCP/IP or upon a protocol similar to the most recent version of IS-41. Each AP 14 in communications with other AP's in other wireless location systems maintains a table that provides the identity of each AP 14 and Wireless Location System corresponding to each valid range of identities of wireless transmitters.

Multiple Pass Location Records

Certain applications may require a very fast estimate of the general location of a wireless transmitter, followed by a more accurate estimate of the location that can be sent subsequently. This can be valuable, for example, for E9-1-1 systems that handle wireless calls and must make a call routing decision very quickly, but can wait a little longer for a more exact location to be displayed upon the E9-1-1 call-taker's electronic map terminal. The Wireless Location System supports these applications with an inventive multiple pass location processing mode, described later. The AP 14 supports this mode with multiple pass location records. For certain entries, the Tasking List in the AP 14 contains a flag indicating the maximum time limit before which a particular application must receive a rough estimate of location, and a second maximum time limit in which a particular application must receive a final location estimate. For these certain applications, the AP 14 includes a flag in the location record indicating the status of the location estimate contained in the record, which may, for example, be set to first pass estimate (i.e. rough) or final pass estimate. The Wireless Location System will generally determine the best location estimate within the time limit set by the application, that is the Wireless Location System will process the most amount of RF data that can be supported in the time limit. Given that any particular wireless transmission can trigger a location record for one or more applications, the Wireless Location System supports multiple modes simultaneously. For example, a wireless transmitter with a particular MIN can dial "911". This may trigger a two-pass location record for the E9-1-1 application, but a single pass location record for a fleet management application that is monitoring that particular MIN. This can be extended to any number of applications.

Multiple Demodulation and Triggers

In wireless communications systems in urban or dense suburban areas, frequencies or channels can be re-used several times within relatively close distances. Since the Wireless Location System is capable of independently detecting and demodulating wireless transmissions without the aid of the wireless communications system, a single wireless transmission can frequently be detected and successftlly demodulated at multiple SCS's 10 within the Wireless Location System. This can happen both intentionally and unintentionally. An unintentional occurrence is caused by a close frequency re-use, such that a particular wireless transmission can be received above a predetermined threshold at more than one SCS 10, when each SCS 10 believes it is monitoring only transmissions that occur only within the cell site collocated with the SCS 10. An intentional occurrence is caused by programming more than one SCS 10 to detect and demodulate transmissions that occur at a particular cell site and on a particular frequency. As described earlier, this is generally used with adjacent or nearby SCS's 10 to provide system demodulation redundancy to further increase the probability that any particular wireless transmission is successful detected and demodulated.

Either type of event could potentially lead to multiple triggers within the Wireless Location System, causing location processing to be initiated several times for the same transmission. This causes an excess and inefficient use of processing and communications resources. Therefore, the Wireless Location System includes means to detect when the same transmission has been detected and demodulated more than once, and to select the best demodulating SCS 10 as the starting point for location processing. When the Wireless Location System detects and successfully demodulates the same transmission multiple times at multiple SCS/antennas, the Wireless Location System uses the following criteria to select the one demodulating SCS/antenna to use to continue the process of determining whether to trigger and possibly initiate location processing (again, these criteria may be weighted in determining the final decision): (i) an SCS/antenna collocated at the cell site to which a particular frequency has been assigned is preferred over another SCS/antenna, but this preference may be adjusted if there is no operating and on-line SCS/antenna collocated at the cell site to which the particular frequency has been assigned, (ii) SCS/antennas with higher average SNR are preferred over those with lower average SNR, and (iii) SCS/antennas with fewer bit errors in demodulating the transmission are preferred over those with higher bit errors. The weighting applied to each of these preferences may be adjusted by the operator of the Wireless Location System to suit the particular design of each system.

Interface to Wireless Communications System

The Wireless Location System contains means to communicate over an interface to a wireless communications system, such as a mobile switching center (MSC) or mobile positioning controller (MPC). This interface may be based, for example, on a standard secure protocol such as the most recent version of the IS-41 or TCP/IP protocols. The formats, fields, and authentication aspects of these protocols are well known. The Wireless Location System supports a variety of command/response and informational messages over this interface that are designed to aid in the successful detection, demodulation, and triggering of wireless transmissions, as well as providing means to pass location records to the wireless communications system. In particular, this interface provides means for the Wireless Location System to obtain information about which wireless transmitters have been assigned to particular voice channel parameters at particular cell sites. Example messages supported by the Wireless Location System over this interface to the wireless communications system include the following:

Query on MIN/MDN/MSID/IMSI/TMSI Mapping—Certain types of wireless transmitters will transmit their identity in a familiar form that can be dialed over the telephone network. Other types of wireless transmitters transmit an identity that cannot be dialed, but which is translated into a number that can be dialed using a table inside of the wireless communications system. The transmitted identity is permanent in most cases, but can also be temporary. Users of location applications connected to the AP 14 typically prefer to place triggers onto the Tasking List using identities that can be dialed. Identities that can be dialed are typically known as Mobile Directory Numbers (MDN). The other types of identities for which translation may be required includes Mobile Identity Number (MIN), Mobile Subscriber Identity (MSID), International Mobile Subscriber Identity (IMSI), and Temporary Mobile Subscriber Identity (TMSI). If the wireless communications system has enabled the use of encryption for any of the data fields in the messages transmitted by wireless transmitters, the Wireless Location System may also query for encryption information along with the identity information. The Wireless Location System includes means to query the wireless communications system for the alternate identities for a trigger identity that has been placed onto the Tasking List by a location application, or to query the wireless communications system for alternate identities for an identity that has been demodulated by an SCS 10. Other events can also trigger this type of query. For this type of query, typically the Wireless Location System initiates the command, and the wireless communications system responds.

Query/Command Change on Voice RF Channel Assignment—Many wireless transmissions on voice channels do not contain identity information. Therefore, when the Wireless Location System is triggered to perform location processing on a voice channel transmission, the Wireless Location System queries the wireless communication system to obtain the current voice channel assignment information for the particular transmitter for which the Wireless Location System has been triggered. For an AMPS transmission, for example, the Wireless Location System preferably requires the cell site, sector, and RF channel number currently in use by the wireless transmitter. For a TDMA transmission, for example, the Wireless Location System preferably requires the cell site, sector, RF channel number, and timeslot currently in use by the wireless transmitter. Other information elements that may be needed includes long code mask and encryption keys. In general, the Wireless Location System will initiate the command, and the wireless communications system will respond. However, the Wireless Location System will also accept a trigger command from the wireless communications system that contains the information detailed herein.

The timing on this command/response message set is very critical since voice channel handoffs can occur quite frequently in wireless communications systems. That is, the Wireless Location System will locate any wireless transmitter that is transmitting on a particular channel—therefore the Wireless Location System and the wireless communications system must jointly be certain that the identity of the wireless transmitter and the voice channel assignment information are in perfect synchronization. The Wireless Location System uses several means to achieve this objective. The Wireless Location System may, for example, query the voice channel assignment information for a particular wireless transmitter, receive the necessary RF data, then again query the voice channel assignment information for that same wireless transmitter, and then verify that the status of the wireless transmitter did not change during the time in which the RF data was being collected by the Wireless Location System. Location processing is not required to complete before the second query, since it is only important to verify that the correct RF data was received. The Wireless Location System may also, for example, as part of the first query command the wireless communications system to prevent a handoff from occurring for the particular wireless transmitter during the time period in which the Wireless Location System is receiving the RF data. Then, subsequent to collecting the RF data, the Wireless Location System will again query the voice channel assignment information for that same wireless transmitter, command the wireless communications system to again permit handoffs for said wireless transmitter and then verify that the status of the wireless transmitter did not change during the time in which the RF data was being collected by the Wireless Location System.

For various reasons, either the Wireless Location System or the wireless communications system may prefer that the wireless transmitter be assigned to another voice RF channel prior to performing location processing. Therefore, as part of the command/response sequence, the wireless communications system may instruct the Wireless Location System to temporarily suspend location processing until the wireless communications system has completed a handoff sequence with the wireless transmitter, and the wireless communications system has notified the Wireless Location System that RF data can be received, and the voice RF channel upon which the data can be received. Alternately, the Wireless Location System may determine that the particular voice RF channel which a particular wireless transmitter is currently using is unsuitable for obtaining an acceptable location estimate, and request that the wireless communications system command the wireless transmitter to handoff. Alternately, the Wireless Location System may request that the wireless communications system command the wireless transmitter to handoff to a series of voice RF channels in sequence in order to perform a series of location estimates, whereby the Wireless Location System can improve upon the accuracy of the location estimate through the series of handoffs; this method is further described later.

The Wireless Location System can also use this command/response message set to query the wireless communications system about the identity of a wireless transmitter that had been using a particular voice channel (and timeslot, etc.) at a particular cell site at a particular time. This enables the Wireless Location System to first perform location processing on transmissions without knowing the identities, and then to later determine the identity of the wireless transmitters making the transmissions and append this information to the location record. This particular inventive feature enables the use of automatic sequential location of voice channel transmissions.

Receive Triggers—The Wireless Location System can receive triggers from the wireless communications system to perform location processing on a voice channel transmission without knowing the identity of the wireless transmitter. This message set bypasses the Tasking List, and does not use the triggering mechanisms within the Wireless Location System. Rather, the wireless communications system alone determines which wireless transmissions to locate, and then send a command to the Wireless Location System to collect RF data from a particular voice channel at a particular cell site and to perform location processing. The Wireless Location System responds with a confirmation containing a timestamp when the RF data was collected. The Wireless Location System also responds with an appropriate format location record when location processing has completed. Based upon the time of the command to Wireless Location System and the response with the RF data collection timestamp, the wireless communications system determines whether the wireless transmitter status changed subsequent to the command and whether there is a good probability of successful RF data collection.

Make Transmit—The Wireless Location System can command the wireless communications system to force a particular wireless transmitter to make a transmission at a particular time, or within a prescribed range of times. The wireless communications system responds with a confirmation and a time or time range in which to expect the transmission. The types of transmissions that the Wireless Location System can force include, for example, audit responses and page responses.

Using this message set, the Wireless Location System can also command the wireless communications system to force the wireless transmitter to transmit using a higher power level setting. In many cases, wireless transmitters will attempt to use the lowest power level settings when transmitting in order to conserve battery life. In order improve the accuracy of the location estimate, the Wireless Location System may prefer that the wireless transmitter use a higher power level setting. The wireless communications system will respond to the Wireless Location System with a confirmation that the higher power level setting will be used and a time or time range in which to expect the transmission.

Delay Wireless Communications System Response to Mobile Access—Some air interface protocols, such as CDMA, use a mechanism in which the wireless transmitter initiates transmissions on a channel, such as an Access Channel, for example, at the lowest or a very low power level setting, and then enters a sequence of steps in which (i) the wireless transmitter makes an access transmission; (ii) the wireless transmitter waits for a response from the wireless communications system; (iii) if no response is received by the wireless transmitter from the wireless communications system within a predetermined time, the wireless transmitter increases its power level setting by a predetermined amount, and then returns to step (i); (iv) if a response is received by the wireless transmitter from the wireless communications system within a predetermined time, the wireless transmitter then enters a normal message exchange. This mechanism is useful to ensure that the wireless transmitter uses only the lowest useful power level setting for transmitting and does not further waste energy or battery life. It is possible, however, that the lowest power level setting at which the wireless transmitter can successfully communicate with the wireless communications system is not sufficient to obtain an acceptable location estimate. Therefore, the Wireless Location System can command the wireless communications system to delay its response to these transmissions by a predetermined time or amount. This delaying action will cause the wireless transmitter to repeat the sequence of steps (i) through (iii) one or more times than normal with the result that one or more of the access transmissions will be at a higher power level than normal. The higher power level may preferably enable the Wireless Location System to determine a more accurate location estimate. The Wireless Location System may command this type of delaying action for either a particular wireless transmitter, for a particular type of wireless transmission (for example, for all '911' calls), for wireless transmitters that are at a specified range from the base station to which the transmitter is attempting to communicate, or for all wireless transmitters in a particular area.

Send Confirmation to Wireless Transmitter—The Wireless Location System does not include means within to notify the wireless transmitter of an action because the Wireless Location System cannot transmit; as described earlier the Wireless Location System can only receive transmissions. Therefore, if the Wireless Location System desires to send, for example, a confirmation tone upon the completion of a certain action, the Wireless Location System commands the wireless communications system to transmit a particular message. The message may include, for example, an audible confirmation tone, spoken message, or synthesized message to the wireless transmitter, or a text message sent via a short messaging service or a page. The Wireless Location System receives confirmation from the wireless communications system that the message has been accepted and sent to the wireless transmitter. This command/response message set is important in enabling the Wireless Location System to support certain end-user application functions such as Prohibit Location Processing.

Report Location Records—The Wireless Location System automatically reports location records to the wireless communications system for those wireless transmitters tasked to report to the wireless communications system, as well as for those transmissions that the wireless communications system initiated triggers. The Wireless Location System also reports on any historical location record queried by the wireless communications system and which the wireless communications system is authorized to receive.

Monitor Internal Wireless Communications System Interfaces, State Table

In addition to this above interface between the Wireless Location System and the wireless communications system, the Wireless Location System also includes means to monitor existing interfaces within the wireless communications system for the purpose of intercepting messages important to the Wireless Location System for identifying wireless transmitters and the RF channels in use by these transmitters. These interfaces may include, for example, the "a-interface" and "a-bis interface" used in wireless communications systems employing the GSM air interface protocol. These interfaces are well-known and published in various standards. By monitoring the bi-directional messages on these interfaces between base stations (BTS), base station controllers (BSC), and mobile switching centers (MSC), and other points, the Wireless Location System can obtain the same information about the assignment of wireless transmitters to specific channels as the wireless communications system itself knows. The Wireless Location System includes means to monitor these interfaces at various points. For example, the SCS 10 may monitor a BTS to BSC interface. Alternately, a TLP 12 or AP 14 may also monitor a BSC where a number of BTS to BSC interfaces have been concentrated. The interfaces internal to the wireless communications system are not encrypted and the layered protocols are known to those familiar with the art. The advantage to the Wireless Location System to monitoring these interfaces is that the Wireless Location System may not be required to independently detect and demodulate control channel messages from wireless transmitters. In addition, the Wireless Location System may obtain all necessary voice channel assignment information from these interfaces.

Using these means for a control channel transmission, the SCS 10 receives the transmissions as described earlier and records the control channel RF data into memory without performing detection and demodulation. Separately, the Wireless Location System monitors the messages occurring over prescribed interfaces within the wireless communications system, and causes a trigger in the Wireless Location System when the Wireless Location System discovers a message containing a trigger event. Initiated by the trigger event, the Wireless Location System determines the approximately time at which the wireless transmission occurred, and commands a first SCS 10 and a second SCS 10B to each search its memory for the start of transmission. This first SCS 10A chosen is an SCS that is either collocated with the base station to which the wireless transmitter had communicated, or an SCS which is adjacent to the base station to which the wireless transmitter had communicated. That is, the first SCS 10A is an SCS which would have been assigned the control channel as a primary channel. If the first SCS 10A successfully determines and reports the start of the transmission, then location processing proceeds normally, using the means described below. If the first SCS 10A cannot successfully determine the start of transmission, then the second SCS 10B reports the start of transmission, and then location processing proceeds normally.

The Wireless Location System also uses these means for voice channel transmissions. For all triggers contained in the Tasking List, the Wireless Location System monitors the prescribed interfaces for messages pertaining to those triggers. The messages of interest include, for example, voice channel assignment messages, handoff messages, frequency hopping messages, power up/power down messages, directed re-try messages, termination messages, and other similar action and status messages. The Wireless Location System continuously maintains a copy of the state and status of these wireless transmitters in a State Table in the AP 14. Each time that the Wireless Location System detects a message pertaining to one of the entries in the Tasking List, the Wireless Location System updates its own State Table. Thereafter, the Wireless Location System may trigger to perform location processing, such as on a regular time interval, and access the State Table to determine precisely which cell site, sector, RF channel, and timeslot is presently being used by the wireless transmitter. The example contained herein described the means by which the Wireless Location System interfaces to a GSM based wireless communications system. The Wireless Location System also supports similar functions with systems based upon other air interfaces.

For certain air interfaces, such as CDMA, the Wireless Location System also keeps certain identity information obtained from Access bursts in the control channel in the State Table; this information is later used for decoding the masks used for voice channels. For example, the CDMA air interface protocol uses the Electronic Serial Number (ESN) of a wireless transmitter to, in part, determine the long code mask used in the coding of voice channel transmissions. The Wireless Location System maintains this information in the State Table for entries in the Tasking List because many wireless transmitters may transmit the information only once; for example, many CDMA mobiles will only transmit their ESN during the first Access burst after the wireless transmitter become active in a geographic area. This ability to independently determine the long code mask is very useful in cases where an interface between the Wireless Location System and the wireless communications system is not operative and/or the Wireless Location System is not able to monitor one of the interfaces internal to the wireless communications system. The operator of the Wireless Location System may optionally set the Wireless Location System to maintain the identity information for all wireless transmitters. In addition to the above reasons, the Wireless Location System can provide the voice channel tracking for all wireless transmitters that trigger location processing by calling "911". As described earlier, the Wireless Location System uses dynamic tasking to provide location to a wireless transmitter for a prescribed time after dialing "911", for example. By maintaining the identity information for all wireless transmitters in the State Table, the Wireless Location System is able to provide voice channel tracking for all transmitters in the event of a prescribed trigger event, and not just those with prior entries in the Tasking List.

Applications Interface

Using the AP 14, the Wireless Location System supports a variety of standards based interfaces to end-user and carrier location applications using secure protocols such as TCP/IP, X.25, SS-7, and IS-41. Each interface between the AP 14 and an external application is a secure and authenticated connection that permits the AP 14 to positively verify the identity of the application that is connected to the AP 14. This is necessary because each connected application is granted only limited access to location records on a real-time and/or historical basis. In addition, the AP 14 supports additional command/response, real-time, and post-processing functions that are further detailed below. Access to these additional functions also requires authentication. The AP 14 maintains a user list and the authentication means associated with each user. No application can gain access to location records or functions for which the application does not have proper authentication or access rights. In addition, the AP 14 supports full logging of all actions taken by each application in the event that problems arise or a later investigation into actions is required. For each command or function in the list below, the AP 14 preferably supports a protocol in which each action or the result of each is confirmed, as appropriate.

Edit Tasking List—This command permits external applications to add, remove, or edit entries in the Tasking List, including any fields and flags associated with each entry. This command can be supported on a single entry basis, or a batch entry basis where a list of entries is included in a single command. The latter is useful, for example, in a bulk application such as location sensitive billing whereby larger volumes of wireless transmitters are being supported by the external application, and it is desired to minimize protocol overhead. This command can add or delete applications for a particular entry in the Tasking List, however, this command cannot delete an entry entirely if the entry also contains other applications not associated with or authorized by the application issuing the command.

Set Location Interval—The Wireless Location System can be set to perform location processing at any interval for a particular wireless transmitter, on either control or voice channels. For example, certain applications may require the location of a wireless transmitter every few seconds when the transmitter is engaged on a voice channel. When the wireless transmitter make an initial transmission, the Wireless Location System initially triggers using a standard entry in the Tasking List. If one of the fields or flags in this entry specifies updated location on a set interval, then the Wireless Location System creates a dynamic task in the Tasking List that is triggered by a timer instead of an identity or other transmitted criteria. Each time the timer expires, which can range from 1 second to several hours, the Wireless Location System will automatically trigger to locate the wireless transmitter. The Wireless Location System uses its interface to the wireless communications system to query status of the wireless transmitter, including voice call parameters as described earlier. If the wireless transmitter is engaged on a voice channel, then the Wireless Location System performs location processing. If the wireless transmitter is not engaged in any existing transmissions, the Wireless Location System will command the wireless communications system to make the wireless transmitter immediately transmit. When the dynamic task is set, the Wireless Location System also sets an expiration time at which the dynamic task ceases.

End-User Addition/Deletion—This command can be executed by an end-user of a wireless transmitter to place the identity of the wireless transmitter onto the Tasking List with location processing enabled, to remove the identity of the wireless transmitter from the Tasking List and therefore eliminate identity as a trigger, or to place the identity of the wireless transmitter onto the Tasking List with location processing disabled. When location processing has been disabled by the end-user, known as Prohibit Location Processing then no location processing will be performed for the wireless transmitter. The operator of the Wireless Location System can optionally select one of several actions by the Wireless Location System in response to a Prohibit Location Processing command by the end user: (i) the disabling action can override all other triggers in the Tasking List, including a trigger due to an emergency call such as "911", (ii) the disabling action can override any other trigger in the Tasking List, except a trigger due to an emergency call such as "911", (iii) the disabling action can be overridden by other select triggers in the Tasking List. In the first case, the end-user is granted complete control over the privacy of the transmissions by the wireless transmitter, as no location processing will be performed on that transmitter for any reason. In the second case, the end-user may still receive the benefits of location during an emergency, but at no other times. In an example of the third case, an employer who is the real owner of a particular wireless transmitter can override an end-user action by an employee who is using the wireless transmitter as part of the job but who may not desire to be located. The Wireless Location System may query the wireless communications system, as described above, to obtain the mapping of the identity contained in the wireless transmission to other identities.

The additions and deletions by the end-user are effected by dialed sequences of characters and digits and pressing the "SEND" or equivalent button on the wireless transmitter. These sequences may be optionally chosen and made known by the operator of the Wireless Location System. For example, one sequence may be "*55SEND" to disable location processing. Other sequences are also possible. When the end-user can dialed this prescribed sequence, the wireless transmitter will transmit the sequence over one of the prescribed control channels of the wireless communications system. Since the Wireless Location System independently detects and demodulates all reverse control channel transmissions, the Wireless Location System can independently interpret the prescribed dialed sequence and make the appropriate feature updates to the Tasking List, as described above. When the Wireless Location System has completed the update to the Tasking List, the Wireless Location System commands the wireless communications system to send a confirmation to the end-user. As described earlier, this may take the form of an audible tone, recorded or synthesized voice, or a text message. This command is executed over the interface between the Wireless Location System and the wireless communications system.

Command Transmit—This command allows external applications to cause the Wireless Location System to send a command to the wireless communications system to make a particular wireless transmitter, or group of wireless transmitters, transmit. This command may contain a flag or field that the wireless transmitter(s) should transmit immediately or at a prescribed time. This command has the effort of locating the wireless transmitter(s) upon command, since the transmissions will be detected, demodulated, and triggered, causing location processing and the generation of a location record. This is useful in eliminating or reducing any delay in determining location such as waiting for the next registration time period for the wireless transmitter or waiting for an independent transmission to occur.

External Database Query and Update—The Wireless Location System includes means to access an external database, to query the said external database using the identity of the wireless transmitter or other parameters contained in the transmission or the trigger criteria, and to merge the data obtained from the external database with the data generated by the Wireless Location System to create a new enhanced location record.

The enhanced location record may then be forwarded to requesting applications. The external database may contain, for example, data elements such as customer information, medical information, subscribed features, application related information, customer account information, contact information, or sets of prescribed actions to take upon a location trigger event. The Wireless Location System may also cause updates to the external database, for example, to increment or decrement a billing counter associated with the provision of location services, or to update the external database with the latest location record associated with the particular wireless transmitter. The Wireless Location System contains means to performed the actions described herein on more than one external database. The list and sequence of external databases to access and the subsequent actions to take are contained in one of the fields contained in the trigger criteria in the Tasking List.

Random Anonymous Location Processing—The Wireless Location System includes means to perform large scale random anonymous location processing. This function is valuable to certain types of applications that require the gathering of a large volume of data about a population of wireless transmitters without consideration to the specific identities of the individual transmitters. Applications of this type include: RF Optimization, which enables wireless carriers to measure the performance of the wireless communications system by simultaneously determining location and other parameters of a transmission; Traffic Management, which enables government agencies and commercial concerns to monitor the flow of traffic on various highways using statistically significant samples of wireless transmitters travelling in vehicles; and Local Traffic Estimation, which enables commercial enterprises to estimate the flow of traffic around a particular area which may help determine the viability of particular businesses.

Applications requesting random anonymous location processing optionally receive location records from two sources: (i) a copy of location records generated for other applications, and (ii) location records which have been triggered randomly by the Wireless Location System without regard to any specific criteria. All of the location records generated from either source are forwarded with all of the identity and trigger criteria information removed from the location records; however, the requesting application(s) can determine whether the record was generated from the fully random process or is a copy from another trigger criteria. The random location records are generated by a low priority task within the Wireless Location System that performs location processing on randomly selected transmissions whenever processing and communications resources are available and would otherwise be unused at a particular instant in time. The requesting application(s) can specify whether the random location processing is performed over the entire coverage area of a Wireless Location System, over specific geographic areas such as along prescribed highways, or by the coverage areas of specific cell sites. Thus, the requesting application(s) can direct the resources of the Wireless Location System to those area of greatest interest to each application. Depending on the randomness desired by the application(s), the Wireless Location System can adjust preferences for randomly selecting certain types of transmissions, for example, registration messages, origination messages, page response messages, or voice channel transmissions.

Anonymous Tracking of a Geographic Group—The Wireless Location System includes means to trigger location processing on a repetitive basis for anonymous groups of wireless transmitters within a prescribed geographic area. For example, a particular location application may desire to monitor the travel route of a wireless transmitter over a prescribed period of time, but without the Wireless Location System disclosing the particular identity of the wireless transmitter. The period of time may be many hours, days, or weeks. Using the means, the Wireless Location System: randomly selects a wireless transmitter that initiates a transmission in the geographic area of interest to the application; performs location processing on the transmission of interest; irreversibly translates and encrypts the identity of the wireless transmitter into a new coded identifier; creates a location record using only the new coded identifier as an identifying means; forwards the location record to the requesting location application(s); and creates a dynamic task in the Tasking List for the wireless transmitter, where the dynamic task has an associated expiration time. Subsequently, whenever the prescribed wireless transmitter initiates transmission, the Wireless Location System shall trigger using the dynamic task, perform location processing on the transmission of interest, irreversibly translate and encrypt the identity of the wireless transmitter into the new coded identifier using the same means as prior such that the coded identifier is the same, create a location record using the coded identifier, and forward the location record to the requesting location application(s). The means described herein can be combined with other functions of the Wireless Location System to perform this type of monitoring use either control or voice channel transmissions. Further, the means described herein completely preserve the private identity of the wireless transmitter, yet enables another class of applications that can monitor the travel patterns of wireless transmitters. This class of applications can be of great value in determining the planning and design of new roads, alternate route planning, or the construction of commercial and retail space.

Location Record Grouping, Sorting, and Labeling—The Wireless Location System include means to post-process the location records for certain requesting applications to group, sort, or label the location records. For each interface supported by the Wireless Location System, the Wireless Location System stores a profile of the types of data for which the application is both authorized and requesting, and the types of filters or post-processing actions desired by the application. Many applications, such as the examples contained herein, do not require individual location records or the specific identities of individual transmitters. For example, an RF optimization application derives more value from a large data set of location records for a particular cell site or channel than it can from any individual location record. For another example, a traffic monitoring application requires only location records from transmitters that are on prescribed roads or highways, and additionally requires that these records be grouped by section of road or highway and by direction of travel. Other applications may request that the Wireless Location System forward location records that have been formatted to enhance visual display appeal by, for example, adjusting the location estimate of the transmitter so that the transmitter's location appears on an electronic map directly on a drawn road segment rather than adjacent to the road segment. Therefore, the Wireless Location System preferably "snaps" the location estimate to the nearest drawn road segment.

The Wireless Location System can filter and report location records to an application for wireless transmitters communicating only on a particular cell site, sector, RF channel, or group of RF channels. Before forwarding the record to the requesting application, the Wireless Location System first verifies that the appropriate fields in the record satisfy the requirements. Records not matching the requirements are not forwarded, and records matching the requirements are forwarded. Some filters are geographic and must be calculated by the Wireless Location System. For example, the Wireless Location System can process a location record to determine the closest road segment and direction of travel of the wireless transmitter on the road segment. The Wireless Location System can then forward only records to the application that are determined to be on a particular road segment, and can further enhance the location record by adding a field containing the determined road segment. In order to determine the closest road segment, the Wireless Location System is provided with a database of road segments of interest by the requesting application. This database is stored in a table where each road segment is stored with a latitude and longitude coordinate defining the end point of each segment. Each road segment can be modeled as a straight or curved line, and can be modeled to support one or two directions of travel. Then for each location record determined by the Wireless Location System, the Wireless Location System compares the latitude and longitude in the location record to each road segment stored in the database, and determines the shortest distance from a modeled line connecting the end points of the segment to the latitude and longitude of the location record. The shortest distance is a calculated imaginary line orthogonal to the line connecting the two end points of the stored road segment. When the closest road segment has been determined, the Wireless Location System can further determine the direction of travel on the road segment by comparing the direction of travel of the wireless transmitter reported by the location processing to the orientation of the road segment. The direction that produces the smallest error with respect to the orientation of the road segments is then reported by the Wireless Location System.

Network Operations Console (NOC) 16

The NOC 16 is a network management system that permits operators of the Wireless Location System easy access to the programming parameters of the Wireless Location System. For example, in some cities, the Wireless Location System may contain many hundreds or even thousands of SCS's 10. The NOC is the most effective way to manage a large Wireless Location System, using graphical user interface capabilities. The NOC will also receive real time alerts if certain functions within the Wireless Location System are not operating properly. These real time alerts can be used by the operator to take corrective action quickly and prevent a degradation of location service. Experience with trials of the Wireless Location System show that the ability of the system to maintain good location accuracy over time is directly related to the operator's ability to keep the system operating within its predetermined parameters.

Location Processing

The Wireless Location System is capable of performing location processing using two different methods known as central based processing and station based processing. Both techniques were first disclosed in U.S. Pat. No. 5,327,144, and are further enhanced in this specification. Location processing depends in part on the ability to accurately determine certain phase characteristics of the signal as received at multiple antennas and at multiple SCS's 10. Therefore, it is an object of the Wireless Location System to identify and remove sources of phase error that impede the ability of the location processing to determine the phase characteristics of the received signal. One source of phase error is inside of the wireless transmitter itself, namely the oscillator (typically a crystal oscillator) and the phase lock loops that allow the phone to tune to specific channels for transmitting. Lower cost crystal oscillators will generally have higher phase noise. Some air interface specifications, such as IS-136 and IS-95A, have specifications covering the phase noise with which a wireless telephone can transmit. Other air interface specifications, such as IS-553A, do not closely specify phase noise. It is therefore an object of the present invention to automatically reduce and/or eliminate a wireless transmitter's phase noise as a ource of phase error in location processing, in part by automatically selecting the use of central based processing or station based processing. The automatic selection will also consider the efficiency with which the communications link between the SCS 10 and the TLP 12 is used, and the availability of DSP resources at each of the SCS 10 and TLP 12.

Figure 6:
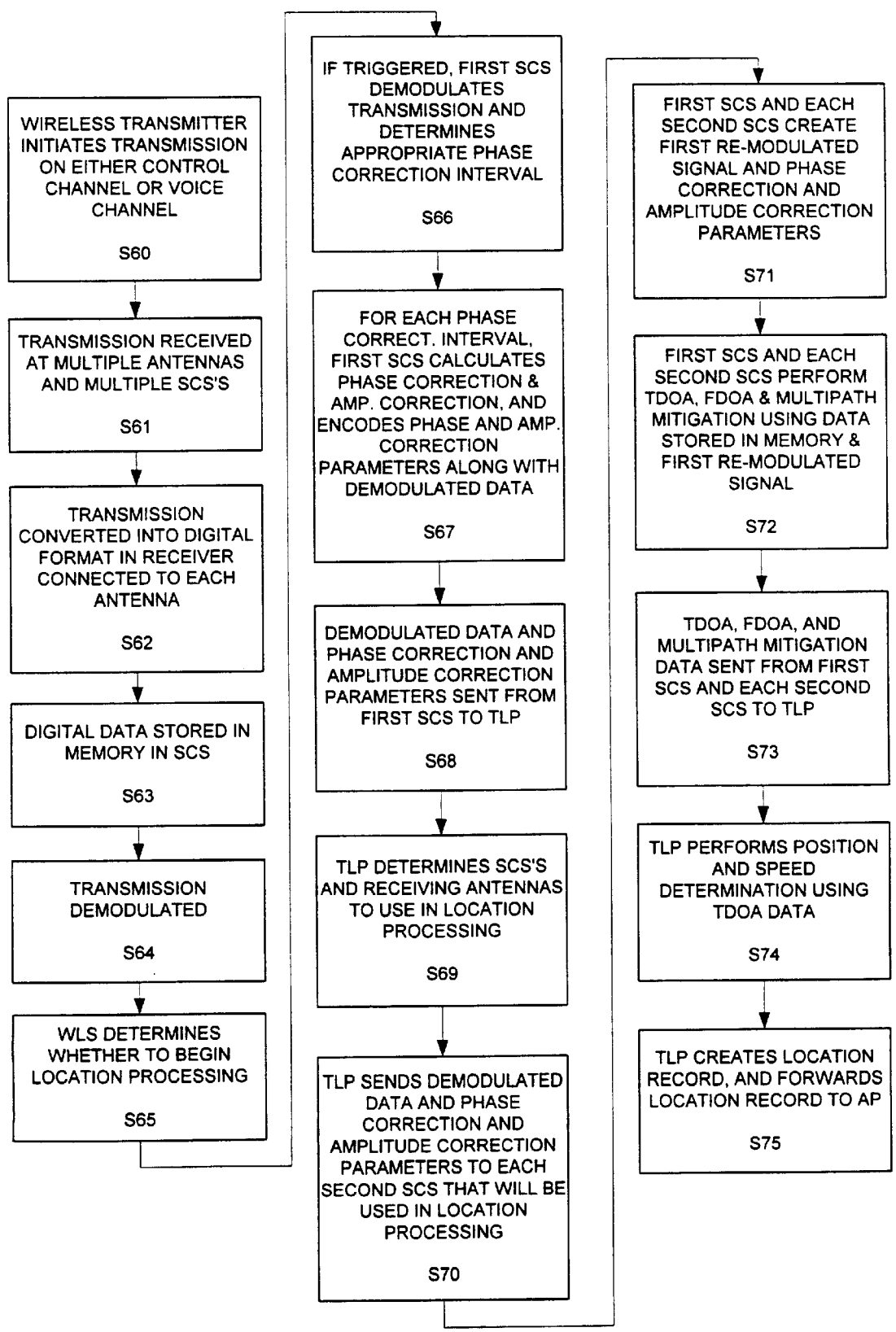
FIG. 6 is a flowchart of a station-based location processing method in accordance with the present invention.

When using central based processing, the TDOA and FDOA determination and the multipath processing are performed in the TLP 12 along with the position and speed determination. This method is preferred when the wireless transmitter has a phase noise that is above a predetermined threshold. In these cases, central based processing is most effective in reducing or eliminating the phase noise of the wireless transmitter as a source of phase error because the TDOA estimate is performed using a digital representation of the actual RF transmission from two antennas, which may be at the same SCS 10 or different SCS's 10. In this method, those skilled in the art will recognize that the phase noise of the transmitter is a common mode noise in the TDOA processing, and therefore is self-canceling in the TDOA determination process. This method works best, for example, with many very low cost AMPS cellular telephones that have a high phase noise. The basic steps in central based processing include the steps recited below and represented in the flowchart of FIG. 6:

- a wireless transmitter initiates a transmission on either a control channel or a voice channel (step S50);
- the transmission is received at multiple antennas and at multiple SCS's 10 in the Wireless Location System (step S51);
- the transmission is converted into a digital format in the receiver connected to each SCS/antenna (step S52);
- the digital data is stored in a memory in the receivers in each SCS 10 (step S53); the transmission is demodulated (step S54);
- the Wireless Location System determines whether to begin location processing for the transmission (step S55);
- if triggered, the TLP 12 requests copies of the digital data from the memory in receivers at multiple SCS's 10 (step S56);
- digital data is sent from multiple SCS's 10 to a selected TLP 12 (step S57);
- the TLP 12 performs TDOA, FDOA, and multipath mitigation on the digital data from pairs of antennas (step S58);
- the TLP 12 performs position and speed determination using the TDOA data, and then creates a location record and forwards the location record to the AP 14 (step S59).

The Wireless Location System uses a variable number of bits to represent the transmission when sending digital data from the SCS's 10 to the TLP 12. As discussed earlier, the SCS receiver digitizes wireless transmissions with a high resolution, or a high number of bits per digital sample in order to achieve a sufficient dynamic range. This is especially required when using wideband digital receivers, which may be simultaneously receiving signals near to the SCS 10A and far from the SCS 10B. For example, up to 14 bits may be required to represent a dynamic range of 84 dB. Location processing does not always require the high resolution per digital sample, however. Frequently, locations of sufficient accuracy are achievable by the Wireless Location System using a fewer number of bits per digital sample. Therefore, to minimize the implementation cost of the Wireless Location System by conserving bandwidth on the communication links between each SCS 10 and TLP 12, the Wireless Location System determines the fewest number of bits required to digitally represent a transmission while still maintaining a desired accuracy level. This determination is based, for example, on the particular air interface protocol used by the wireless transmitter, the SNR of the transmission, the degree to which the transmission has been perturbed by fading and/or multipath, and the current state of the processing and communication queues in each SCS 10. The number of bits sent from the SCS 10 to the TLP 12 are reduced in two ways: the number of bits per sample is minimized, and the shortest length, or fewest segments, of the transmission possible is used for location processing. The TLP 12 can use this minimal RF data to perform location processing and then compare the result with the desired accuracy level. This comparison is performed on the basis of a confidence interval calculation. If the location estimate does not fall within the desired accuracy limits, the TLP 12 will recursively request additional data from selected SCS's 10. The additional data may include an additional number of bits per digital sample and/or may include more segments of the transmission. This process of requesting additional data may continue recursively until the TLP 12 has achieved the prescribed location accuracy.

There are additional details to the basic steps described above. These details are described in prior U.S. Pat. Nos. 5,327,144 and 5,608,410 in other parts of this specification. One enhancement to the processes described in earlier patents is the selection of a single reference SCS/antenna that is used for each baseline in the location processing. In prior art, baselines were determined using pairs of antenna sites around a ring. In the present Wireless Location System, the single reference SCS/antenna used is generally the highest SNR signal, although other criteria are also used as described below. The use of a high SNR reference aids central based location processing when the other SCS/antennas used in the location processing are very weak, such as at or below the noise floor (i.e. zero or negative signal to noise ratio). When station based location processing is used, the reference signal is a re-modulated signal, which is intentionally created to have a very high signal to noise ratio, further aiding location processing for very weak signals at other SCS/antennas. The actual selection of the reference SCS/antenna is described below.

The Wireless Location System mitigates multipath by first recursively estimating the components of multipath received in addition to the direct path component and then subtracting these components from the received signal. Thus the Wireless Location System models the received signal and compares the model to the actual received signal and attempts to minimize the difference between the two using a weighted least square difference. For each transmitted signal x(t) from a wireless transmitter, the received signal y(t) at each SCS/antenna is a complex combination of signals:

$$y(t) = \Sigma x(t-\tau_n) a_n e^{j\omega(t-\tau n)}, \text{ for all } n=0 \text{ to } N;$$

where x(t) is the signal as transmitted by the wireless transmitter; $a_n$ and $\tau_n$ are the complex amplitude and delays of the multipath components; N is the total number of multipath components in the received signal; and $a_0$ and $\tau_0$ are constants for the most direct path component.

The operator of the Wireless Location System empirically determines a set of constraints for each component of multipath that applies to the specific environment in which each Wireless Location System is operating. The purpose of the constraints is to limit the amount of processing time that the Wireless Location System spends optimizing the results for each multipath mitigation calculation. For example, the Wireless Location System may be set to determine only four components of multipath: the first component may be assumed to have a time delay in the range $\tau_{1A}$ to $\tau_{1B}$; the second component may be assumed to have a time delay in the range $\tau_{2A}$ to $\tau_{2B}$; the third component may be assumed to have a time delay in the range. $\tau_{3A}$ to $\tau_{3B}$; and similar for the fourth component; however the fourth component is a single value that effectively represents a complex combination of many tens of individual (and somewhat diffuse) multipath components whose time delays exceed the range of the third component. For ease of processing, the Wireless Location System transforms the prior equation into the frequency domain, and then solves for the individual components such that a weighted least squares difference is minimized.

When using station based processing, the TDOA and FDOA determination and multipath mitigation are performed in the SCS's 10, while the position and speed determination are typically performed in the TLP 12. The main advantage of station based processing, as described in U.S. Pat. No. 5,327,144, is reducing the amount of data that is sent on the communication link between each SCS 10 and TLP 12. However, there may be other advantages as well. One new objective of the present invention is increasing the effective signal processing gain during the TDOA processing. As pointed out earlier, central based processing has the advantage of eliminating or reducing phase error caused by the phase noise in the wireless transmitter. However, no previous disclosure has addressed how to eliminate or reduce the same phase noise error when using station based processing. The present invention reduces the phase error and increases the effective signal processing gain using the steps recited below and shown in FIG. 6:

- a wireless transmitter initiates a transmission on either a control channel or a voice channel (step S60);
- the transmission is received at multiple antennas and at multiple SCS's 10 in the Wireless Location System (step S61);
- the transmission is converted into a digital format in the receiver connected to each antenna (step S62);
- the digital data is stored in a memory in the SCS 10 (step S63); the transmission is demodulated (step S64);
- the Wireless Location System determines whether to begin location processing for the transmission (step S65);
- if triggered, a first SCS 10A demodulates the transmission and determines an appropriate phase correction interval (step S66);
- for each such phase correction interval, the first SCS 10A calculates an appropriate phase correction and amplitude correction, and encodes this phase correction parameter and amplitude correction parameter along with the demodulated data (step S67);
- the demodulated data and phase correction and amplitude correction parameters are sent from the first SCS 10A to a TLP 12 (step S68);
- the TLP 12 determines the SCS's 10 and receiving antennas to use in the location processing (step S69);
- the TLP 12 sends the demodulated data and phase correction and amplitude correction parameters to each second SCS 10B that will be used in the location processing (step S70);
- the first SCS 10 and each second SCS 10B creates a first re-modulated signal based upon the demodulated data and the phase correction and amplitude correction parameters (step S71);
- the first SCS 10A and each second SCS 10B performs TDOA, FDOA, and multipath mitigation using the digital data stored in memory in each SCS 10 and the first remodulated signal (step S72);
- the TDOA, FDOA, and multipath mitigation data are sent from the first SCS 10A and each second SCS 10B to the TLP 12 (step S73);
- the TLP 12 performs position and speed determination using the TDOA data (step S74); and
- the TLP 12 creates a location record, and forwards the location record to the AP 14 (step S75).

The advantages of determining phase correction and amplitude correction parameters are most obvious in the location of CDMA wireless transmitters based upon IS-95A. As is well known, the reverse transmissions from an IS-95A transmitter are sent using non-coherent modulation. Most CDMA base stations only integrate over a single bit interval because of the non-coherent modulation. For a CDMA Access Channel, with a bit rate of 4800 bits per second, there are 256 chips sent per bit, which permits an integration gain of 24 dB. Using the technique described above, the TDOA processing in each SCS 10 may integrate, for example, over a full 160 millisecond burst (196,608 chips) to produce an integration gain of 53 dB. This additional processing gain enables the present invention to detect and locate CDMA transmissions using multiple SCS's 10, even if the base stations collocated with the SCS's 10 cannot detect the same CDMA transmission.

For a particular transmission, if either the phase correction parameters or the amplitude correction parameters are calculated to be zero, or are not needed, then these parameters are not sent in order to conserve on the number of bits transmitted on the communications link between each SCS 10 and TLP 12. In another embodiment of the invention, the Wireless Location System may use a fixed phase correction interval for a particular transmission or for all transmissions of a particular air interface protocol, or for all transmissions made by a particular type of wireless transmitter. This may, for example, be based upon empirical data gathered over some period of time by the Wireless Location System showing a reasonable consistency in the phase noise exhibited by various classes of transmitters. In these cases, the SCS 10 may save the processing step of determining the appropriate phase correction interval.

Those skilled in the art will recognize that there are many ways of measuring the phase noise of a wireless transmitter. In one embodiment, a pure, noiseless re-modulated copy of the signal received at the first SCS 10A may be digitally generated by DSP's in the SCS, then the received signal may be compared against the pure signal over each phase correction interval and the phase difference may be measured directly. In this embodiment, the phase correction parameter will be calculated as the negative of the phase difference over that phase correction interval. The number of bits required to represent the phase correction parameter will vary with the magnitude of the phase correction parameter, and the number of bits may vary for each phase correction interval. It has been observed that some transmissions, for example, exhibit greater phase noise early in the transmission, and less phase noise in the middle of and later in the transmission.

Figure 7:
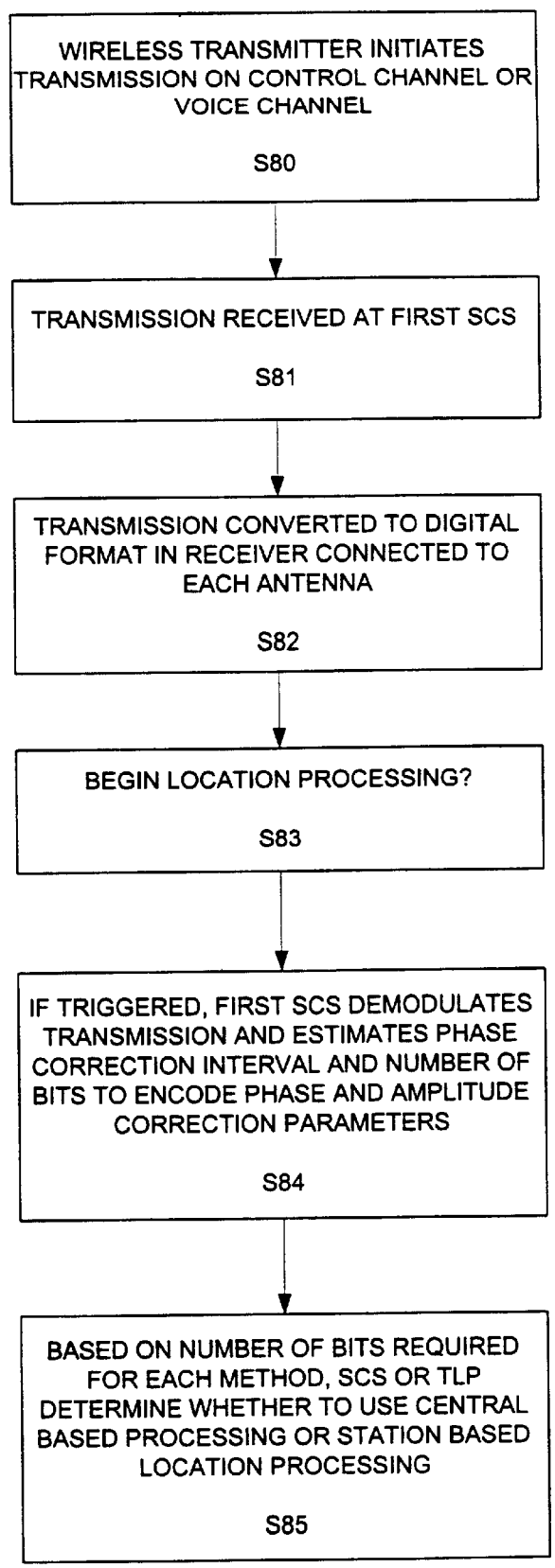
FIG. 7 is a flowchart of a method for determining, for each transmission for which a location is desired, whether to employ central or station-based processing.
Figure 7A:
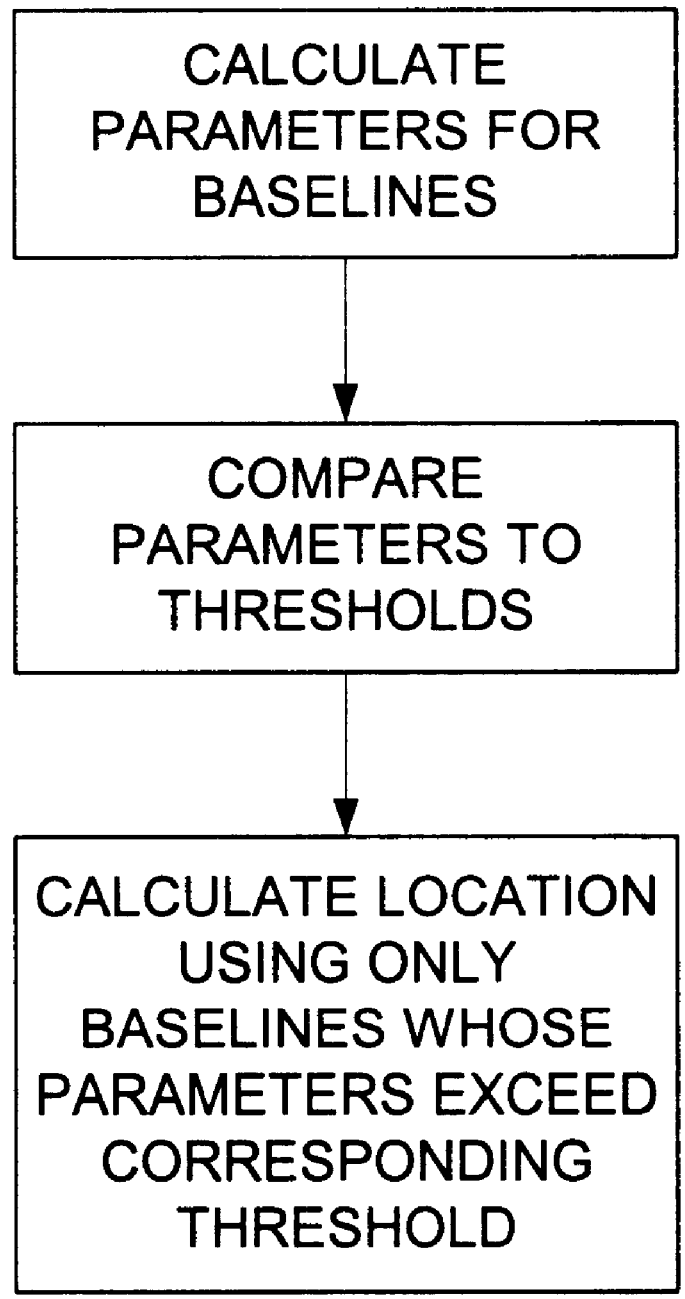
FIG. 7A is a flow chart representing an inventive baseline selection method.

Station based processing is most useful for wireless transmitters that have relatively low phase noise. Although not necessarily required by their respective air interface standards, wireless telephones that use the TDMA, CDMA, or GSM protocols will typically exhibit lower phase noise. As the phase noise of a wireless transmitter increases, the length of a phase correction interval may decrease and/or the number of bits required to represent the phase correction parameters increases. Station based processing is not effective when the number of bits required to represent the demodulated data plus the phase correction and amplitude parameters exceeds a predetermined proportion of the number of bits required to perform central based processing. It is therefore an object of the present invention to automatically determine for each transmission for which a location is desired whether to process the location using central based processing or station based processing. The steps in making this determination are recited below and shown in FIG. 7:

- a wireless transmitter initiates a transmission on either a control channel or a voice channel (step S80);
- the transmission is received at a first SCS 10A (step S81);
- the transmission is converted into a digital format in the receiver connected to each antenna (step S82);
- the Wireless Location System determines whether to begin location processing for the transmission (step S83);
- if triggered, a first SCS 10A demodulates the transmission and estimates an appropriate phase correction interval and the number of bits required to encode the phase correction and amplitude correction parameters (step S84);
- the first SCS 10A then estimates the number of bits required for central based processing;
- based upon the number of bits required for each respective method, the SCS 10 or the TLP 12 determine whether to use central based processing or station based processing to perform the location processing for this transmission (step S85).

In another embodiment of the invention, the Wireless Location System may always use central based processing or station based processing for all transmissions of a particular air interface protocol, or for all transmissions made by a particular kind of wireless transmitter. This may, for example, be based upon empirical data gathered over some period of time by the Wireless Location System showing a reasonable consistency in the phase noise exhibited by various classes of transmitters. In these cases, the SCS 10 and/or the TLP 12 may be saved the processing step of determining the appropriate processing method.

A further enhancement of the present invention, used for both central based processing and station based processing, is the use of threshold criteria for including baselines in the final determination of location and velocity of the wireless transmitter. For each baseline, the Wireless Location System calculates a number of parameters that include: the SCS/antenna port used with the reference SCS/antenna in calculating the baseline, the peak, average, and variance in the power of the transmission as received at the SCS/antenna port used in the baseline and over the interval used for location processing, the correlation value from the cross-spectra correlation between the SCS/antenna used in the baseline and the reference SCS/antenna, the delay value for the baseline, the multipath mitigation parameters, the residual values remaining after the multipath mitigation calculations, the contribution of the SCS/antenna to the weighted GDOP in the final location solution, and a measure of the quality of fit of the baseline if included in the final location solution. Each baseline is included in the final location solution is each meets or exceeds the threshold criteria for each of the parameters described herein. A baseline may be excluded from the location solution if it fails to meet one or more of the threshold criteria. Therefore, it is frequently possible that the number of SCS/antennas actually used in the final location solution is less than the total number considered.

Previous U.S. Pat. Nos. 5,327,144 and 5,608,410 disclosed a method by which the location processing minimized the least square difference (LSD) value of the following equation:

$$LSD = [Q_{12}(\text{Delay}\_T_{12} - \text{Delay}\_O_{12})^2 + Q_{13}(\text{Delay}\_T_{13} - \text{Delay}\_O_{13})^2 + \ldots + Q_{xy}(\text{Delay}\_T_{xy} - \text{Delay}\_O_{xy})^2$$

In the present implementation, this equation has been rearranged to the following form in order to make the location processing code more efficient:

$$LSD = \Sigma(TDOA_{0i} - \tau_i + \tau_0)^2 w_i^2; \text{ over all } i=1 \text{ to } N-1$$

where N=number of SCS/antennas used in the location processing; $TDOA_{0i}$=the TDOA to the $i^{th}$ site from reference site 0;

$\tau_i$=the theoretical line of sight propagation time from the wireless transmitter to the $i^{th}$ site;

$\tau_0$=the theoretical line of sight propagation time from the transmitter to the reference; and $w_i$=the weight, or quality factor, applied to the $i^{th}$ baseline.

In the present implementation, the Wireless Location System also uses another alternate form of the equation that can aid in determining location solutions when the reference signal is not very strong or when it is likely that a bias would exist in the location solution using the prior form of the equation:

$$LSD' = \Sigma(TDOA_{0i} - \tau_i)^2 w_i^2 - b^2 \Sigma w_i^2; \text{ over all } i=0 \text{ to } N-1$$

Where N=number of SCS/antennas used in the location processing;

$TDOA_{0i}$=the TDOA to the $i^{th}$ site from reference site 0;

$TDOA_{00}$=is assumed to be zero;

$\tau_i$=the theoretical line of sight propagation time from the wireless transmitter to the $i^{th}$ site;

b=a bias that is separately calculated for each theoretical point that minimizes LSD' at that theoretical point; and $w_i$=the weight, or quality factor, applied to the $i^{th}$ baseline.

The LSD' form of the equation offers an easier means of removing a bias in location solutions at the reference site by making $w_0$ equal to the maximum value of the other weights or basing $w_0$ on the relative signal strength at the reference site. Note that if $w_0$ is much larger than the other weights, then b is approximately equal to $\tau_0$. In general, the weights, or quality factors are based on similar criteria to that discussed above for the threshold criteria in including baselines. That is, the results of the criteria calculations are used for weights and when the criteria falls below threshold the weight is then set to zero and is effectively not included in the determination of the final location solution.

Antenna Selection Process for Location Processing

Previous inventions and disclosures, such as those listed above, have described techniques in which a first, second, or possibly third antenna site, cell site, or base station are required to determine location. U.S. Pat. No. 5,608,410 further discloses a Dynamic Selection Subsystem (DSS) that is responsible for determining which data frames from which antenna site locations will be used to calculate the location of a responsive transmitter. In the DSS, if data frames are received from more than a threshold number of sites, the DSS determines which are candidates for retention or exclusion, and then dynamically organizes data frames for location processing. The DSS prefers to use more than the minimum number of antenna sites so that the solution is over-determined. Additionally, the DSS assures that all transmissions used in the location processing were received from the same transmitter and from the same transmission.

The preferred embodiments of the prior inventions had several limitations, however. First, either only one antenna per antenna site (or cell site) is used, or the data from two or four diversity antennas were first combined at the antenna site (or cell site) prior to transmission to the central site. Additionally, all antenna sites that received the transmission sent data frames to the central site, even if the DSS later discarded the data frames. Thus, some communications bandwidth may have been wasted sending data that was not used.

The present inventors have determined that while a minimum of two or three sites are required in order to determine location, the actual selection of antennas and SCS's 10 to use in location processing can have a significant effect on the results of the location processing. In addition, it is advantageous to include the means to use more than one antenna at each SCS 10 in the location processing. The reason for using data from multiple antennas at a cell site independently in the location processing is that the signal received at each antenna is uniquely affected by multipath, fading, and other disturbances. It is well known in the field that when two antennas are separated in distance by more than one wavelength, then each antenna will receive the signal on an independent path. Therefore, there is frequently additional and unique information to be gained about the location of the wireless transmitter by using multiple antennas, and the ability of the Wireless Location System to mitigate multipath is enhanced accordingly.

Figure 8:
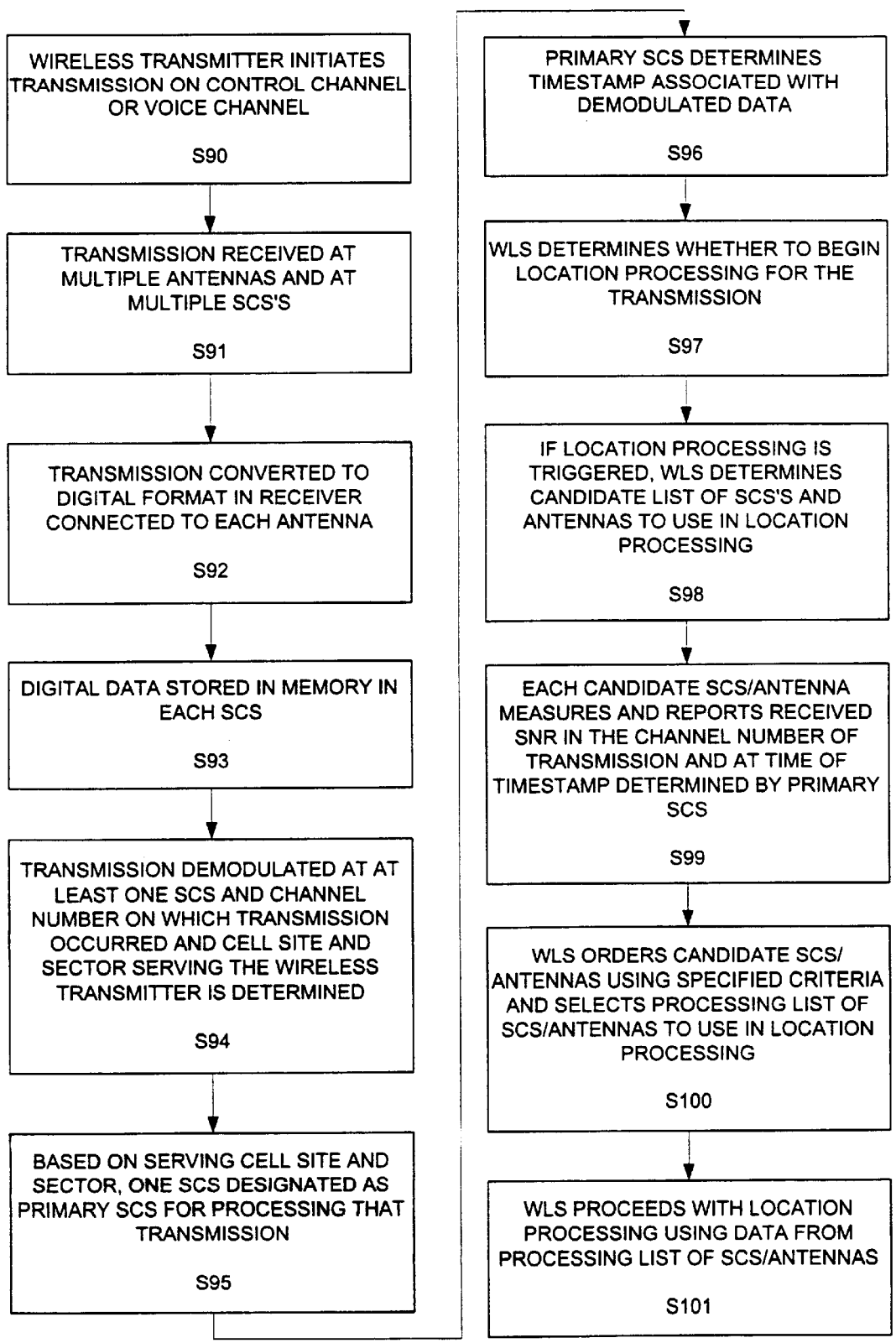
FIG. 8 is a flowchart of a dynamic process used to select cooperating antennas and SCS's 10 used in location processing.

It is therefore an object of the present invention to provide an improved method for using the signals received from more than one antenna at an SCS 10 in the location processing. It is a further object to provide a method to improve the dynamic process used to select the cooperating antennas and SCS's 10 used in the location processing. The first object is achieved by providing means within the SCS 10 to select and use any segment of data collected from any number of antennas at an SCS in the location processing. As described earlier, each antenna at a cell site is connected to a receiver internal to the SCS 10. Each receiver converts signals received from the antenna into a digital form, and then stores the digitized signals temporarily in a memory in the receiver. The TLP 12 has been provided with means to direct any SCS 10 to retrieve segments of data from the temporary memory of any receiver, and to provide the data for use in location processing. The second object is achieved by providing means within the Wireless Location System to monitor a large number of antennas for reception of the transmission that the Wireless Location System desires to locate, and then selecting a smaller set of antennas for use in location processing based upon a predetermined set of parameters. One example of this selection process is represented by the flowchart of FIG. 8:

a wireless transmitter initiates a transmission on either a control channel or a voice channel (step S90);

the transmission is received at multiple antennas and at multiple SCS's 10 in the Wireless Location System (step S91);

the transmission is converted into a digital format in the receiver connected to each antenna (step S92);

the digital data is stored in a memory in each SCS 10 (step S93);

the transmission is demodulated at at least one SCS 10A and the channel number on which the transmission occurred and the cell site and sector serving the wireless transmitter is determined (step S94);

based upon the serving cell site and sector, one SCS 10A is designated as the 'primary' SCS 10 for processing that transmission (step S95);

the primary SCS 10A determines a timestamp associated with the demodulated data (step S96);

the Wireless Location System determines whether to begin location processing for the transmission (step S97);

if location processing is triggered, the Wireless Location System determines a candidate list of SCS's 10 and antennas to use in the location processing (step S98);

each candidate SCS/antenna measures and reports several parameters in the channel number of the transmission and at the time of the timestamp determined by the primary SCS 10A (step S99);

the Wireless Location System orders the candidate SCS/antennas using specified criteria and selects a reference SCS/antenna and a processing list of SCS/antennas to use in the location processing (step S100); and the Wireless Location System proceeds with location processing as described earlier, using data from the processing list of SCS/antennas (step S101).

Selecting Primary SCS/Antenna

The process for choosing the 'primary' SCS/antenna is critical, because the candidate list of SCS's 10 and antennas 10-1 is determined in part based upon the designation of the primary SCS/antenna. When a wireless transmitter makes a transmission on a particular RF channel, the transmission frequently can propagate many miles before the signal attenuates below a level at which it can be demodulated. Therefore, there are frequently many SCS/antennas capable of demodulating the signal. This especially occurs in urban and suburban areas where the frequency re-use pattern of many wireless communications systems can be quite dense. For example, because of the high usage rate of wireless and the dense cell site spacing, the present inventors have tested wireless communications systems in which the same RF control channel and digital color code were used on cell sites spaced about one mile apart. Because the Wireless Location System is independently demodulating these transmissions, the Wireless Location System frequently can demodulate the same transmission at two, three, or more separate SCS/antennas. The Wireless Location System detects that the same transmission has been demodulated multiple times at multiple SCS/antennas when the Wireless Location System receives multiple demodulated data frames sent from different SCS/antennas, each with a number of bit errors below a predetermined bit error threshold, and with the demodulated data matching within an acceptable limit of bit errors, and all occurring within a predetermined interval of time.

When the Wireless Location System detects demodulated data from multiple SCS/antennas, it examines the following parameters to determine which SCS/antenna shall be designated the primary SCS: average SNR over the transmission interval used for location processing, the variance in the SNR over the same interval, correlation of the beginning of the received transmission against a pure pre-cursor (i.e., for AMPS, the dotting and Barker code), the number of bit errors in the demodulated data, and the magnitude and rate of change of the SNR from just before the on-set of the transmission to the on-set of the transmission, as well as other similar parameters. The average SNR is typically determined at each SCS/antenna either over the entire length of the transmission to be used for location processing, or over a shorter interval. The average SNR over the shorter interval can be determined by performing a correlation with the dotting sequence and/or Barker code and/or sync word, depending on the particular air interface protocol, and over a short range of time before, during, and after the timestamp reported by each SCS 10. The time range may typically be +/−200 microseconds centered at the timestamp, for example. The Wireless Location System will generally order the SCS/antennas using the following criteria, each of which may be weighted (multiplied by an appropriate factor) when combining the criteria to determine the final decision: SCS/antennas with a lower number of bit errors are preferred to SCS/antennas with a higher number of bit errors, average SNR for a given SCS/antenna must be greater than a predetermined threshold to be designated as the primary; SCS/antennas with higher average SNR are preferred over those with lower average SNR; SCS/antennas with lower SNR variance are preferred to those with higher SNR variance; and SCS/antennas with a faster SNR rate of change at the on-set of the transmission are preferred to those with a slower rate of change. The weighting applied to each of these criteria may be adjusted by the operator of the Wireless Location System to suit the particular design of each system.

Figure 9:
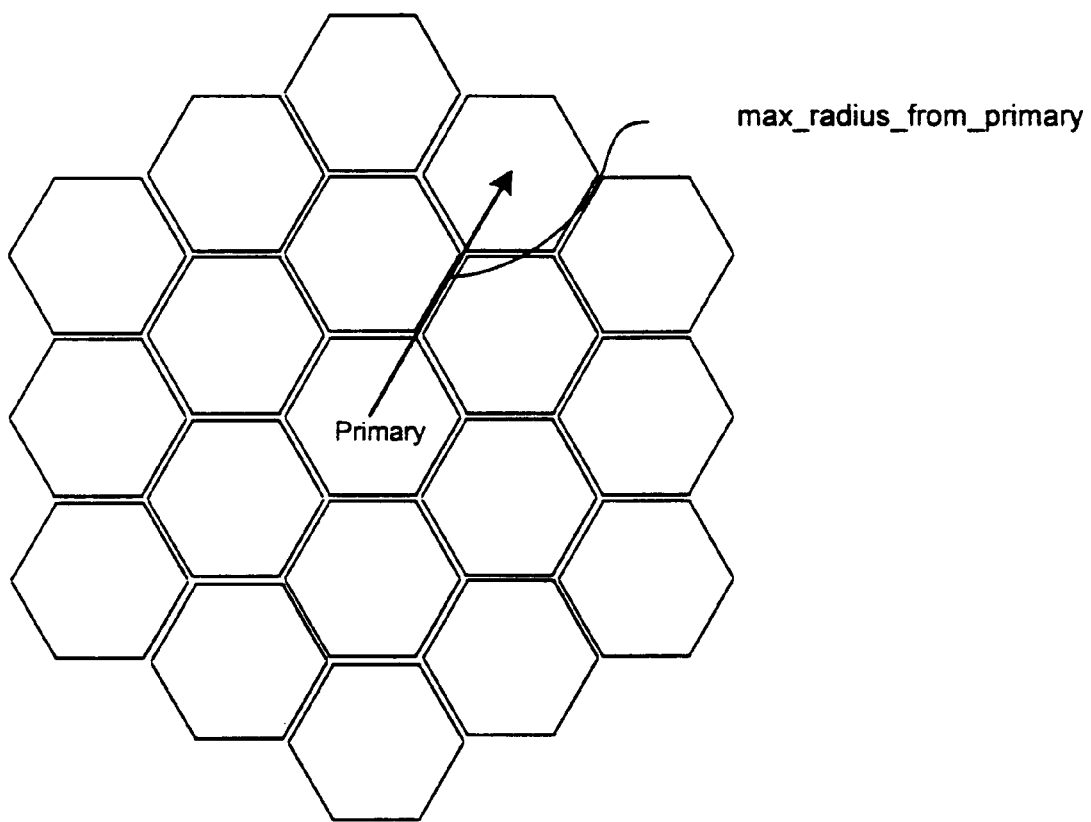
FIG. 9 is diagram that is referred to below in explaining a method for selecting a candidate list of SCS's and antennas using a predetermined set of criteria.

The candidate list of SCS's 10 and antennas 10-1 are selected using a predetermined set of criteria based, for example, upon knowledge of the types of cell sites, types of antennas at the cell sites, geometry of the antennas, and a weighting factor that weights certain antennas more than other antennas. The weighting factor takes into account knowledge of the terrain in which the Wireless Location System is operating, past empirical data on the contribution of each antenna has made to good location estimates, and other factors that may be specific to each different WLS installation. In one embodiment, for example, the Wireless Location System may select the candidate list to include all SCS's 10 up to a maximum number of sites (max_number_ of sites) that are closer than a predefined maximum radius from the primary site (max_radius_from_primary). For example, in an urban or suburban environment, where there may be a large number of cell sites, the max_number_of_ sites may be limited to nineteen. Nineteen sites would include the primary, the first ring of six sites surrounding the primary (assuming a classic hexagonal distribution of cell sites), and the next ring of twelve sites surrounding the first ring. This is depicted in FIG. 9. In another embodiment, in a suburban or rural environment, max_radius_from_ primary may be set to 40 miles to ensure that the widest possible set of candidate SCS/antennas is available. The Wireless Location System is provided with means to limit the total number of candidate SCS's 10 to a maximum number (max_number_candidates), although each candidate SCS may be permitted to choose the best port from among its available antennas. This limits the maximum time spent by the Wireless Location System processing a particular location. Max_number_candidates may be set to thirty-two, for example, which means that in a typical three sector wireless communications system with diversity, up to 32*6=192 total antennas could be considered for location processing for a particular transmission. In order to limit the time spent processing a particular location, the Wireless Location System is provided with means to limit the number of antennas used in the location processing to max_ number_antennas_processed. Max_number_antennas_ processed is generally less than max_number_candidates, and is typically set to sixteen.

While the Wireless Location System is provided with the ability to dynamically determine the candidate list of SCS's 10 and antennas based upon the predetermined set of criteria described above, the Wireless Location System can also store a fixed candidate list in a table. Thus, for each cell site and sector in the wireless communications system, the Wireless Location System has a separate table that defines the candidate list of SCS's 10 and antennas 10-1 to use whenever a wireless transmitter initiates a transmission in that cell site and sector. Rather than dynamically choose the candidate SCS/antennas each time a location request is triggered, the Wireless Location System reads the candidate list directly from the table when location processing is initiated.

In general, a large number of candidate SCS's 10 is chosen to provide the Wireless Location System with sufficient opportunity and ability to measure and mitigate multipath. On any given transmission, any one or more particular antennas at one or more SCS's 10 may receive signals that have been affected to varying degrees by multipath. Therefore, it is advantageous to provide this means within the Wireless Location System to dynamically select a set of antennas that may have received less multipath than other antennas. The Wireless Location System uses various techniques to mitigate as much multipath as possible from any received signal; however it is frequently prudent to choose a set of antennas that contain the least amount of multipath.

Choosing Reference and Cooperating SCS/
Antennas

In choosing the set of SCS/antennas to use in location processing, the Wireless Location System orders the candidate SCS/antennas using several criteria, including for example: average SNR over the transmission interval used for location processing, the variance in the SNR over the same interval, correlation of the beginning of the received transmission against a pure pre-cursor (i.e., for AMPS, the dotting and Barker code) and/or demodulated data from the primary SCS/antenna, the time of the on-set of the transmission relative to the on-set reported at the SCS/antenna at which the transmission was demodulated, and the magnitude and rate of change of the SNR from just before the on-set of the transmission to the on-set of the transmission, as well as other similar parameters. The average SNR is typically determined at each SCS, and for each antenna in the candidate list either over the entire length of the transmission to be used for location processing, or over a shorter interval. The average SNR over the shorter interval can be determined by performing a correlation with the dotting sequence and/or Barker code and/or sync word, depending on the particular air interface protocol, and over a short range of time before, during, and after the timestamp reported by the primary SCS 10. The time range may typically be +/−200 microseconds centered at the timestamp, for example. The Wireless Location System will generally order the candidate SCS/antennas using the following criteria, each of which may be weighted when combining the criteria to determine the final decision: average SNR for a given SCS/antenna must be greater than a predetermined threshold to be used in location processing; SCS/antennas with higher average SNR are preferred over those with lower average SNR; SCS/antennas with lower SNR variance are preferred to those with higher SNR variance; SCS/antennas with an onset closer to the on-set reported by the demodulating SCS/antenna are preferred to those with an on-set more distant in time; SCS/antennas with a faster SNR rate of change are preferred to those with a slower rate of change; SCS/antennas with lower incremental weighted GDOP are preferred over those with higher incremental weighted GDOP, where the weighting is based upon estimated path loss from the primary SCS. The weighting applied to each of these preferences may be adjusted by the operator of the Wireless Location System to suit the particular design of each system. The number of different SCS's 10 used in the location processing is maximized up to a predetermined limit; the number of antennas used at each SCS 10 in limited to a predetermined limit; and the total number of SCS/antennas used is limited to max_number_antennas_Processed. The SCS/antenna with the highest ranking using the above described process is designated as the reference SCS/antenna for location processing.

Best Port Selection Within an SCS 10

Frequently, the SCS/antennas in the candidate list or in the list to use in location processing will include only one or two antennas at a particular SCS 10. In these cases, the Wireless Location System may permit the SCS 10 to choose the "best port" from all or some of the antennas at the particular SCS 10. For example, if the Wireless Location System chooses to use only one antenna at a first SCS 10, then the first SCS 10 may select the best antenna port from the typical six antenna ports that are connected to that SCS 10, or it may choose the best antenna port from among the two antenna ports of just one sector of the cell site. The best antenna port is chosen by using the same process and comparing the same parameters as described above for choosing the set of SCS/antennas to use in location processing, except that all of the antennas being considered for best port are all in the same SCS 10. In comparing antennas for best port, the SCS 10 may also optionally divide the received signal into segments, and then measure the SNR separately in each segment of the received signal. Then, the SCS 10 can optionally choose the best antenna port with highest SNR either by (i) using the antenna port with the most segments with the highest SNR, (ii) averaging the SNR in all segments and using the antenna port with the highest average SNR, or (iii) using the antenna port with the highest SNR in any one segment.

The "antenna selection" aspect of the present invention may be summarized as comprising the calculation of a number of parameters for each of a plurality of baselines, and including in a final location solution only those baselines meeting or exceeding predefined threshold criteria for each of the parameters. This methodology is particularly useful in, although not necessarily limited to, applications involving a Wireless Location System having signal collection systems and at least one location processor for processing digital data provided by the signal collection systems, wherein TDOA data is determined with respect to a plurality of first signal collection system/antenna—second signal collection system/antenna baselines. The parameters may include the average power of the transmission as received at the second signal collection system/antenna port used in a baseline and over an interval used for location processing. Alternatively, the parameters may include the peak power of the transmission as received at the second signal collection system/antenna port used in a baseline and over an interval used for location processing. Other alternatives for the parameters include: the variance in the power of the transmission as received at the second signal collection system/antenna port used in a baseline and over an interval used for location processing; the correlation value from a cross-spectra correlation between the second signal collection system/antenna used in the baseline and a first signal collection system/antenna; the delay value for the baseline; other multipath mitigation parameters; residual values remaining after multipath mitigation calculations; contribution of the second signal collection system/antenna to a weighted geometric dilution of precision in the final location solution; and/or a measure of the quality of fit of the baseline in the final location solution, if the baseline were included.

Detection and Recovery From Collisions

Because the Wireless Location System will use data from many SCS/antenna ports in location processing, there is a chance that the received signal at one or more particular SCS/antenna ports contains energy that is co-channel interference from another wireless transmitter (i.e. a partial or full collision between two separate wireless transmissions has occurred). There is also a reasonable probability that the co-channel interference has a much higher SNR than the signal from the target wireless transmitter, and if not detected by the Wireless Location System, the co-channel interference may cause an incorrect choice of best antenna port at an SCS 10, reference SCS/antenna, candidate SCS/antenna, or SCS/antenna to be used in location processing. The co-channel interference may also cause poor TDOA and FDOA results, leading to a failed or poor location estimate. The probability of collision increases with the density of cell sites in the host wireless communications system, especially in dense suburban or rural environments where the frequencies are re-used often and wireless usage by subscribers is high.

Therefore, the Wireless Location System includes means to detect and recover from the types of collisions described above. For example, in the process of selecting a best port, reference SCS/antenna, or candidate SCS/antenna, the Wireless Location System determines the average SNR of the received signal and the variance of the SNR over the interval of the transmission; when the variance of the SNR is above a predetermined threshold, the Wireless Location System assigns a probability that a collision has occurred. If the signal received at an SCS/antenna has increased or decreased its SNR in a single step, and by an amount greater than a predetermined threshold, the Wireless Location System assigns a probability that a collision has occurred. Further, if the average SNR of the signal received at a remote SCS is greater than the average SNR that would be predicted by a propagation model, given the cell site at which the wireless transmitter initiated its transmission and the known transmit power levels and antenna patterns of the transmitter and receive antennas, the Wireless Location System assigns a probability that a collision has occurred. If the probability that a collision has occurred is above a predetermined threshold, then the Wireless Location System performs the further processing described below to verify whether and to what extent a collision may have impaired the received signal at an SCS/antenna. The advantage of assigning probabilities is to reduce or eliminate extra processing for the majority of transmissions for which collisions have not occurred. It should be noted that the threshold levels, assigned probabilities, and other details of the collision detection and recovery processes described herein are configurable, i.e., selected based on the particular application, environment, system variables, etc., that would affect their selection.

For received transmissions at an SCS/antenna for which the probability of a collision is above the predetermined threshold and before using RF data from a particular antenna port in a reference SCS/antenna determination, best port determination or in location processing, the Wireless Location System preferably verifies that the RF data from each antenna port is from the correct wireless transmitter. This is determined, for example, by demodulating segments of the received signal to verify, for example, that the MIN, MSID, or other identifying information is correct or that the dialed digits or other message characteristics match those received by the SCS/antenna that initially demodulated the transmission. The Wireless Location System may also correlate a short segment of the received signal at an antenna port with the signal received at the primary SCS 10 to verify that the correlation result is above a predetermined threshold. If the Wireless Location System detects that the variance in the SNR over the entire length of the transmission is above a pre-determined threshold, the Wireless Location System may divide the transmission into segments and test each segment as described herein to determine whether the energy in that segment is primarily from the signal from the wireless transmitter for which location processing has been selected or from an interfering transmitter.

The Wireless Location System may choose to use the RF data from a particular SCS/antenna in location processing even if the Wireless Location System has detected that a partial collision has occurred at that SCS/antenna. In these cases, the SCS 10 uses the means described above to identify that portion of the received transmission which represents a signal from the wireless transmitter for which location processing has been selected, and that portion of the received transmission which contains co-channel interference. The Wireless Location System may command the SCS 10 to send or use only selected segments of the received transmission that do not contain the co-channel interference. When determining the TDOA and FDOA for a baseline using only selected segments from an SCS/antenna, the Wireless Location System uses only the corresponding segments of the transmission as received at the reference SCS/antenna. The Wireless Location System may continue to use all segments for baselines in which no collisions were detected. In many cases, the Wireless Location System is able to complete location processing and achieve an acceptable location error using only a portion of the transmission. This inventive ability to select the appropriate subset of the received transmission and perform location processing on a segment by segment basis enables the Wireless Location System to successfully complete location processing in cases that might have failed using previous techniques.

Multiple Pass Location Processing

Certain applications may require a very fast estimate of the general location of a wireless transmitter, followed by a more accurate estimate of the location that can be sent subsequently. This can be valuable, for example, for E9-1-1 systems that handle wireless calls and must make a call routing decision very quickly, but can wait a little longer for a more exact location to be displayed upon the E9-1-1 call-taker's electronic map terminal. The Wireless Location System supports these applications with an inventive multiple pass location processing mode.

In many cases, location accuracy is enhanced by using longer segments of the transmission and increasing the processing gain through longer integration intervals. But longer segments of the transmission require longer processing periods in the SCS 10 and TLP 12, as well as longer time periods for transmitting the RF data across the communications interface from the SCS 10 to the TLP 12. Therefore, the Wireless Location System includes means to identify those transmissions that require a fast but rough estimate of the location followed by more complete location processing that produces a better location estimate. The Signal of Interest Table includes a flag for each Signal of Interest that requires a multiple pass location approach. This flag specifies the maximum amount of time permitted by the requesting location application for the first estimate to be sent, as well as the maximum amount of time permitted by the requesting location application for the final location estimate to be sent. The Wireless Location System performs the rough location estimate by selecting a subset of the transmission for which to perform location processing. The Wireless Location System may choose, for example, the segment that was identified at the primary SCS/antenna with the highest average SNR. After the rough location estimate has been determined, using the methods described earlier, but with only a subset of the transmission, the TLP 12 forwards the location estimate to the AP 14, which then forwards the rough estimate to the requesting application with a flag indicating that the estimate is only rough. The Wireless Location System then performs its standard location processing using all of the aforementioned methods, and forwards this location estimate with a flag indicating the final status of this location estimate. The Wireless Location System may perform the rough location estimate and the final location estimate sequentially on the same DSP in a TLP 12, or may perform the location processing in parallel on different DSP's. Parallel processing may be necessary to meet the maximum time requirements of the requesting location applications. The Wireless Location System supports different maximum time requirements from different location applications for the same wireless transmission.

Very Short Baseline TDOA

The Wireless Location System is designed to operate in urban, suburban, and rural areas. In rural areas, when there are not sufficient cell sites available from a single wireless carrier, the Wireless Location System can be deployed with SCS's 10 located at the cell sites of other wireless carriers or at other types of towers, including AM or FM radio station, paging, and two-way wireless towers. In these cases, rather than sharing the existing antennas of the wireless carrier, the Wireless Location System may require the installation of appropriate antennas, filters, and low noise amplifiers to match the frequency band of the wireless transmitters of interest to be located. For example, an AM radio station tower may require the addition of 800 MHz antennas to locate cellular band transmitters. There may be cases, however, where no additional towers of any type are available at reasonable cost and the Wireless Location System must be deployed on just a few towers of the wireless carrier. In these cases, the Wireless Location System supports an antenna mode known as very short baseline TDOA. This antenna mode becomes active when additional antennas are installed on a single cell site tower, whereby the antennas are placed at a distance of less than one wavelength apart. This may require the addition of just one antenna per cell site sector such that the Wireless Location System uses one existing receive antenna in a sector and one additional antenna that has been placed next to the existing receive antenna. Typically, the two antennas in the sector are oriented such that the primary axes, or line of direction, of the main beams are parallel and the spacing between the two antenna elements is known with precision. In addition, the two RF paths from the antenna elements to the receivers in the SCS 10 are calibrated.

In its normal mode, the Wireless Location System determines the TDOA and FDOA for pairs of antenna that are separated by many wavelengths. For a TDOA on a baseline using antennas from two difference cell sites, the pairs of antennas are separated by thousands of wavelengths. For a TDOA on a baseline using antennas at the same cell site, the pairs of antennas are separated by tens of wavelengths. In either case, the TDOA determination effectively results in a hyperbolic line bisecting the baseline and passing through the location of the wireless transmitter. When antennas are separated by multiple wavelengths, the received signal has taken independent paths from the wireless transmitter to each antenna, including experiencing different multipath and Doppler shifts. However, when two antennas are closer than one wavelength, the two received signals have taken essentially the same path and experienced the same fading, multipath, and Doppler shift. Therefore, the TDOA and FDOA processing of the Wireless Location System typically produces a Doppler shift of zero (or near-zero) hertz, and a time difference on the order of zero to one nanosecond. A time difference that short is equivalent to an unambiguous phase difference between the signals received at the two antennas on the very short baseline. For example, at 834 MHz, the wavelength of an AMPS reverse control channel transmission is about 1.18 feet. A time difference of 0.1 nanoseconds is equivalent to a received phase difference of about 30 degrees. In this case, the TDOA measurement produces a hyperbola that is essentially a straight line, still passing through the location of the wireless transmitter, and in a direction that is rotated 30 degrees from the direction of the parallel lines formed by the two antennas on the very short baseline. When the results of this very short baseline TDOA at the single cell site are combined with a TDOA measurement on a baseline between two cell sites, the Wireless Location System can determine a location estimate using only two cell sites.

Bandwidth Monitoring Method For Improving Location Accuracy

AMPS cellular transmitters presently comprise the large majority of the wireless transmitters used in the U.S. and AMPS reverse voice channel transmissions are generally FM signals modulated by both voice and a supervisory audio tone (SAT). The voice modulation is standard FM, and is directly proportional to the speaking voice of the person using the wireless transmitter. In a typical conversation, each person speaks less that 35% of the time, which means that most of the time the reverse voice channel is not being modulated due to voice. With or without voice, the reverse channel is continuously modulated by SAT, which is used by the wireless communications system to monitor channel status. The SAT modulation rate is only about 6 KHz. The voice channels support in-band messages that are used for hand-off control and for other reasons, such as for establishing a 3-way call, for answering a second incoming call while already on a first call, or for responding to an 'audit' message from the wireless communications system. All of these messages, though carried on the voice channel, have characteristics similar to the control channel messages. These messages are transmitted infrequently, and location systems have ignored these messages and focused on the more prevalent SAT transmissions as the signal of interest.

In view of the above-described difficulties presented by the limited bandwidth of the FM voice and SAT reverse voice channel signals, an object of the present invention is to provide an improved method by which reverse voice channel (RVC) signals may be utilized to locate a wireless transmitter, particularly in an emergency situation. Another object of the invention is to provide a location method that allows the location system to avoid making location estimates using RVC signals in situations in which it is likely that the measurement will not meet prescribed accuracy and reliability requirements. This saves system resources and improves the location system's overall efficiency. The improved method is based upon two techniques. FIG. 10A is a flowchart of a first method in accordance with the present invention for measuring location using reverse voice channel signals. The method comprises the following steps:

(i) It is first assumed that a user with a wireless transmitter wishes to be located, or wishes to have his location updated or improved upon. This may be the case, for example, if the. wireless user has dialed "911" and is seeking emergency assistance. It is therefore also assumed that the user is coherent and in communication with a centrally located dispatcher.

(ii) When the dispatcher desires a location update for a particular wireless transmitter, the dispatcher sends a location update command with the identity of the wireless transmitter to the Wireless Location System over an application interface.

(iii) The Wireless Location System responds to the dispatcher with a confirmation that the Wireless Location System has queried the wireless communications system and has obtained the voice channel assignment for the wireless transmitter.

(iv) The dispatcher instructs the wireless user to dial a 9 or more digit number and then the "SEND" button. This sequence may be something like "123456789" or "911911911". Two functions happen to the reverse voice channel when the wireless user dial a sequence of at least 9 digits and then the "SEND" button. First, especially for an AMPS cellular voice channel, the dialing of digits causes the sending of dual tone multi-frequency (DTMF) tones over the voice channel. The modulation index of DTMF tones is very high and during the sending of each digit in the DTMF sequence will typically push the bandwidth of the transmitted signal beyond +/−10 KHz. The second function occurs at the pressing of the "SEND" button. Whether or not the wireless user subscribes to 3-way calling or other special features, the wireless transmitter will send a message over the voice using a "blank and burst" mode where the transmitter briefly stops sending the FM voice and SAT, and instead sends a bursty message modulated in the same manner as the control channel (10 Kbits Manchester). If the wireless user dials less than 9 digits, the message will be comprised of approximately 544 bits. If the wireless user dials 9 or more digits, the message is comprised of approximately 987 bits.

(v) After notification by the dispatcher, the Wireless Location System monitors the bandwidth of the transmitted signal in the voice channel. As discussed earlier, when only the SAT is being transmitted, and even if voice and SAT are being transmitted, there may not be sufficient bandwidth in the transmitted signal to calculate a high quality location estimate. Therefore, the Wireless Location System conserves location processing resources and waits until the transmitted signal exceeds a predetermined bandwidth. This may be, for example, set somewhere in the range of 8 KHz to 12 KHz. When the DTMF dialed digits are sent or when the bursty message is sent, the bandwidth would typically exceed the predetermined bandwidth. In fact, if the wireless transmitter does transmit the DTMF tones during dialing, the bandwidth would be expected to exceed the predetermined bandwidth multiple times. This would provide multiple opportunities to perform a location estimate. If the DTMF tones are not sent during dialing, the bursty message is still sent at the time of pressing "SEND", and the bandwidth would typically exceed the predetermined threshold.

(vi) Only when the transmitted bandwidth of the signal exceeds the predetermined bandwidth, the Wireless Location System initiates location processing.

FIG. 10B is a flowchart of another method in accordance with the present invention for measuring location using reverse voice channel signals. The method comprises the following steps:

(i) It is first assumed that a user with a wireless transmitter wishes to be located, or wishes to have their location updated or improved upon. This may be the case, for example, if the wireless user has dialed "911" and is seeking emergency assistance.

It is assumed that the user may not wish to dial digits or may not be able to dial any digits in accordance with the previous method.

(ii) When the dispatcher desires a location update for a particular wireless transmitter user, the dispatcher sends a location update command to the Wireless Location System over an application interface with the identity of the wireless transmitter.

(iii) The Wireless Location System responds to the dispatcher with a confirmation.

(iv) The Wireless Location System commands the wireless communications system to make the wireless transmitter transmit by sending an "audit" or similar message to the wireless transmitter. The audit message is a mechanism by which the wireless communications system can obtain a response from the wireless transmitter without requiring an action by the end-user and without causing the wireless transmitter to ring or otherwise alert. The receipt of an audit message causes the wireless transmitter to respond with an "audit response" message on the voice channel.

(v) After notification by the dispatcher, the Wireless Location System monitors the bandwidth of the transmitted signal in the voice channel. As discussed earlier, when only the SAT is being transmitted, and even if voice and SAT are being transmitted, there may not be sufficient bandwidth in the transmitted signal to calculate a high quality location estimate. Therefore, the radio location conserves location processing resources and waits until the transmitted signal exceeds a predetermined bandwidth. This may be, for example, set somewhere in the range of 8 KHz to 12 KHz. When the audit response message is sent, the bandwidth would typically exceed the predetermined bandwidth.

(vi) Only when the transmitted bandwidth of the signal exceeds the predetermined bandwidth, the Wireless Location System initiates location processing.

Estimate Combination Method For Improving Location Accuracy

The accuracy of the location estimate provided by the Wireless Location System may be improved by combining multiple statistically-independent location estimates made while the wireless transmitter is maintaining its position. Even when a wireless transmitter is perfectly stationary, the physical and RF environment around a wireless transmitter is constantly changing. For example, vehicles may change their position or another wireless transmitter which had caused a collision during one location estimate may have stopped transmitting or changed its position so as to no longer collide during subsequent location estimates. The location estimate provided by the Wireless Location System will therefore change for each transmission, even if consecutive transmissions are made within a very short period of time, and each location estimate is statistically independent of the other estimates, particularly with respect to the errors caused by the changing environment.

When several consecutive statistically independent location estimates are made for a wireless transmitter that has not changed its position, the location estimates will tend to cluster about the true position. The Wireless Location System combines the location estimates using a weighted average or other similar mathematical construct to determine the improved estimate. The use of a weighted average is aided by the assignment of a quality factor to each independent location estimate. This quality factor may be based upon, for example, the correlation values, confidence interval, or other similar measurements derived from the location processing for each independent estimate. The Wireless Location System optionally uses several methods to obtain multiple independent transmissions from the wireless transmitter, including (i) using its interface to the wireless communications system for the Make Transmit command; (ii) using multiple consecutive bursts from a time slot based air interface protocol, such as TDMA or GSM; or (iii) dividing a voice channel transmission into multiple segments over a period of time and performing location processing independently for each segment. As the Wireless Location System increases the number of independent location estimates being combined into the final location estimate, it monitors a statistic indicating the quality of the cluster. If the statistic is below a prescribed threshold value, then the Wireless Location System assumes that the wireless transmitter is maintaining its position. If the statistic rises above the prescribed threshold value, the Wireless Location System assume that the wireless transmitter is not maintaining its position and therefore ceases to perform additional location estimates. The statistic indicating the quality of the cluster may be, for example, a standard deviation calculation or a root mean square (RMS) calculation for the individual location estimates being combined together and with respect to the dynamically calculated combined location estimate. When reporting a location record to a requesting application, the Wireless Location System indicates, using a field in the location record, the number of independent location estimate combined together to produce the reported location estimate.

Figures 11A, 11B, 11C:
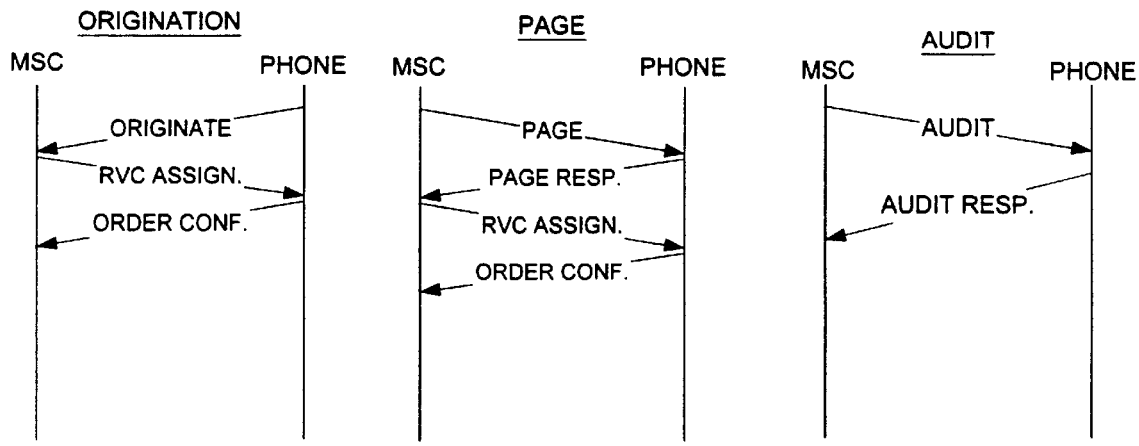
FIGS. 11A–11C are signal flow diagrams and FIG. 11D is a flowchart, and they are used to explain an inventive method for combining multiple statistically independent location estimates to provide an estimate with improved accuracy.

Another exemplary process for obtaining and combining multiple location estimates will now be explained with reference to FIGS. 11A–11D. FIGS. 11A, 11B and 11C schematically depict the well-known "origination", "page response," and "audit" sequences of a wireless communications system. As shown in FIG. 11A, the origination sequence (initiated by the wireless phone to make a call) may require two transmissions from the wireless transmitter, an "originate" signal and an "order confirmation" signal. The order confirmation signal is sent in response to a voice channel assignment from the wireless communications system (e.g., MSC). Similarly, as shown in FIG. 11B, a page sequence may involve two transmissions from the wireless transmitter. The page sequence is initiated by the wireless communications system, e.g., when the wireless transmitter is called by another phone. After being paged, the wireless transmitter transmits a page response; and then, after being assigned a voice channel, the wireless transmitter transmits an order confirmation signal. The audit process, in contrast, elicits a single reverse transmission, an audit response signal. An audit and audit response sequence has the benefit of not ringing the wireless transmitter which is responding.

The manner in which these sequences may be used to locate a phone with improved accuracy will now be explained. According to the present invention, for example, a stolen phone, or a phone with a stolen serial number, is repeatedly pinged with an audit signal, which forces it to respond with multiple audit responses, thus permitting the phone to be located with greater accuracy. To use the audit sequence, however, the Wireless Location System sends the appropriate commands using its interface to the wireless communications system, which sends the audit message to the wireless transmitter. The Wireless Location System can also force a call termination (hang up) and then call the wireless transmitter back using the standard ANI code. The call can be terminated either by verbally instructing the mobile user to disconnect the call, by disconnecting the call at the landline end of the call, or by sending an artificial over-the-air disconnect message to the base station. This over-the-air disconnect message simulates the pressing of the "END" button on a mobile unit. The call-back invokes the above-described paging sequence and forces the phone to initiate two transmissions that can be utilized to make location estimates.

Figure 11D:
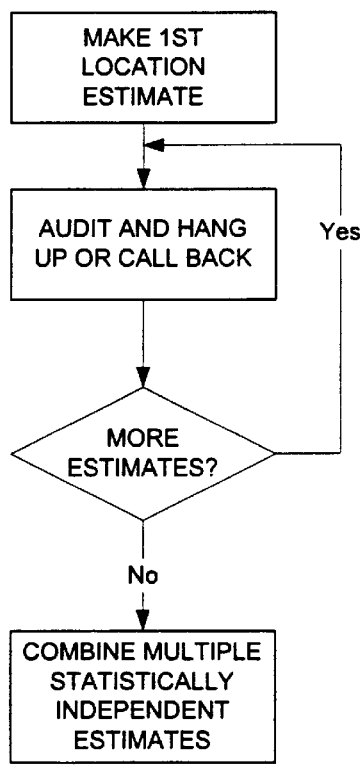

Referring now to FIG. 11D, the inventive high accuracy location method will now be summarized. First, an initial location estimate is made. Next, the above-described audit or "hang up and call back" process is employed to elicit a responsive transmission from the mobile unit, and then a second location estimate is made. Whether the audit or "hang up and call back" process is used will depend on whether the wireless communications system and wireless transmitter have both implemented the audit functionality. Steps second and third steps are repeated to obtain however many independent location estimates are deemed to be necessary or desirable, and ultimately the multiple statistically-independent location estimates are combined in an average, weighted average, or similar mathematical construct to obtain an improved estimate. The use of a weighted average is aided by the assignment of a quality factor to each independent location estimate. This quality factor may be based upon a correlation percentage, confidence interval, or other similar measurements derived from the location calculation process.

Bandwidth Synthesis Method For Improving Location Accuracy

The Wireless Location System is further capable of improving the accuracy of location estimates for wireless transmitters whose bandwidth is relatively narrow using a technique of artificial bandwidth synthesis. This technique can applied, for example, to those transmitters that use the AMPS, NAMPS, TDMA, and GSM air interface protocols and for which there are a large number of individual RF channels available for use by the wireless transmitter. For exemplary purposes, the following description shall refer to AMPS-specific details; however, the description can be easily altered to apply to other protocols. This method relies on the principle that each wireless transmitter is operative to transmit only narrowband signals at frequencies spanning a predefined wide band of frequencies that is wider than the bandwidth of the individual narrowband signals transmitted by the wireless transmitter. This method also relies on the aforementioned interface between the Wireless Location System and the wireless communications system over which the WLS can command the wireless communications system to make a wireless transmitter handoff or switch to another frequency or RF channel. By issuing a series of commands, the Wireless Location System can force the wireless transmitter to switch sequentially and in a controlled manner to a series of RF channels, allowing the WLS effectively to synthesize a wider band received signal from the series of narrowband transmitted signals for the purpose of location processing.

In a presently preferred embodiment of the invention, the bandwidth synthesis means includes means for determining a wideband phase versus frequency characteristic of the transmissions from the wireless transmitter. For example, the narrowband signals typically have a bandwidth of approximately 20 KHz and the predefined wide band of frequencies spans approximately 12.5 MHz, which in this example, is the spectrum allocated to each cellular carrier by the FCC. With bandwidth synthesis, the resolution of the TDOA measurements can be increased to about 1/12.5 MHz; i.e., the available time resolution is the reciprocal of the effective bandwidth.

Figure 12A:
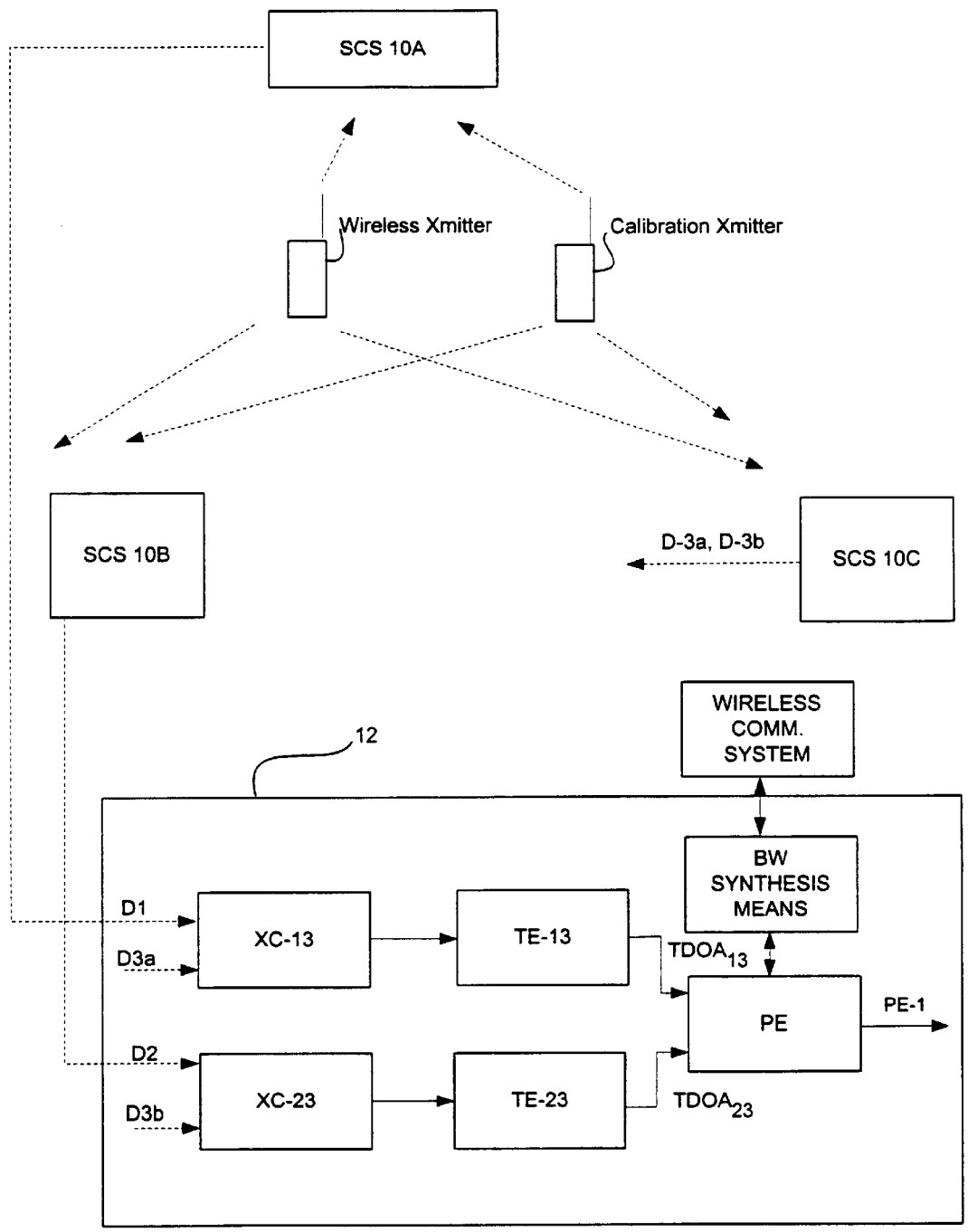
FIGS. 12A and 12B are a block diagram and a graph, respectively, for explaining a bandwidth synthesis method.

A wireless transmitter, a calibration transmitter (if used), SCS's 10A, 10B and 10C, and a TLP 12 are shown in FIG. 12A. The location of the calibration transmitter and all three SCS's are accurately known a priori. Signals, represented by dashed arrows in FIG. 12A, are transmitted by the wireless transmitter and calibration transmitter, and received at SCS's 10A, 10B and 10C, and processed using techniques previously described. During the location processing, RF data from one SCS (e.g. 10B) is cross-correlated (in the time or frequency domain) with the data stream from another SCS (e.g. 10C) separately for each transmitter and for each pair of SCS's 10 to generate TDOA estimates $TDOA_{23}$ and $TDOA_{13}$. An intermediate output of the location processing is a set of coefficients representing the complex cross-power as a function of frequency (e.g., $R_{23}$).

For example, if $X(f)$ is the Fourier transform of the signal $x(t)$ received at a first site and $Y(f)$ is the Fourier transform of the signal $y(t)$ received at a second site, then the complex cross-power $R(f)=X(f)Y^*(f)$, where $Y^*$ is the complex conjugate of $Y$. The phase angle of $R(f)$ at any frequency $f$ equals the phase of $X(f)$ minus the phase of $Y(f)$. The phase angle of $R(f)$ may be called the fringe phase. In the absence of noise, interference, and other errors, the fringe phase is a perfectly linear function of frequency within a (contiguous) frequency band observed; and slope of the line is minus the interferometric group delay, or TDOA; the intercept of the line at the band center frequency, equal to the average value of the phase of $R(f)$, is called "the" fringe phase of the observation when reference is being made to the whole band. Within a band, the fringe phase may be considered to be a function of frequency.

The coefficients obtained for the calibration transmitter are combined with those obtained for the wireless transmitter and the combinations are analyzed to obtain calibrated TDOA measurements $TDOA_{23}$ and $TDOA_{13}$, respectively. In the calibration process, the fringe phase of the calibration transmitter is subtracted from the fringe phase of the wireless transmitter in order to cancel systematic errors that are common to both. Since each original fringe phase is itself the difference between the phases of signals received at two SCS's 10, the calibration process is often called doubledifferencing and the calibrated result is said to be doubly-differenced. TDOA estimate T-ij is a maximum-likelihood estimate of the time difference of arrival (TDOA), between sites i and j, of the signal transmitted by the wireless transmitter, calibrated and also corrected for multipath propagation effects on the signals. TDOA estimates from different pairs of cell sites are combined to derive the location estimate. It is well known that more accurate TDOA estimates can be obtained by observing a wider bandwidth. It is generally not possible to increase the "instantaneous" bandwidth of the signal transmitted by a wireless transmitter, but it is possible to command a wireless transmitter to switch from one frequency channel to another so that, in a short time, a wide bandwidth can be observed.

In a typical non-wireline cellular system, for example, channels 313–333 are control channels and the remaining 395 channels are voice channels. The center frequency of a wireless transmitter transmitting on voice RF channel number 1 (RVC 1) is 826.030 MHz and the center-to-center frequency spacing of successive channels of 0.030 MHz. The number of voice channels assigned to each cell of a typical seven-cell frequency-reuse block is about 57 (i.e., 395 divided by 7) and these channels are distributed throughout the 395-channel range, spaced every 7 channels. Note then that each cell site used in an AMPS system has channels that span the entire 12.5 MHz band allocated by the FCC. If, for example, we designate cells of each frequency set in a re-use pattern as cells "A" through "G", the channel numbers assigned to the "A" cell(s) might be 1, 8, 15, 22, . . . , 309; the numbers of the channels assigned to the "B" cells are determined by adding 1 to the "A" channel numbers; and so on through G.

The method begins when the wireless transmitter has been assigned to a voice RF channel, and the Wireless Location System has triggered location processing for the transmissions from the wireless transmitter. As part of the location processing, the TDOA estimates $TDOA_{13}$ and $TDOA_{23}$ combined may have, for example, a standard deviation error of 0.5 microsecond. The method combining measurements from different RF channels exploits the relation between TDOA, fringe phase, and radio frequency. Denote the "true" value of the group delay or TDOA, i.e., the value that would be observed in the absence of noise, multipath, and any instrumental error, by $\tau$; similarly, denote the true value of fringe phase by $\phi$; and denote the radio frequency by f. The fringe phase $\phi$ is related to $\tau$ and f by:

$$\phi = -f\tau + n \qquad \text{(Eq. 1)}$$

where $\phi$ is measured in cycles, f in Hz and $\tau$ in seconds; and n is an integer representing the intrinsic integer-cycle ambiguity of a doubly-differenced phase measurement. The value of n is unknown a priori but is the same for observations at contiguous frequencies, i.e., within any one frequency channel. The value of n is generally different for observations at separated frequencies. $\tau$ can be estimated from observations in a single frequency channel is, in effect, by fitting a straight line to the fringe phase observed as a function of frequency within the channel. The slope of the best-fitting line equals minus the desired estimate of $\tau$. In the single-channel case, n is constant and so Eq. 1 can be differentiated to obtain:

$$d\phi/df = -\tau \qquad \text{(Eq. 2).}$$

Independent estimates of T are obtainable by straight-line fitting to the observations of $\phi$ vs. f separately for each channel, but when two separate (non-contiguous) frequency channels are observed, a single straight line will not generally fit the observations of $\phi$ vs. f from both channels because, in general, the integer n has different values for the two channels. However, under certain conditions, it is possible to determine and remove the difference between these two integer values and then to fit a single straight line to the entire set of phase data spanning both channels. The slope of this straight line will be much better determined because it is based on a wider range of frequencies. Under certain conditions, the uncertainty of the slope estimate is inversely proportional to the frequency span.

Figure 12B:
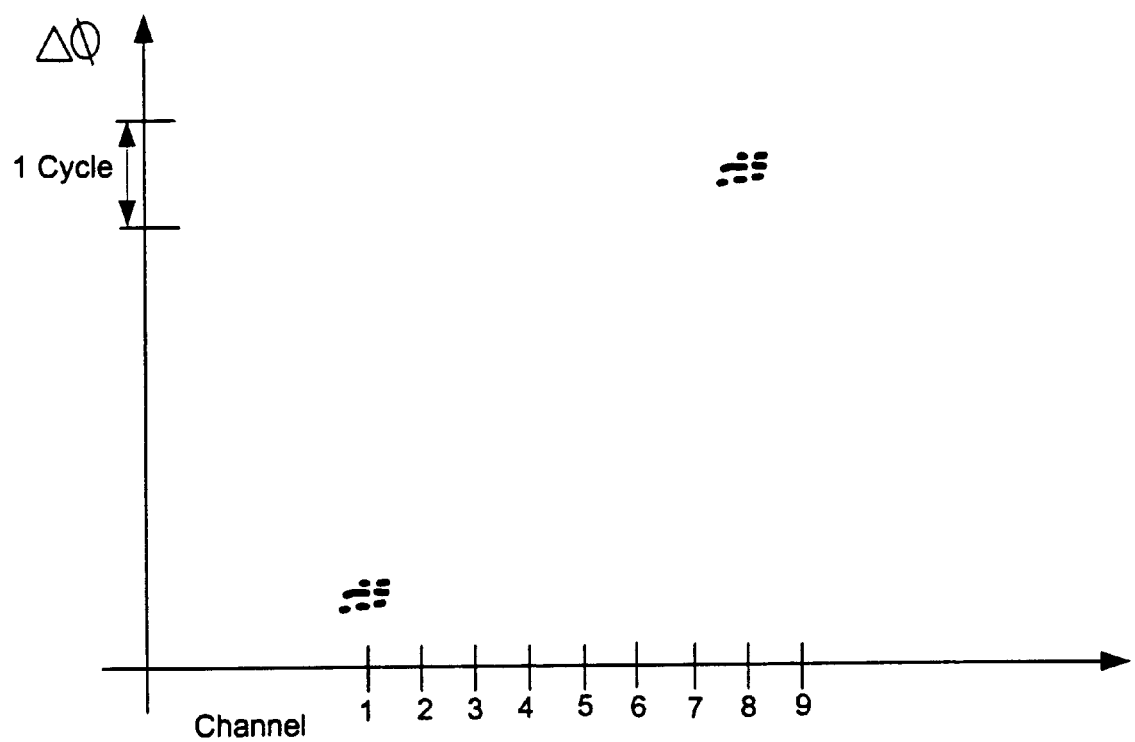

In this example, suppose that the wireless transmitter has been assigned to voice RF channel 1. The radio frequency difference between channels 1 and 416 is so great that initially the difference between the integers $n_1$ and $n_{416}$ corresponding to these channels cannot be determined. However, from the observations in either or both channels taken separately, an initial TDOA estimate $\tau_0$ can be derived. Now the Wireless Location System commands the wireless communications system to make the wireless transmitter to switch from channel 1 to channel 8. The wireless transmitter's signal is received in channel 8 and processed to update or refine the estimate $\tau_0$. From $\tau_0$, the "theoretical" fringe-phase $\phi_0$ as a function of frequency can be computed, equal to $(-f\tau_0)$. The difference between the actually observed phase $\phi$ and the theoretical function $\phi_0$ can be computed, where the actually observed phase equals the true phase within a very small fraction, typically $\frac{1}{50}$th, of a cycle:

$$\phi - \phi_0 = -f(\tau - \tau_0) + n_1 \text{ or } n_8, \text{ depending on the channel} \qquad \text{(Eq. 3)}$$

or $$\Delta\phi = -\Delta f\tau - n_1 \text{ or } n_8, \text{ depending on the channel} \qquad \text{(Eq. 4)}$$

where $\Delta\phi \equiv \phi - \phi_0$ and $\Delta\tau \equiv \tau - \tau_0$. Equation (4) is graphed in FIG. 12B, depicting the difference, $\Delta\phi$, between the observed fringe phase $\phi$ and the value $\phi_0$ computed from the initial TDOA estimate $\tau_0$, versus frequency f for channels 1 and 8.

For the 20 KHz-wide band of frequencies corresponding to channel 1, a graph of $\Delta\phi$ vs. f is typically a horizontal straight line. For the 20 KHz-wide band of frequencies corresponding to channel 8, the graph of $\Delta\phi$ vs. f is also horizontal straight line. The slopes of these line segments are generally nearly zero because the quantity (f$\Delta\tau$) usually does not vary by a significant fraction of a cycle within 20 KHz, because $\Delta\tau$ is minus the error of the estimate $\tau_0$. The magnitude of this error typically will not exceed 1.5 microseconds (3 times the standard deviation of 0.5 microseconds in this example), and the product of 1.5 microseconds and 20 KHz is under 4% of a cycle. In FIG. 12B, the graph of $\Delta\phi$ for channel 1 is displaced vertically from the graph of $\Delta\phi$ for channel 8 by a relatively large amount because the difference between $n_1$ and $n_8$ can be arbitrarily large. This vertical displacement, or difference between the average values of $\Delta\phi$ for channels 1 and 8, will (with extremely high probability) be within ±0.3 cycle of the true value of the difference, $n_1$ and $n_8$, because the product of the maximum likely magnitude of $\Delta\tau$ (1.5 microseconds) and the spacing of channels 1 and 8 (210 KHz) is 0.315 cycle. In other words, the difference $n_1-n_8$ is equal to the difference between the average values of $\Delta\phi$ for channels 1 and 8, rounded to the nearest integer. After the integer difference $n_1-n_8$ is determined by this rounding procedure, the integer $\Delta\phi$ is added for channel 8 or subtracted from $\Delta\phi$ for channel 1. The difference between the average values of $\Delta\phi$ for channels 1 and 8 is generally equal to the error in the initial TDOA estimate, $\tau_0$, times 210 KHz. The difference between the average values of $\Delta\phi$ for channels 1 and 8 is divided by 210 KHz and the result is added to $\tau_0$ to obtain an estimate of $\tau$, the true value of the TDOA; this new estimate can be significantly more accurate than $\tau_0$.

This frequency-stepping and TDOA-refining method can be extended to more widely spaced channels to obtain yet more accurate results. If $\tau_1$ is used to represent the refined result obtained from channels 1 and 8, $\tau_0$ can be replaced by $\tau_1$ in the just-described method; and the Wireless Location System can command the wireless communications system to make the wireless transmitter switch, e.g., from channel 8 to channel 36; then $\tau_1$ can be used to determine the integer difference $n_8 - n_{36}$ and a TDOA estimate can be obtained based on the 1.05 MHz frequency span between channels 1 and 36. The estimated can be labeled $\tau_2$; and the wireless transmitter switched, e.g., from channel 36 to 112, and so on. In principle, the full range of frequencies allocated to the cellular carrier can be spanned. The channel numbers (1, 8, 36, 112) used in this example are, of course, arbitrary. The general principle is that an estimate of the TDOA based on a small frequency span (starting with a single channel) is used to resolve the integer ambiguity of the fringe phase difference between more widely separated frequencies. The latter frequency separation should not be too large; it is limited by the uncertainty of the prior estimate of TDOA. In general, the worst-case error in the prior estimate multiplied by the frequency difference may not exceed 0.5 cycle.

If the very smallest (e.g., 210 KHz) frequency gap between the most closely spaced channels allocated to a particular cell cannot be bridged because the worst-case uncertainty of the single-channel TDOA estimate exceeds 2.38 microseconds (equal to 0.5 cycle divided by 0.210 MHz), the Wireless Location System commands the wireless communications system to force the wireless transmitter hand-off from one cell site to another (e.g. from one frequency group to another), such that the frequency step is smaller. There is a possibility of misidentifying the integer difference between the phase differences ($\Delta\phi$'s) for two channels, e.g., because the wireless transmitter moved during the handoff from one channel to the other. Therefore, as a check, the Wireless Location System may reverse each handoff (e.g., after switching from channel 1 to channel 8, switch from channel 8 back to channel 1) and confirm that the integer-cycle difference determined has precisely the same magnitude and the opposite sign as for the "forward" hand-off. A significantly nonzero velocity estimate from the single-channel FDOA observations can be used to extrapolate across the time interval involved in a channel change. Ordinarily this time interval can be held to a small fraction of 1 second. The FDOA estimation error multiplied by the time interval between channels must be small in comparison with 0.5 cycle. The Wireless Location System preferably employs a variety of redundancies and checks against integer-misidentification.

Directed Retry for 911

Another inventive aspect of the Wireless Location System relates to a "directed retry" method for use in connection with a dual-mode wireless communications system supporting at least a first modulation method and a second modulation method. In such a situation, the first and second modulation methods are assumed to be used on different RF channels (i.e. channels for the wireless communications system supporting a WLS and the PCS system, respectively). It is also assumed that the wireless transmitter to be located is capable of supporting both modulation methods, i.e. is capable of dialing "911" on the wireless communications system having Wireless Location System support.

For example, the directed retry method could be used in a system in which there are an insufficient number of base stations to support a Wireless Location System, but which is operating in a region served by a Wireless Location System associated with another wireless communications system. The "first" wireless communications system could be a cellular telephone system and the "second" wireless communications system could be a PCS system operating within the same territory as the first system. According to the invention, when the mobile transmitter is currently using the second (PCS) modulation method and attempts to originate a call to 911, the mobile transmitter is caused to switch automatically to the first modulation method, and then to originate the call to 911 using the first modulation method on one of the set of RF channels prescribed for use by the first wireless communications system. In this manner, location services can be provided to customers of a PCS or like system that does is not served by its own Wireless Location System.

CONCLUSION

The true scope the present invention is not limited to the presently preferred embodiments disclosed herein. For example, the foregoing disclosure of a presently preferred embodiment of a Wireless Location System uses explanatory terms, such as Signal Collection System (SCS), TDOA Location Processor (TLP), Applications Processor (AP), and the like, which should not be construed so as to limit the scope of protection of the following claims, or to otherwise imply that the inventive aspects of the Wireless Location System are limited to the particular methods and apparatus disclosed. Moreover, as will be understood by those skilled in the art, many of the inventive aspects disclosed herein may be applied in location systems that are not based on TDOA techniques. For example, the processes by which the Wireless Location System uses the Tasking List, etc. can be applied to non-TDOA systems. In such non-TDOA systems, the TLP's described above would not be required to perform TDOA calculations. Similarly, the invention is not limited to systems employing SCS's constructed as described above, nor to systems employing AP's meeting all of the particulars described above. The SCS's, TLP's and AP's are, in essence, programmable data collection and processing devices that could take a variety of forms without departing from the inventive concepts disclosed herein. Given the rapidly declining cost of digital signal processing and other processing functions, it is easily possible, for example, to transfer the processing for a particular function from one of the functional elements (such as the TLP) described herein to another functional element (such as the SCS or AP) without changing the inventive operation of the system. In many cases, the place of implementation (i.e. the functional element) described herein is merely a designer's preference and not a hard requirement. Accordingly, except as they may be expressly so limited, the scope of protection of the following claims is not intended to be limited to the specific embodiments described above.

What is claimed is:

1. A method for use in a wireless location system to determine the geographic location of a mobile wireless transmitter, the method comprising:

calculating a number of parameters for each of a plurality of baselines; and including in a final location solution only those baselines meeting or exceeding predefined threshold criteria for each of the parameters.

2. A method as recited in claim 1, wherein the wireless location system includes signal collection systems and at least one location processor for processing digital data provided by the signal collection systems, wherein TDOA data is determined with respect to signals received at antenna ports of a plurality of first signal collection system/antenna—second signal collection system/antenna baselines.

3. A method as recited in claim 2, wherein the parameters include an average power of the transmission as received at the second signal collection system/antenna port used in a baseline and over an interval used for location processing.

4. A method as recited in claim 2, wherein the parameters include a peak of the power of the transmission as received at the second signal collection system/antenna port used in a baseline and over an interval used for location processing.

5. A method as recited in claim 2, wherein the parameters include a variance in the power of the transmission as received at the second signal collection system/antenna port used in a baseline and over an interval used for location processing.

6. A method as recited in claim 2, wherein the parameters include a correlation value from a cross-spectra correlation between the second signal collection system/antenna used in the baseline and a first signal collection system/antenna.

7. A method as recited in claim 2, wherein the parameters include a delay value for the baseline.

8. A method as recited in claim 2, wherein the parameters include multipath mitigation parameters.

9. A method as recited in claim 2, wherein the parameters include residual values remaining after multipath mitigation calculations.

10. A method as recited in claim 2, wherein the parameters include a contribution of the second signal collection system/antenna to a weighted geometric dilution of precision in the final location solution.

11. A method as recited in claim 2, wherein the parameters include a measure of the quality of fit of the baseline in the final location solution, if the baseline were included.

12. An apparatus for use in wireless location system to determine the geographic location of a mobile wireless transmitter, comprising:
   means for calculating a number of parameters for each of a plurality of baselines; and
   means for including in a final location solution only those baselines meeting or exceeding predefined threshold criteria for each of the parameters.

13. An apparatus as recited in claim 12, wherein the wireless location system includes signal collection systems and at least one location processor for processing digital data provided by the signal collection systems, wherein TDOA data is determined with respect to a plurality of signals received at antenna ports of first signal collection system/antenna—second signal collection system/antenna baselines.

14. An apparatus as recited in claim 13, wherein the parameters include an average of the power of the transmission as received at the second signal collection system/antenna port used in a baseline and over an interval used for location processing.

15. An apparatus as recited in claim 13, wherein the parameters include a peak of the power of the transmission as received at the second signal collection system/antenna port used in a baseline and over an interval used for location processing.

16. An apparatus as recited in claim 13, wherein the parameters include a variance in the power of the transmission as received at the second signal collection system/antenna port used in a baseline and over an interval used for location processing.

17. An apparatus as recited in claim 13, wherein the parameters include a correlation value from a cross-spectra correlation between the second signal collection system/antenna used in the baseline and a first signal collection system/antenna.

18. An apparatus as recited in claim 13, wherein the parameters include a delay value for the baseline.

19. An apparatus as recited in claim 13, wherein the parameters include multipath mitigation parameters.

20. An apparatus as recited in claim 13, wherein the parameters include residual values remaining after multipath mitigation calculations.

21. An apparatus as recited in claim 13, wherein the parameters include a contribution of the second signal collection system/antenna to a weighted geometric dilution of precision in the final location solution.

22. An apparatus as recited in claim 13, wherein the parameters include a measure of the quality of fit of the baseline in the final location solution, if the baseline were included.

* * * * *

UNITED STATES PATENT AND TRADEMARK OFFICE
CERTIFICATE OF CORRECTION

PATENT NO.    : 6,483,460 B2
DATED         : November 19, 2002
INVENTOR(S)   : Louis A. Stilp et al.

It is certified that error appears in the above-identified patent and that said Letters Patent is hereby corrected as shown below:

Title page,
Item [57], ABSTRACT,
Line 6, insert -- – -- after "system/antenna";

Column 3,
Line 19, insert -- as -- after "known";

Column 5,
Line 38, insert -- a -- before "diagram";

Column 6,
Line 12, delete "the" after "because";
Line 65, delete "type" and insert -- types -- therefor;

Column 10,
Line 34, delete "IF" and insert -- RF -- therefor;

Column 11,
Line 67, delete "till" and insert -- still -- therefor;

Column 12,
Line 44, delete "educed" and insert -- reduced -- therefor;

Column 15,
Line 18, delete the second occurrence of "is" and insert -- in -- therefor;

Column 16,
Line 61, delete "than" and insert -- that -- therefor;

Column 21,
Line 41, delete "errors," and insert -- errors. -- therefor;
Line 54, delete "TAC, TBC" and insert -- $T_{AC}$, $T_{BC}$ -- therefor;

Column 22,
Line 25, delete "may" and insert -- made -- therefor;

Column 23,
Line 57, delete "finction" and insert -- function -- therefor;
Line 67, delete "21" and insert -- 2I -- therefor;

UNITED STATES PATENT AND TRADEMARK OFFICE
CERTIFICATE OF CORRECTION

PATENT NO.     : 6,483,460 B2
DATED          : November 19, 2002
INVENTOR(S)    : Louis A. Stilp et al.

It is certified that error appears in the above-identified patent and that said Letters Patent is hereby corrected as shown below:

Column 24,
Line 19, delete "21" and insert -- 2I -- therefor;
Line 28, delete the second occurrence of "the";

Column 25,
Line 17, delete "as" and insert -- a -- therefor;

Column 26,
Line 30, delete "usefully" and insert -- useful -- therefor;
Line 64, delete the second occurrence of "the" and insert -- to -- therefor;

Column 29,
Lines 13 and 28, delete "that" and insert -- than -- therefor;
Line 64, delete "finctions" and insert -- functions -- therefor;

Column 31,
Line 58, delete "12" and insert -- 12B -- therefor;

Column 32,
Line 1, insert -- a -- after "than";
Line 37, delete "(RD13MS)" and insert -- (RDBMS) -- therefor;

Column 33,
Line 39, delete "field" and insert -- fields -- therefor;

Column 34,
Line 24, delete one occurrence of "that";

Column 35,
Line 61, delete "any" and insert -- and -- therefor;

Column 37,
Line 46, delete "be not" and insert -- not be -- therefor;

Column 39,
Line 55, delete "successful" and insert -- successfully -- therefor;

Column 41,
Line 19, delete "includes" and insert -- include -- therefor;

UNITED STATES PATENT AND TRADEMARK OFFICE
CERTIFICATE OF CORRECTION

PATENT NO. : 6,483,460 B2
DATED : November 19, 2002
INVENTOR(S) : Louis A. Stilp et al.

It is certified that error appears in the above-identified patent and that said Letters Patent is hereby corrected as shown below:

<u>Column 42,</u>
Line 34, delete "send" and insert -- sends -- therefor;
Line 61, insert -- to -- after "order";

<u>Column 44,</u>
Lines 44-45, delete "approximately" and insert -- approximate -- therefor;
Line 46, delete "SCS 10" and insert -- SCS 10A -- therefor;

<u>Column 45,</u>
Line 30, delete "become" and insert -- becomes -- therefor;

<u>Column 46,</u>
Line 28, delete "make" and insert -- makes -- therefor;
Line 58, insert -- , -- before "then";

<u>Column 47,</u>
Line 22, delete "dialed" and insert -- dial -- therefor;

<u>Column 48,</u>
Line 5, delete "performed" and insert -- perform -- therefor;
Line 50, delete "area" and insert -- areas -- therefor;

<u>Column 49,</u>
Line 30, delete "include" and insert -- includes -- therefor;

<u>Column 51,</u>
Line 6, delete "ource" and insert -- source -- therefor;

<u>Column 54,</u>
Line 3, delete "SCS 10" and insert -- SCS 10A -- therefor;

<u>Column 56,</u>
Line 3, delete "is" and insert -- and -- therefor;

<u>Column 59,</u>
Lines 45-46, delete "(max_number_of sites)" and insert -- (max_number_of_sites) -- therefor;

UNITED STATES PATENT AND TRADEMARK OFFICE
CERTIFICATE OF CORRECTION

PATENT NO. : 6,483,460 B2
DATED : November 19, 2002
INVENTOR(S) : Louis A. Stilp et al.

It is certified that error appears in the above-identified patent and that said Letters Patent is hereby corrected as shown below:

Column 61,
Line 18, delete "in" and insert -- is -- therefor;
Lines 19-20, delete "max_number_antennas_Processed" and insert -- max_number_antennas_processed -- therefor;

Column 65,
Line 9, delete "difference" and insert -- different -- therefor;
Line 52, delete "that" and insert -- than -- therefor;

Column 66,
Line 20, delete "the." and insert -- the -- therefor;
Line 38, delete "dial" and insert -- dials -- therefor;

Column 68,
Line 44, delete "assume" and insert -- assumes -- therefor;
Line 53, delete "estimate" and insert -- estimates -- therefor;

Column 69,
Line 41, delete "Steps" and insert -- The -- therefor;
Line 59, insert -- be -- after "can";

Column 71,
Line 56, delete "is" after "channel";
Line 64, delete "T" and insert -- $\tau$ -- therefor;

Column 72,
Line 41, insert -- a -- after "also";

Column 73,
Line 15, delete "estimated" and insert -- estimate -- therefor;

UNITED STATES PATENT AND TRADEMARK OFFICE
CERTIFICATE OF CORRECTION

PATENT NO.   : 6,483,460 B2
DATED        : November 19, 2002
INVENTOR(S)  : Louis A. Stilp et al.

It is certified that error appears in the above-identified patent and that said Letters Patent is hereby corrected as shown below:

<u>Column 74,</u>
Line 20, insert -- of -- after "scope".

Signed and Sealed this

Eleventh Day of November, 2003

JAMES E. ROGAN
*Director of the United States Patent and Trademark Office*